(12) United States Patent
Ouderkirk et al.

(10) Patent No.: US 7,852,560 B2
(45) Date of Patent: Dec. 14, 2010

(54) DISPLAY INCORPORATING REFLECTIVE POLARIZER

(75) Inventors: Andrew J. Ouderkirk, Singapore (SG); Olester Benson, Jr., Woodbury, MN (US); Michael F. Weber, Shoreview, MN (US); Carl A. Stover, St. Paul, MN (US); David I. Wortman, Stillwater, MN (US); Sanford Cobb, Jr., Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/328,127

(22) Filed: Dec. 4, 2008

(65) Prior Publication Data

US 2009/0079909 A1  Mar. 26, 2009

Related U.S. Application Data

(60) Continuation of application No. 11/669,666, filed on Jan. 31, 2007, now abandoned, which is a continuation of application No. 11/566,276, filed on Dec. 4, 2006, now abandoned, which is a continuation of application No. 10/930,988, filed on Aug. 31, 2004, now Pat. No. 7,321,464, which is a division of application No. 09/626,938, filed on Jul. 27, 2000, now Pat. No. 6,804,058, which is a continuation of application No. 09/103,270, filed on Jun. 23, 1998, now abandoned, which is a continuation of application No. 08/402,349, filed on Mar. 10, 1995, now Pat. No. 5,828,488, which is a continuation-in-part of application No. 08/360,204, filed on Dec. 20, 1994, now abandoned, and a continuation-in-part of application No. 08/359,436, filed on Dec. 20, 1994, now abandoned, which is a continuation-in-part of application No. 08/171,239, filed on Dec. 21, 1993, now abandoned, and a continuation-in-part of application No. 08/172,593, filed on Dec. 21, 1993, now abandoned.

(51) Int. Cl.
  *G02B 5/30* (2006.01)
  *G02B 27/28* (2006.01)
  *G02F 1/1335* (2006.01)

(52) U.S. Cl. ........................ 359/495; 359/497; 359/500; 349/62; 349/65; 349/96; 349/97; 349/113; 362/19; 362/561; 362/609; 362/611; 362/617

(58) Field of Classification Search ................. 359/495, 359/497, 500; 349/57, 61, 62, 65, 96, 97, 349/106, 113; 362/19, 609, 611, 615, 617, 362/561
See application file for complete search history.

(56) References Cited

U.S. PATENT DOCUMENTS 0,540,768 A  6/1895  Western (Continued)

FOREIGN PATENT DOCUMENTS

AU  622812  3/1991

(Continued)

OTHER PUBLICATIONS

3M Light Diffusing Film, Ad, Optical Systems, 1993.

(Continued)

*Primary Examiner*—Ricky D Shafer
(74) *Attorney, Agent, or Firm*—Jay R. Pralle

(57) ABSTRACT

A display includes a liquid crystal display panel, an optical cavity producing substantially collimated light and a birefringent reflective polarizer.

11 Claims, 31 Drawing Sheets

U.S. PATENT DOCUMENTS

| | | |
|---|---|---|
| 1,610,423 A | 12/1926 | Cawley |
| 2,123,901 A | 7/1938 | Land |
| 2,123,902 A | 7/1938 | Land |
| 2,158,130 A | 5/1939 | Land |
| 2,237,567 A | 4/1941 | Land et al. |
| 2,270,535 A | 1/1942 | Land et al. |
| 2,492,809 A | 12/1949 | Marks |
| 2,604,817 A | 7/1952 | Schupp |
| 2,776,598 A | 1/1957 | Dreyer |
| 2,803,552 A | 8/1957 | Stedman |
| 2,887,566 A | 5/1959 | Marks |
| 3,022,178 A | 2/1962 | Park et al. |
| 3,051,452 A | 8/1962 | Nobel |
| 3,051,453 A | 8/1962 | Sluijters |
| 3,075,228 A | 1/1963 | Elias |
| 3,124,639 A | 3/1964 | Kahn |
| 3,182,965 A | 5/1965 | Sluijters |
| 3,195,865 A | 7/1965 | Harder |
| 3,212,909 A | 10/1965 | Leigh |
| 3,213,753 A | 10/1965 | Rogers |
| 3,308,508 A | 3/1967 | Schrenk |
| 3,315,306 A | 4/1967 | Ladner et al. |
| 3,321,804 A | 5/1967 | Breidt, Jr. et al. |
| 3,327,349 A | 6/1967 | Lennox |
| 3,334,382 A | 8/1967 | Lefevre |
| 3,397,428 A | 8/1968 | Donald |
| 3,399,105 A | 8/1968 | Breidt, Jr. et al. |
| 3,400,190 A | 9/1968 | Donald |
| 3,415,920 A | 12/1968 | Lee et al. |
| 3,423,498 A | 1/1969 | Lefevre |
| 3,438,691 A | 4/1969 | Makas |
| 3,442,755 A | 5/1969 | Walters et al. |
| 3,448,183 A | 6/1969 | Chisholm et al. |
| 3,479,425 A | 11/1969 | Lefevre et al. |
| 3,480,502 A | 11/1969 | Schrenk |
| 3,487,505 A | 1/1970 | Chisholm et al. |
| 3,498,873 A | 3/1970 | Schrenk |
| 3,508,809 A | 4/1970 | Wilder et al. |
| 3,511,903 A | 5/1970 | Glass et al. |
| 3,528,723 A | 9/1970 | Rogers |
| 3,549,405 A | 12/1970 | Schrenk et al. |
| 3,555,128 A | 1/1971 | Schrenk |
| 3,556,635 A | 1/1971 | Schrenk et al. |
| 3,557,265 A | 1/1971 | Chisholm et al. |
| 3,565,985 A | 2/1971 | Schrenk et al. |
| 3,579,416 A | 5/1971 | Schrenk |
| 3,594,583 A | 7/1971 | Sheldon |
| 3,600,587 A | 8/1971 | Smith |
| 3,610,729 A * | 10/1971 | Rogers ....................... 359/488 |
| 3,631,288 A | 12/1971 | Rogers |
| 3,645,837 A | 2/1972 | Chisholm et al. |
| 3,647,612 A | 3/1972 | Schrenk et al. |
| 3,677,621 A | 7/1972 | Smith |
| 3,682,531 A | 8/1972 | Jeffers |
| 3,687,589 A | 8/1972 | Schrenk et al. |
| 3,711,176 A | 1/1973 | Alfrey, Jr. et al. |
| 3,712,706 A | 1/1973 | Stamm |
| 3,716,612 A | 2/1973 | Schrenk et al. |
| 3,737,263 A | 6/1973 | Schrenk et al. |
| 3,737,882 A | 6/1973 | Schrenk et al. |
| 3,743,459 A | 7/1973 | Schrenk et al. |
| 3,746,485 A | 7/1973 | Schrenk |
| 3,759,647 A | 9/1973 | Schrenk et al. |
| 3,759,657 A | 9/1973 | Carlsson |
| 3,767,290 A | 10/1973 | Lang et al. |
| 3,773,882 A | 11/1973 | Schrenk |
| 3,801,036 A | 4/1974 | Hasler |
| 3,801,181 A | 4/1974 | Kitano et al. |
| 3,801,429 A | 4/1974 | Schrenk et al. |
| 3,819,522 A | 6/1974 | Zmoda |
| 3,825,645 A | 7/1974 | Barthelemy et al. |
| 3,829,680 A | 8/1974 | Jones |
| 3,847,585 A | 11/1974 | Chisholm |
| 3,860,036 A | 1/1975 | Newman, Jr. |
| 3,860,372 A | 1/1975 | Newman, Jr. |
| 3,876,285 A | 4/1975 | Schwarzmüller |
| 3,884,606 A | 5/1975 | Schrenk |
| 3,893,795 A | 7/1975 | Nauta |
| 3,897,356 A | 7/1975 | Pociluyko |
| 3,912,921 A | 10/1975 | Howe et al. |
| 3,924,990 A | 12/1975 | Schrenk |
| 3,960,751 A | 6/1976 | Moriyama et al. |
| 4,020,336 A | 4/1977 | Linder |
| 4,025,688 A | 5/1977 | Nagy et al. |
| 4,051,465 A | 9/1977 | Brody |
| 4,061,462 A | 12/1977 | Giannarelli et al. |
| 4,084,883 A | 4/1978 | Eastman et al. |
| 4,094,947 A | 6/1978 | Alfrey, Jr. et al. |
| 4,144,011 A | 3/1979 | Sponaugle |
| 4,161,015 A | 7/1979 | Dey et al. |
| 4,162,343 A | 7/1979 | Wilcox et al. |
| 4,190,832 A | 2/1980 | Mohler |
| 4,212,048 A | 7/1980 | Castleberry |
| 4,249,011 A | 2/1981 | Wendling |
| 4,254,002 A | 3/1981 | Sperling et al. |
| 4,268,127 A | 5/1981 | Oshima et al. |
| 4,268,840 A | 5/1981 | Schank et al. |
| 4,308,316 A | 12/1981 | Gordon |
| 4,310,584 A | 1/1982 | Cooper et al. |
| 4,315,258 A | 2/1982 | McKnight et al. |
| 4,343,535 A | 8/1982 | Bleha |
| 4,348,349 A | 9/1982 | Kurtz |
| 4,377,613 A | 3/1983 | Gordon |
| 4,393,194 A | 7/1983 | Gaudiana et al. |
| 4,425,028 A | 1/1984 | Gagnon et al. |
| 4,426,344 A | 1/1984 | Dinter et al. |
| 4,427,741 A | 1/1984 | Aizawa et al. |
| 4,446,305 A | 5/1984 | Rogers et al. |
| 4,454,312 A | 6/1984 | Kuze et al. |
| 4,478,909 A | 10/1984 | Taniguchi et al. |
| RE31,780 E | 12/1984 | Cooper et al. |
| 4,500,173 A | 2/1985 | Leibowitz et al. |
| 4,503,248 A | 3/1985 | Rogers et al. |
| 4,511,220 A | 4/1985 | Scully |
| 4,520,189 A | 5/1985 | Rogers et al. |
| 4,521,588 A | 6/1985 | Rogers et al. |
| 4,525,413 A | 6/1985 | Rogers et al. |
| 4,540,623 A | 9/1985 | Im et al. |
| 4,542,449 A | 9/1985 | Whitehead |
| 4,586,790 A | 5/1986 | Umeda et al. |
| 4,590,119 A | 5/1986 | Kawakami et al. |
| 4,627,138 A | 12/1986 | Im |
| 4,636,442 A | 1/1987 | Beavers et al. |
| 4,643,529 A | 2/1987 | Hosonuma et al. |
| 4,643,927 A | 2/1987 | Luecke |
| 4,659,523 A | 4/1987 | Rogers et al. |
| 4,660,936 A | 4/1987 | Nosker |
| 4,661,303 A | 4/1987 | Chum et al. |
| 4,678,285 A | 7/1987 | Ohta et al. |
| 4,720,426 A | 1/1988 | Englert et al. |
| 4,723,077 A | 2/1988 | Wu |
| 4,732,799 A | 3/1988 | Sakamoto et al. |
| 4,756,953 A | 7/1988 | Utsumi |
| 4,791,540 A | 12/1988 | Dreyer, Jr. et al. |
| 4,796,160 A | 1/1989 | Kahn |
| 4,796,978 A | 1/1989 | Tanaka et al. |
| 4,797,308 A | 1/1989 | Mattin |
| 4,798,448 A | 1/1989 | Van Raalte |
| 4,799,772 A | 1/1989 | Utsumi |
| 4,805,984 A | 2/1989 | Cobb, Jr. |
| 4,824,882 A | 4/1989 | Nakamura et al. |
| 4,840,463 A | 6/1989 | Clark et al. |
| 4,842,781 A | 6/1989 | Nishizawa et al. |
| 4,848,564 A | 7/1989 | Scheller et al. |

| Patent | Date | Inventor |
|---|---|---|
| 4,871,406 A | 10/1989 | Griffith |
| 4,873,037 A | 10/1989 | Chau et al. |
| 4,874,568 A | 10/1989 | Chau et al. |
| 4,880,370 A | 11/1989 | Krumm |
| 4,883,341 A | 11/1989 | Whitehead |
| 4,893,911 A | 1/1990 | Ostoja-Starzewski et al. |
| 4,895,769 A | 1/1990 | Land et al. |
| 4,896,218 A | 1/1990 | Vick |
| 4,896,942 A | 1/1990 | Onstott et al. |
| 4,896,946 A | 1/1990 | Suzuki et al. |
| 4,906,068 A | 3/1990 | Olson et al. |
| 4,917,465 A | 4/1990 | Conner et al. |
| 4,926,177 A | 5/1990 | Sakata |
| 4,937,134 A | 6/1990 | Schrenk et al. |
| 4,943,154 A | 7/1990 | Miyatake et al. |
| 4,943,155 A | 7/1990 | Cross, Jr. |
| 4,952,023 A | 8/1990 | Bradshaw et al. |
| 4,963,304 A | 10/1990 | Im et al. |
| 4,965,135 A | 10/1990 | Im et al. |
| 4,974,946 A | 12/1990 | Solomon |
| 4,989,076 A | 1/1991 | Owada et al. |
| 5,009,472 A | 4/1991 | Morimoto |
| 5,013,107 A | 5/1991 | Biles |
| 5,027,339 A | 6/1991 | Yoda et al. |
| 5,038,041 A | 8/1991 | Egan |
| 5,042,921 A | 8/1991 | Sato et al. |
| 5,051,286 A | 9/1991 | Starzewski |
| 5,056,888 A | 10/1991 | Messerly et al. |
| 5,056,892 A | 10/1991 | Cobb, Jr. |
| 5,059,356 A | 10/1991 | Nakamura et al. |
| 5,061,050 A | 10/1991 | Ogura |
| 5,067,799 A | 11/1991 | Gold et al. |
| 5,077,121 A | 12/1991 | Harrison et al. |
| 5,082,601 A | 1/1992 | Okada et al. |
| 5,089,318 A | 2/1992 | Shetty et al. |
| 5,093,739 A | 3/1992 | Aida et al. |
| 5,094,788 A | 3/1992 | Schrenk et al. |
| 5,094,793 A | 3/1992 | Schrenk et al. |
| 5,095,210 A | 3/1992 | Wheatley et al. |
| 5,096,520 A | 3/1992 | Faris |
| 5,103,337 A | 4/1992 | Schrenk et al. |
| 5,122,905 A | 6/1992 | Wheatley et al. |
| 5,122,906 A | 6/1992 | Wheatley |
| 5,124,841 A | 6/1992 | Oishi |
| 5,126,880 A | 6/1992 | Wheatley et al. |
| 5,130,862 A | 7/1992 | Takanashi et al. |
| 5,134,516 A | 7/1992 | Lehureau et al. |
| 5,138,474 A | 8/1992 | Arakawa |
| 5,139,340 A | 8/1992 | Okumura |
| 5,146,248 A | 9/1992 | Duwaer et al. |
| 5,149,578 A | 9/1992 | Wheatley et al. |
| 5,157,526 A | 10/1992 | Kondo et al. |
| 5,159,478 A | 10/1992 | Akiyama et al. |
| 5,166,817 A | 11/1992 | Ota et al. |
| 5,175,030 A | 12/1992 | Lu et al. |
| 5,182,069 A | 1/1993 | Wick |
| 5,188,760 A | 2/1993 | Hikmet et al. |
| 5,189,538 A | 2/1993 | Arakawa |
| 5,194,975 A | 3/1993 | Akatsuka et al. |
| 5,200,843 A | 4/1993 | Karasawa et al. |
| 5,200,857 A | 4/1993 | Matsushita |
| 5,202,074 A | 4/1993 | Schrenk et al. |
| 5,202,950 A | 4/1993 | Arego et al. |
| 5,210,548 A | 5/1993 | Grabowski |
| 5,211,878 A | 5/1993 | Reiffenrath et al. |
| 5,215,825 A | 6/1993 | Hiraoka et al. |
| 5,217,794 A | 6/1993 | Schrenk |
| 5,221,982 A | 6/1993 | Faris |
| 5,233,465 A | 8/1993 | Wheatley et al. |
| 5,234,729 A | 8/1993 | Wheatley et al. |
| 5,235,443 A | 8/1993 | Barnik et al. |
| 5,237,446 A | 8/1993 | Takahashi |
| 5,238,738 A | 8/1993 | Miller |
| 5,245,456 A | 9/1993 | Yoshimi et al. |
| 5,255,029 A | 10/1993 | Vogeley et al. |
| 5,258,208 A | 11/1993 | Bastiaansen |
| 5,262,894 A | 11/1993 | Wheatley et al. |
| 5,269,995 A | 12/1993 | Ramanathan et al. |
| 5,278,680 A | 1/1994 | Karasawa et al. |
| 5,278,694 A | 1/1994 | Wheatley et al. |
| 5,286,418 A | 2/1994 | Nakamura et al. |
| 5,294,657 A | 3/1994 | Melendy et al. |
| 5,295,018 A | 3/1994 | Konuma et al. |
| 5,303,083 A | 4/1994 | Blanchard et al. |
| RE34,605 E | 5/1994 | Schrenk et al. |
| 5,309,422 A | 5/1994 | Kuroki et al. |
| 5,309,544 A | 5/1994 | Saxe |
| 5,312,568 A | 5/1994 | Bastiaansen |
| 5,316,703 A | 5/1994 | Schrenk |
| 5,317,405 A * | 5/1994 | Kuriki et al. ............. 348/14.16 |
| 5,319,478 A | 6/1994 | Fijnfschilling et al. |
| 5,321,683 A | 6/1994 | Olczak |
| 5,325,218 A | 6/1994 | Willett et al. |
| 5,333,072 A | 7/1994 | Willett |
| 5,337,174 A | 8/1994 | Wada et al. |
| 5,339,179 A | 8/1994 | Rudisill et al. |
| 5,339,198 A | 8/1994 | Wheatley et al. |
| 5,345,146 A | 9/1994 | Koenck et al. |
| 5,359,691 A | 10/1994 | Tai et al. |
| 5,360,659 A | 11/1994 | Arends et al. |
| 5,371,559 A | 12/1994 | San-Nohe et al. |
| 5,379,083 A | 1/1995 | Tomita |
| 5,381,309 A | 1/1995 | Borchardt |
| 5,387,953 A | 2/1995 | Minoura et al. |
| 5,389,324 A | 2/1995 | Lewis et al. |
| 5,390,276 A | 2/1995 | Tai et al. |
| 5,405,675 A | 4/1995 | Sawka et al. |
| 5,418,631 A | 5/1995 | Tedesco |
| 5,422,756 A * | 6/1995 | Weber ........................ 359/487 |
| 5,424,119 A | 6/1995 | Phillips et al. |
| 5,442,523 A | 8/1995 | Kashima et al. |
| 5,448,404 A | 9/1995 | Schrenk et al. |
| 5,451,449 A | 9/1995 | Shetty et al. |
| 5,481,445 A | 1/1996 | Sitzema et al. |
| 5,486,935 A | 1/1996 | Kalmanash |
| 5,486,949 A | 1/1996 | Schrenk et al. |
| 5,496,295 A | 3/1996 | Wilfong et al. |
| 5,501,905 A | 3/1996 | Krallmann et al. |
| 5,513,035 A | 4/1996 | Miyatake et al. |
| 5,516,474 A | 5/1996 | Cloeren |
| 5,532,331 A | 7/1996 | Bales et al. |
| 5,540,978 A | 7/1996 | Schrenk |
| 5,552,840 A | 9/1996 | Ishii et al. |
| 5,552,927 A | 9/1996 | Wheatley et al. |
| 5,559,634 A | 9/1996 | Weber |
| 5,568,316 A | 10/1996 | Schrenk et al. |
| 5,580,142 A | 12/1996 | Kurematsu et al. |
| 5,587,816 A * | 12/1996 | Gunjima et al. ................ 349/62 |
| 5,594,563 A | 1/1997 | Larson |
| 5,600,462 A | 2/1997 | Suzuki et al. |
| 5,612,820 A | 3/1997 | Schrenk et al. |
| 5,621,486 A | 4/1997 | Doany et al. |
| 5,627,926 A | 5/1997 | Nakamura et al. |
| 5,629,055 A | 5/1997 | Revol et al. |
| 5,644,432 A | 7/1997 | Doany |
| 5,686,979 A * | 11/1997 | Weber et al. ................... 349/96 |
| 5,699,188 A | 12/1997 | Gilbert et al. |
| 5,721,603 A | 2/1998 | De Vaan et al. |
| 5,728,407 A | 3/1998 | Matsui |
| 5,744,534 A | 4/1998 | Ishiharada et al. |
| 5,751,388 A | 5/1998 | Larson |
| 5,759,467 A | 6/1998 | Carter et al. |
| 5,767,935 A | 6/1998 | Ueda et al. |
| 5,770,306 A | 6/1998 | Suzuki et al. |
| 5,783,120 A | 7/1998 | Ouderkirk et al. |
| 5,793,456 A | 8/1998 | Broer et al. |

| | | |
|---|---|---|
| 5,793,470 A | 8/1998 | Haseltine et al. |
| 5,808,794 A | 9/1998 | Weber et al. |
| 5,808,798 A | 9/1998 | Weber et al. |
| 5,825,542 A | 10/1998 | Cobb, Jr. et al. |
| 5,825,543 A | 10/1998 | Ouderkirk et al. |
| 5,828,488 A * | 10/1998 | Ouderkirk et al. ............ 359/487 |
| 5,831,375 A | 11/1998 | Benson, Jr. |
| 5,867,316 A | 2/1999 | Carlson et al. |
| 5,872,653 A | 2/1999 | Schrenk et al. |
| 5,882,774 A | 3/1999 | Jonza et al. |
| 5,932,150 A | 8/1999 | Lacey |
| 5,940,149 A | 8/1999 | Vanderwerf |
| 5,962,114 A | 10/1999 | Jonza et al. |
| 5,965,247 A | 10/1999 | Jonza et al. |
| 5,976,424 A | 11/1999 | Weber et al. |
| 5,986,815 A | 11/1999 | Bryars |
| 5,991,077 A | 11/1999 | Carlson et al. |
| 5,999,316 A | 12/1999 | Allen et al. |
| 5,999,317 A | 12/1999 | Whitney |
| 6,012,820 A | 1/2000 | Weber et al. |
| 6,018,419 A | 1/2000 | Cobb, Jr. et al. |
| 6,024,455 A | 2/2000 | O'Neill et al. |
| 6,025,897 A * | 2/2000 | Weber et al. ................. 349/96 |
| 6,031,665 A | 2/2000 | Carlson et al. |
| 6,045,894 A | 4/2000 | Jonza et al. |
| 6,049,419 A | 4/2000 | Wheatley et al. |
| 6,052,214 A | 4/2000 | Chuang et al. |
| 6,053,795 A | 4/2000 | Whitney et al. |
| 6,057,961 A | 5/2000 | Allen et al. |
| 6,072,629 A | 6/2000 | Fan et al. |
| 6,080,467 A | 6/2000 | Weber et al. |
| 6,082,876 A | 7/2000 | Hanson et al. |
| 6,088,067 A * | 7/2000 | Willett et al. .................. 349/5 |
| 6,088,159 A | 7/2000 | Weber et al. |
| 6,088,163 A | 7/2000 | Gilbert et al. |
| 6,096,247 A | 8/2000 | Ulsh et al. |
| 6,096,375 A | 8/2000 | Ouderkirk et al. |
| 6,101,032 A | 8/2000 | Wortman et al. |
| 6,111,696 A | 8/2000 | Allen et al. |
| 6,111,697 A | 8/2000 | Merrill et al. |
| 6,113,811 A | 9/2000 | Kausch et al. |
| 6,117,530 A | 9/2000 | Jonza et al. |
| 6,120,026 A | 9/2000 | Whitney et al. |
| 6,124,971 A | 9/2000 | Ouderkirk et al. |
| 6,144,498 A | 11/2000 | Bryars et al. |
| 6,157,486 A | 12/2000 | Benson, Jr. et al. |
| 6,157,490 A | 12/2000 | Wheatley et al. |
| 6,160,663 A | 12/2000 | Merrill et al. |
| 6,172,816 B1 | 1/2001 | Tadic-Galeb et al. |
| 6,179,948 B1 | 1/2001 | Merrill et al. |
| 6,207,260 B1 | 3/2001 | Wheatley et al. |
| 6,208,466 B1 | 3/2001 | Liu et al. |
| 6,250,762 B1 | 6/2001 | Kuijper |
| 6,256,146 B1 | 7/2001 | Merrill et al. |
| 6,262,842 B1 | 7/2001 | Ouderkirk et al. |
| 6,288,172 B1 | 9/2001 | Goetz et al. |
| 6,296,927 B1 | 10/2001 | Jonza et al. |
| 6,297,906 B1 | 10/2001 | Allen et al. |
| 6,304,302 B1 | 10/2001 | Huang et al. |
| 6,307,604 B1 | 10/2001 | Hikmet et al. |
| 6,322,236 B1 | 11/2001 | Campbell et al. |
| 6,352,761 B1 | 3/2002 | Hebrink et al. |
| 6,368,699 B1 | 4/2002 | Gilbert et al. |
| 6,390,626 B2 | 5/2002 | Knox |
| 6,396,631 B1 * | 5/2002 | Ouderkirk .................. 359/500 |
| 6,398,364 B1 | 6/2002 | Bryars |
| 6,409,494 B1 | 6/2002 | Voss |
| 6,486,997 B1 | 11/2002 | Bruzzone et al. |
| 6,515,785 B1 | 2/2003 | Cobb, Jr. et al. |
| 6,521,329 B2 | 2/2003 | Aylward et al. |
| 6,531,230 B1 | 3/2003 | Weber et al. |
| 6,543,153 B1 * | 4/2003 | Weber et al. .................. 34/96 |
| 6,565,982 B1 | 5/2003 | Ouderkirk et al. |
| 6,569,515 B2 | 5/2003 | Hebrink et al. |
| 6,574,044 B1 | 6/2003 | Sahouani et al. |
| 6,583,930 B1 | 6/2003 | Schrenk et al. |
| 6,590,705 B1 | 7/2003 | Allen et al. |
| 6,609,795 B2 | 8/2003 | Weber et al. |
| 6,613,421 B2 | 9/2003 | Jonza et al. |
| 6,635,337 B2 | 10/2003 | Jonza et al. |
| 6,667,095 B2 | 12/2003 | Wheatley et al. |
| 6,672,721 B2 | 1/2004 | Aastuen et al. |
| 6,677,031 B1 | 1/2004 | Murooka et al. |
| 6,685,341 B2 | 2/2004 | Ouderkirk et al. |
| 6,721,096 B2 | 4/2004 | Bruzzone et al. |
| 6,744,561 B2 | 6/2004 | Condo et al. |
| 6,749,427 B1 | 6/2004 | Bretscher et al. |
| 6,760,157 B1 | 7/2004 | Allen et al. |
| 6,768,586 B2 | 7/2004 | Sahouani et al. |
| 6,783,349 B2 | 8/2004 | Neavin et al. |
| 6,804,058 B1 * | 10/2004 | Ouderkirk et al. ........... 359/494 |
| 6,808,658 B2 | 10/2004 | Stover |
| 6,827,886 B2 | 12/2004 | Neavin et al. |
| 6,829,071 B2 | 12/2004 | Allen et al. |
| 6,830,713 B2 | 12/2004 | Hebrink et al. |
| 6,888,677 B2 | 5/2005 | Condo et al. |
| 6,926,952 B1 | 8/2005 | Weber et al. |
| 6,934,082 B2 | 8/2005 | Allen et al. |
| 7,023,602 B2 | 4/2006 | Aastuen et al. |
| 7,038,745 B2 * | 5/2006 | Weber et al. ................... 349/96 |
| 7,083,847 B2 | 8/2006 | Jonza et al. |
| 7,321,464 B2 * | 1/2008 | Ouderkirk et al. ........... 359/495 |
| 2001/0008700 A1 | 7/2001 | Jonza |
| 2001/0009714 A1 | 7/2001 | Wheatley et al. |
| 2001/0011779 A1 | 8/2001 | Stover |
| 2001/0013668 A1 | 8/2001 | Neavin et al. |
| 2001/0019182 A1 | 9/2001 | Hebrink et al. |
| 2002/0015836 A1 | 2/2002 | Jonza |
| 2002/0061393 A1 | 5/2002 | Jonza et al. |
| 2003/0003301 A1 | 1/2003 | Whitney et al. |
| 2003/0008144 A1 | 1/2003 | Whitney et al. |
| 2003/0035972 A1 | 2/2003 | Hanson et al. |
| 2003/0143424 A1 | 7/2003 | Steklenski et al. |
| 2004/0043205 A1 | 3/2004 | Jonza et al. |
| 2004/0126549 A1 | 7/2004 | Ruff et al. |
| 2004/0175552 A1 | 9/2004 | Ouderkirk et al. |
| 2004/0189907 A1 | 9/2004 | Tominaga et al. |
| 2005/0110175 A1 | 5/2005 | Stover |
| 2005/0122587 A1 | 6/2005 | Ouderkirk et al. |
| 2005/0161840 A1 | 7/2005 | Stover |
| 2005/0175827 A1 | 8/2005 | Hebrink et al. |
| 2006/0098284 A1 | 5/2006 | Aastuen et al. |
| 2006/0262400 A1 | 11/2006 | Ouderkirk et al. |
| 2009/0218707 A1 | 9/2009 | Stover et al. |

FOREIGN PATENT DOCUMENTS

| | | |
|---|---|---|
| CA | 578 035 | 6/1959 |
| CA | 724 101 | 12/1965 |
| CA | 1 200 357 | 2/1986 |
| CA | 1327286 | 3/1994 |
| DE | 24 35 807 | 2/1976 |
| DE | 41 21 861 | 1/1992 |
| EP | 0 056 843 | 8/1982 |
| EP | 0 062 751 | 10/1982 |
| EP | 0 138 194 | 4/1985 |
| EP | 0 228 611 | 7/1987 |
| EP | 0 269 324 | 6/1988 |
| EP | 0 167 721 | 10/1989 |
| EP | 0 342 283 | 11/1989 |
| EP | 0 342 747 | 11/1989 |
| EP | 404 463 | 12/1990 |
| EP | 0 422 661 | 4/1991 |
| EP | 426 636 | 5/1991 |
| EP | 460 241 | 12/1991 |
| EP | 469 732 | 2/1992 |

| | | |
|---|---|---|
| EP | 470 490 | 2/1992 |
| EP | 488 544 | 6/1992 |
| EP | 492 636 | 7/1992 |
| EP | 0 497 506 | 8/1992 |
| EP | 514 223 | 11/1992 |
| EP | 552 725 | 7/1993 |
| EP | 0 556 606 | 8/1993 |
| EP | 0 568 998 | 10/1993 |
| EP | 573 905 | 12/1993 |
| EP | 0 591 055 | 4/1994 |
| EP | 0 592 284 | 4/1994 |
| EP | 597 261 | 5/1994 |
| EP | 606 939 | 7/1994 |
| EP | 606 940 | 7/1994 |
| EP | 0 616 885 | 9/1994 |
| EP | 0 627 638 | 12/1994 |
| EP | 0 718 645 | 6/1996 |
| EP | 0 796 716 | 9/1997 |
| EP | 0 837 351 | 4/1998 |
| FR | 1 363 539 | 6/1963 |
| GB | 986042 | 3/1965 |
| GB | 1 015 706 | 1/1966 |
| GB | 1 125 709 | 8/1968 |
| GB | 1141981 | 2/1969 |
| GB | 2052779 | 1/1981 |
| GB | 2 124 403 | 2/1984 |
| GB | 2 144 760 | 3/1985 |
| GB | 2177814 | 1/1987 |
| GB | 2 232 498 | 12/1990 |
| JP | 52-047711 | 10/1975 |
| JP | 51-141593 | 12/1976 |
| JP | 53-106152 | 9/1978 |
| JP | 53-134858 | 11/1978 |
| JP | 59-220332 | 12/1984 |
| JP | 57-207204 | 10/1986 |
| JP | 61-241712 | 10/1986 |
| JP | 61-245104 | 10/1986 |
| JP | 62-295024 | 12/1987 |
| JP | 6-317023 | 1/1988 |
| JP | 63-017023 | 1/1988 |
| JP | 63-39294 | 2/1988 |
| JP | 63-55503 | 3/1988 |
| JP | 63-75704 | 4/1988 |
| JP | 63-168604 | 7/1988 |
| JP | 63 168626 | 7/1988 |
| JP | 63-180905 | 7/1988 |
| JP | 63-181201 | 7/1988 |
| JP | 63-208001 | 8/1988 |
| JP | 63-289070 | 11/1988 |
| JP | 64-11203 | 1/1989 |
| JP | 02-059702 | 2/1990 |
| JP | 2-0308106 | 12/1990 |
| JP | 3-21903 | 1/1991 |
| JP | 03-045906 | 2/1991 |
| JP | 3-120503 | 5/1991 |
| JP | 4-141603 | 5/1992 |
| JP | 04-184429 | * 7/1992 |
| JP | 4-268505 | 9/1992 |
| JP | 4-356038 | 9/1992 |
| JP | 04-278324 | 10/1992 |
| JP | 6-041335 | 3/1993 |
| JP | 05-107539 | 4/1993 |
| JP | 05-157915 | 6/1993 |
| JP | 05-196892 | 8/1993 |
| JP | 05-196940 | 8/1993 |
| JP | 05-083729 | 11/1993 |
| JP | 5-288910 | 11/1993 |
| JP | 6-11607 | 1/1994 |
| JP | 06-504008 | 5/1994 |
| JP | 6-222207 | 8/1994 |
| JP | 6-324333 | 11/1994 |
| JP | 07-006043 | 1/1995 |
| JP | 07-064085 | 3/1995 |
| JP | 7-159774 | 6/1995 |
| JP | 07-198915 | 8/1995 |
| JP | 07-333440 | 12/1995 |
| JP | 06-089464 | 3/1998 |
| JP | 2003-251675 | 9/2003 |
| NL | 162481 | 2/1970 |
| WO | 91/09719 | 7/1991 |
| WO | 92/11996 | 7/1992 |
| WO | 92/12857 | 8/1992 |
| WO | 92/22838 | 12/1992 |
| WO | 93/05434 | 3/1993 |
| WO | 93/16878 | 9/1993 |
| WO | 94/10589 | 5/1994 |
| WO | 94/11776 | 5/1994 |
| WO | 94/13478 | 6/1994 |
| WO | 94/23933 | 10/1994 |
| WO | 94/26512 | 11/1994 |
| WO | 94/29765 | 12/1994 |
| WO | 95/33223 | 5/1995 |
| WO | 95/17303 | 6/1995 |
| WO | 95/17609 | 6/1995 |
| WO | 95/17691 | 6/1995 |
| WO | 95/17692 | 6/1995 |
| WO | 95/17699 | 6/1995 |
| WO | 95/27919 | 10/1995 |
| WO | 96/18691 | 6/1996 |
| WO | 96/19347 | 6/1996 |
| WO | 96/31794 | 10/1996 |
| WO | 97/01440 | 1/1997 |
| WO | 97/01774 | 1/1997 |
| WO | 97/32226 | 9/1997 |
| WO | 97/36195 | 10/1997 |
| WO | 97/41484 | 11/1997 |
| WO | 98/04938 | 2/1998 |
| WO | 99/06203 | 2/1999 |
| WO | 99/36248 | 7/1999 |
| WO | 99/36262 | 7/1999 |
| WO | 99/34246 | 8/1999 |

OTHER PUBLICATIONS

3M IR Safelight Brochure, 1991.
3M IR Compatible Safelight Kit, "Instructions for Field Change", Instruction Sheet No. 78-8063 2625 8, Jan. 1989.
Alfrey, Jr. et al., "Physical Optics of Iridescent Multilayered Plastic Films", Polymer Engineering and Science, vol. 9, No. 6, pp. 400-404, Nov. 1969.
Azzam et al., Ellipsometry and Polarized Light, Ch. 4.7, pp. 340-352, and Table of Contents, North Holland Publishing Co., Amsterdam, 1977.
Baba et al., "Optical Anisotropy of stretched gold island films: experimental results", Optics Letters, vol. 17, No. 8, Apr. 15, 1992.
Boese, D. et al., "Chain Orientation and Anisotropies in Optical and Dielectric Properties in Thin Films of Stiff Polyimides", J. Poly Sci., Part B, 30:1321, 1992.
Guenter, R., "Modern Optics," John Wiley & Sons, Inc. pp. 529-530.
Hodgkinson et al., "Effective Principal Refractive Indices and Column Angles for Periodic Stacks of Thin Birefringent Films", Optical Society of America, vol. 10, No. 9, pp. 2065-2071, Sep. 1993.
IBM Technical Disclosure Bulletin, Polarized Backlight for Liquid Crystal Display, vol. 33, No. 18, Jun. 1990. pp. 143-144.
Im, J. et al., "Coextruded Microlayer Film and Sheet", Journal of Plastic Film and Sheeting, vol. 4, pp. 104-115, Apr. 1988.
Lewis, Richard J. Sr., Hawley's Condensed Chemical Dictionary, 12 Ed., Van Nostrand Reinhold, 1993, pp. 932, 934.
MacLeod, "Thin Film Optical Filters", Adam Hilger Ltd., London, 1969. pp. ix-x.
Scheirs et al., "Photo-oxidation of poly(butylene naphthalate)", Polymer Degradation and Stability 56, Elsevier Science Limited, 1997, Northern Ireland, pp. 351-356.
Scheirs et al., "Photo-oxidation and photolysis of poly(ethylene naphthalate)", Polymer Degradation and Stability 56, Elsevier Science Limited, 1997, Northern Ireland, pp. 339-350.

Schadt et al., "New Liquid Crystal Polarized Color Projection Principle", Japanese Journal of Applied Physics, vol. 29, No. 10, Oct. 1990, pp. 1974-1984.
Radford et al., "Reflectivity of Iridescent Coextruded Multilayered Plastic Films", Polymer Engineering and Science, vol. 13, No. 3, May 1973, Dow Chemical Company, American Chemical Society Symposium on Coextruded Plastic Films, Fibers, Composites, pp. 131-165, Apr. 9-14, 1972.
Schrenk et al., "Nanolayer Polymeric Optical Films", Tappi Journal, pp. 169-174, Jun. 1992.
Schrenk et al., "Coextruded Multilayer Polymer Films and Sheets", Ch. 15, Polymer Blends, vol. 2, No. 129, Table of Contents, pp. 131-165, Academic Press, Inc., 1978.
Schrenk et al., "Coextruded Elastomeric Optical Interference Films", SPE Annual Technical Conference, Atlanta, Georgia, 1703, 1988.
Schrenk et al., "Interfacial Flow Instability in Multilayer Coextrusion", Polymer Engineering and Science, vol. 18 No. 8, pp. 620-623, Jun. 1978.
Schrenk, W., "New Developments in Coextrusion", International Conference on Advances in Polymer Processing, New Orleans, Louisiana, Apr. 1991. pp. 46-56.
Schrenk et al., "Coextruded Iridescent Film", Tappi Paper Synthetics Conference, Atlanta, Georgia, pp. 141-145, Sep. 27-29, 1976.
Schrenk et al, Coextruded Infrared Reflecting Films, $7^{th}$ Annual Meeting Polymer Processing Society, Hamilton, Ontario, Canada, pp. 255-256, Apr. 1991.
Shurcliff, W. A., "Polarized Light: Production and Use", Table of Contents and Ch. 6, pp. 78-86, Harvard University Press, 1965.
Weber, M., "Retroreflecting Sheet Polarizer", SID 92 Digest, pp. 427-429, 1992.
Weber, M., "Retroreflecting Sheet Polarizer", SID 93 Digest, pp. 669-672, 1993.
Wu et al., "High Transparent Sheet Polarizer Made with Birefringent Materials", Japanese Journal of Applied Physics, vol. 34, part 2, No. 8A., pp. 997-999, Aug. 1995.
Zang, D.Y. et al, "Giant Anisotropies in the Dielectric Properties of Quasi-epitaxial Crystalline Organic Semiconductor Thin Films", Applied Physics Letters, 59;823, 1991.
Affidavit of Terence D. Neavin dated Feb. 17, 2004.
3M Innovation Vikuiti Dual Brightness Enhancement Film (DBEF) 3M IPC, © 2000, 2001.
Bird & Parrish, Jr., "The Wire Grid as a Near-Infared Polarizer," Journal of the Optical Society of America, vol. 50, No. 9, pp. 886-891, 1960.
Ferry, Visoelastic Properties of Polymers, John Wiley & Sons, New York, $2^{nd}$ Ed. 1970, pp. 314-318.
Kirk Othmer Encyclopedia of Chemical Technology, vol. 8, pp. 652-662 (4th Ed. 1993).
Rosenbluth et al., "Contrast Properties of Reflective Liquid Crystal Light Valves in Projection Displays", IBM Journal of Research and Development, Voluem 42, Issue 3-4, May/Jul. 1998, pp. 359-386.
Weber et al., "Giant Birefringent Optics in Multilayer Polymer Mirrors", Science, vol. 287, Mar. 31, 2000, pp. 2451-2456.
Pollock, et al., Interdiffusion in Microlayered Polymer Composites, 1994.
Smith et al., Optical Constants of Far Infrared Materials, 3, Plastics, Jun. 1975.
Born & Wolf, Principles of Optics, Electromagnetic Theory of Propagation, Internefnece and Diffraction of Light, pp. 61-63, Sixth Ed., Pergamon Press Oxford, 1980.
Czopek, The Mechanics of Making Mirrors, Dec. 1995.
Zeneca Specialist Colours, "Zeneca-Bringing Ideas to Life", Product Brochure 1995.
U.S. Appl. No. 09/103,270, entitled "Article for Selectively Redirecting Light", filed on Jun. 23, 1998.
U.S. Appl. No. 11/005,925, entitled "Multilayer Optical Films with Photographic Emulsion", filed on Dec. 6, 2004.
U.S. Appl. No. 08/807,268, entitled "Optical Fiber with Light Extractor", filed on Feb. 28, 1997.
U.S. Appl. No. 09/013,819, entitled "Optical Polarizer", filed on Jan. 27, 1998.
Bohn, "Refractive Indices of Polymers", Polymer Handbook, 2nd ed., vol. III; p. 241, 1974, John Wiley & Sons, New York.
Fabian et al., Near-Infrared Absorbing Dyes, American Chemical Society, Chemical Reviews, 1992, vol. 92, No. 6, pp. 1197-1226.
Heavens et al., "Staggered Broad-Band Reflecting Multilayers", Optical Society of America, (Reprinted from Applied Optics, vol. 5(3), 373-376 (Mar. 1966)), p. 321-324.
Kenedy, "Big Pane—No Gain" USGOpenings, US Glass, p. 54-57 (Jul. 1995).
Land, H., "Some Aspects of the Development of sheet Polarizers", Optical Society of America, (repr. Journal of the Optical Society of America, vol. 4(12) pp. 957-963, Dec. 1951) pp. 45-51.
Metal Dithiolene Dyes, 19 pages, Nov. 1991.
Mills, E., "Windows as Luminaries" IAEEL Newsletter, p. 11-13 (Mar./Apr. 1995).
Nickerson et al., A Psychological Color Solid* Journal of the Optical Society of America, vol. 33, No. 7, Jul. 1943.
Pince, Instructions for Field Change, Jan. 1989, Inst. Sheet 78-8063-2625-8.
Thelen, Multilayer Filters with Wide Transmittance Bands, Journal of The Optical Society of America, vol. 53, pp. 1266-1270, Nov. 1963.
Weber, "P-61 Retroreflecting Sheet Polarizer", SID Conference Proceedings, Boston, SID 93 Digest, pp. 669-672, May 1993.
Wust & Bogue, "Stress Optical Behavior in Polystyrene; Residual Stresses and Birefringences in Large, Quenched Samples", Journal of Applied Polymer Science, vol. 28, pp. 1931-1947, John Wiley & Sons Inc., 1983.
Alexander, *Colloid Chemistry*, Title page and table of contents, 1946.
U.S. Department of Commerce, National Technical Information Service, "Fenestration 2000—Phase II. Review of Advanced Glazing Technology and Study of Benefits for the UK. Final Report", 144 pages, Halcrow Gilbert Associates Limited, Burderop Park, Swindon, England, Reproduced by NTIS, Crown © 1992.
Hunter et al., *The Measurement of Appearance*, Title page and Table of Contents, John Wiley and Sons, New York 1987.
Judd & Kelly, "Method of Designating Colors", U.S. Department of Commerce, National Bureau of Standards, Part of Journal of Research of the National Bureau of Standards, vol. 23, pp. 355-385, Sep. 1939.
Kubota & Ose, "Further Study of Polarization and Interference Colors", Journal of the Optical Society of America, vol. 45, No. 2, pp. 89-97, Feb. 1955.
Kubota, "On the Interference Color of Thin Layers on Glass Surface", Journal of the Optical Society of America, vol. 40, No. 3, pp. 146-149, Mar. 1950.
Kubota, "On Hypersensitive Polarization Colors", Journal of the Optical Society of America, vol. 42, No. 2, Letters to the Editor, pp. 144-145, 1952.
Paint & Coatings Industry, Pigments, "Basic Optics and Pearlescent Pigments", pp. 28-34, Nov. 1989.

* cited by examiner

DISPLAY INCORPORATING REFLECTIVE POLARIZER

CROSS-REFERENCE TO RELATED APPLICATIONS

This is a continuation of U.S. patent application Ser. No. 11/669,666, filed Jan. 31, 2007 now abandoned, which is a continuation of U.S. patent application Ser. No. 11/566,276, filed Dec. 4, 2006 now abandoned, which is a continuation of U.S. patent application Ser. No. 10/930,988, filed Aug. 31, 2004, issued as U.S. Pat. No. 7,321,464, which is a divisional of U.S. patent application Ser. No. 09/626,938, filed Jul. 27, 2000, issued as U.S. Pat. No. 6,804,058, which is a continuation of U.S. patent application Ser. No. 09/103,270, filed Jun. 23, 1998 (now abandoned), which is a continuation of Ser. No. 08/402,349, filed Mar. 10, 1995, issued as U.S. Pat. No. 5,828,488, which is a continuation-in-part of U.S. patent application Ser. Nos. 08/360,204 and 08/359,436, both filed on Dec. 20, 1994 (now abandoned), which in turn are continuations-in-part of U.S. patent application Ser. Nos. 08/171,239 and 08/172,593, both filed on Dec. 21, 1993 (now abandoned).

TECHNICAL FIELD

The invention is an improved optical display.

BACKGROUND

Optical displays are widely used for lap-top computers, hand-held calculators, digital watches and the like. The familiar liquid crystal (LC) display is a common example of such an optical display. The conventional LC display locates a liquid crystal and an electrode matrix between a pair of absorptive polarizers. In the LC display, portions of the liquid crystal have their optical state altered by the application of an electric field. This process generates the contrast necessary to display "pixels" of information in polarized light.

For this reason the traditional LC display includes a front polarizer and a rear polarizer. Typically, these polarizers use dichroic dyes which absorb light of one polarization orientation more strongly than the orthogonal polarization orientation. In general, the transmission axis of the front polarizer is "crossed" with the transmission axis of the rear polarizer. The crossing angle can vary from zero degrees to ninety degrees. The liquid crystal, the front polarizer and rear polarizer together make up an LCD assembly.

LC displays can be classified based upon the source of illumination. "Reflective" displays are illuminated by ambient light that enters the display from the "front." Typically a brushed aluminum reflector is placed "behind" the LCD assembly. This reflective surface returns light to the LCD assembly while preserving the polarization orientation of the light incident on the reflective surface.

It is common to substitute a "backlight" assembly for the reflective brushed aluminum surface in applications where the intensity of the ambient light is insufficient for viewing. The typical backlight assembly includes an optical cavity and a lamp or other structure that generates light. Displays intended to be viewed under both ambient light and backlit conditions are called "transflective." One problem with transflective displays is that the typical backlight is not as efficient a reflector as the traditional brushed aluminum surface. Also the backlight randomizes the polarization of the light and further reduces the amount of light available to illuminate the LC display. Consequently, the addition of the backlight to the LC display makes the display less bright when viewed under ambient light.

Therefore, there is a need for a display which can develop adequate brightness and contrast under both ambient and backlight illumination.

SUMMARY

The optical display of the present invention comprises three basic elements. The first element is a reflective polarizer. This reflective polarizer is located between a liquid crystal display (LCD) assembly and an optical cavity, which comprise the second and third elements respectively.

BRIEF DESCRIPTION OF THE DRAWINGS

The drawings depict representative and illustrative implementations of the invention. Identical reference numerals refer to identical structure throughout the several figures, wherein.

DETAILED DESCRIPTION

Figure 1:
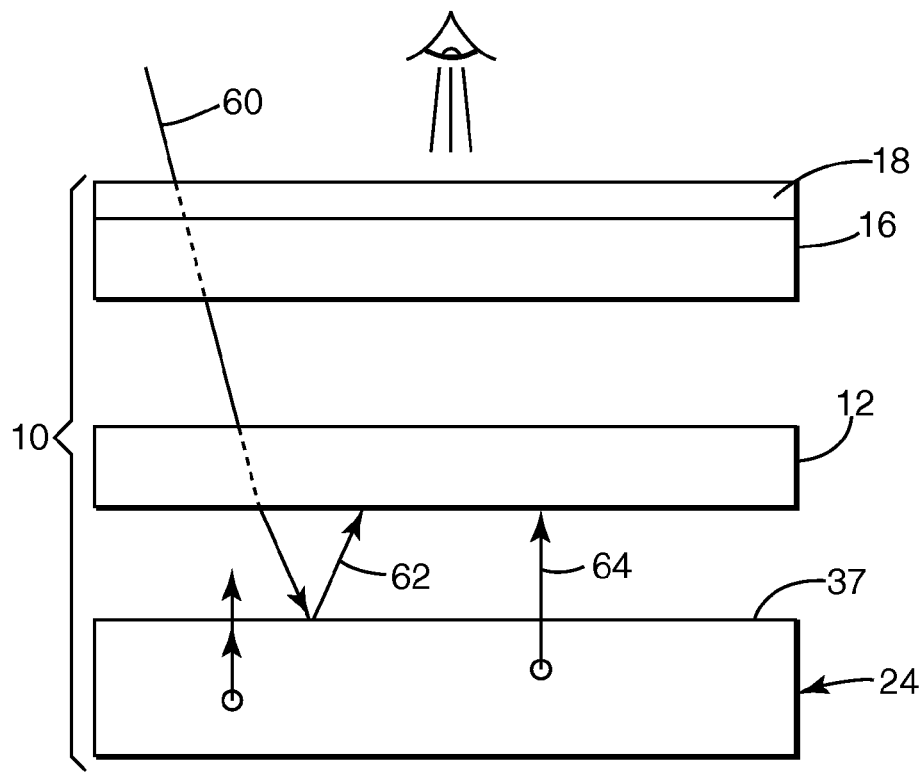
FIG. 1 is a schematic cross section of an optical display according to the invention.

FIG. 1 is a schematic diagram of an illustrative optical display 10 that includes three principle components. These include the polarizing display module shown as LCD assembly 16, a reflective polarizer 12, and an optical cavity 24.

The LCD assembly 16 shown in this figure is illuminated by polarized light provided by the reflective polarizer 12 and the optical cavity 24.

Ambient light incident on the display 10, depicted by ray 60 traverses the LCD module 16, the reflective polarizer 12 and strikes the diffuse reflective surface 37 of the optical cavity 24. Ray 62 depicts this light as it is reflected by the diffusely reflective surface 37 toward the reflective polarizer 12.

Light originating from within the optical cavity 24 is depicted by ray 64. This light is also directed toward the reflective polarizer 12 and passes through the diffusely reflective surface 37. Both ray 62 and ray 64 have light exhibiting both polarization states (a,b).

Figure 2:
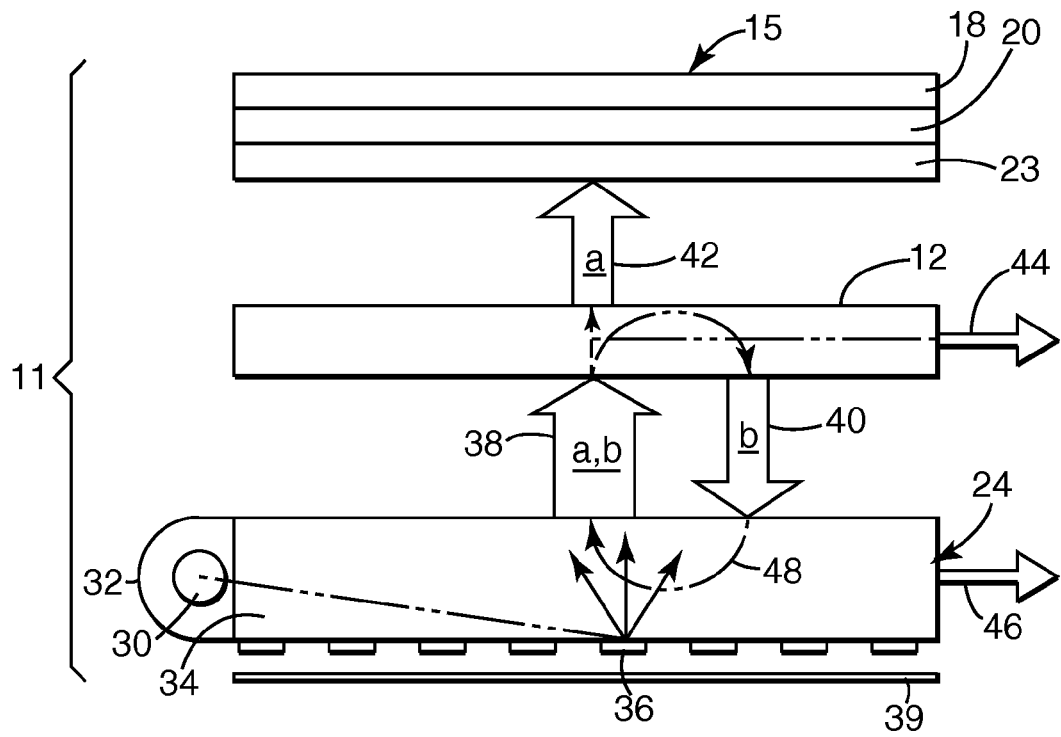
FIG. 2 is a schematic cross section of an illustrative optical display according to the invention.

FIG. 2 shows a schematic optical display 11 illustrated with a three layer LCD assembly 15 that includes a front polarizer 18, a liquid crystal 20 and a rear polarizer 23. In this embodiment the optical cavity 24 is an edge lit backlight which includes a lamp 30 in a reflective lamp housing 32. Light from the lamp 30 is coupled to the light guide 34 where it propagates until it encounters a diffuse reflective structure such as spot 36. This discontinuous array of spots is arranged to extract lamp light and direct it toward the LCD module 15. Ambient light entering the optical cavity 24 may strike a spot or it may escape from the light guide through the interstitial areas between spots. The diffusely reflective layer 39 is positioned below the light guide 34 to intercept and reflect such rays. In general, all the rays that emerge from the optical cavity 24 are illustrated by ray bundle 38. This ray bundle is incident on the reflective polarizer 12 which transmits light having a first polarization orientation referred to as "(a)" and effectively reflects light having the orthogonal polarization orientation (b). Consequently, a certain amount of light, depicted by ray bundle 42, will be transmitted by the reflective polarizer 12 while a substantial amount of the remaining light will be reflected as indicated by ray bundle 40. The preferred reflective polarizer material is highly efficient and the total losses due to absorption within the reflective polarizer 12 are very low (on the order of 1 percent). This lost light is depicted by ray bundle 44. The light having polarization state (b) reflected by the reflective polarizer 12 reenters the optical cavity 24 where it strikes the diffusely reflective structures such as spot 36 or the diffusely reflective layer 39. The diffusely reflective surfaces serve to randomize the polarization state of the light reflected by the optical cavity 24. This recirculation and randomization process is depicted as path 48. The optical cavity 24 is not a perfect reflector and the light losses in the cavity due to scattering and absorption are depicted by ray bundle 46. These losses are also low (on the order of 20 percent). The multiple recirculations effected by the combination of the optical cavity 24 and the reflective polarizer 12 form an efficient mechanism for converting light from state (b) to state (a) for ultimate transmission to the viewer.

The effectiveness of this process relies on the low absorption exhibited by the reflective polarizer disclosed herein and the high reflectivity and randomizing properties exhibited by many diffusely reflective surfaces. In FIG. 2 both the discontinuous layer depicted by spot 36 and the diffusely reflective continuous layer 39 may be formed of a titanium oxide pigmented material. It should be appreciated that a diffuse reflective surface 37 (shown in FIG. 1) can be formed of transparent surface textured polycarbonate. This material could be placed above the light guide 34 to randomize incident light in the configuration shown in FIG. 2. The specific and optimal configuration will depend on the particular application for the completed optical display.

In general, the gain of the system is dependent on the efficiency of both the reflective polarizer body 12 and the optical cavity 24. Performance is maximized with a highly reflective optical cavity 24 consistent with the requirement of randomization of the polarization of incident light, and a very low loss reflective polarizer 12.

Figure 3:
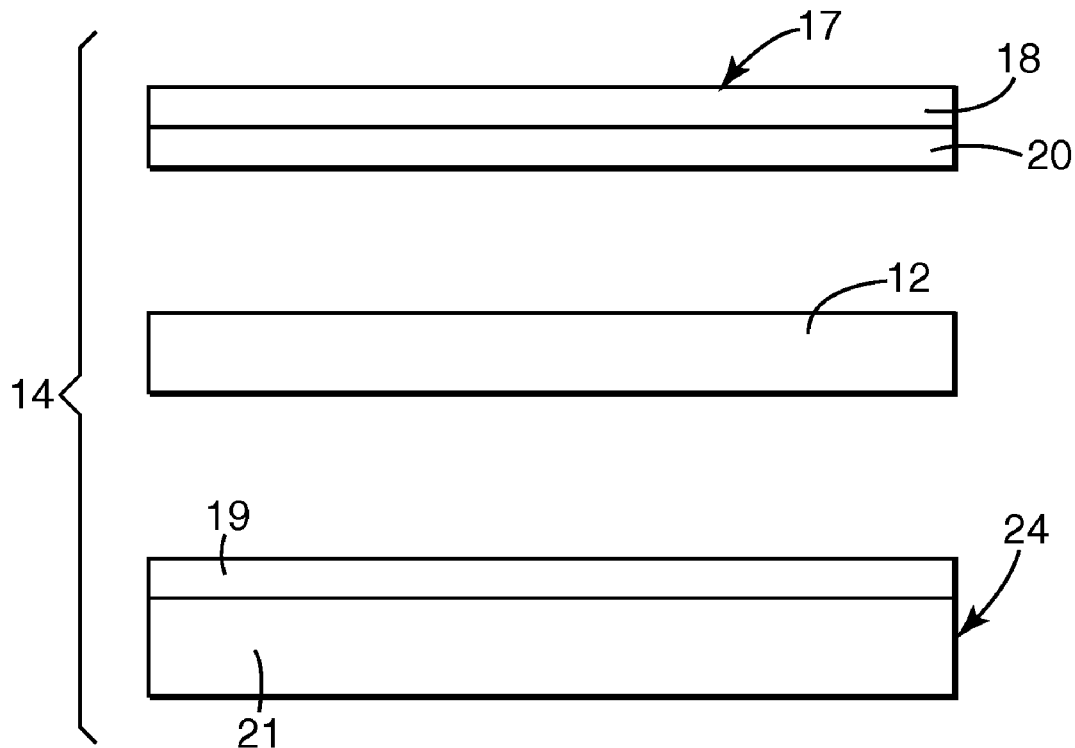
FIG. 3 is a schematic cross section of an illustrative optical display according to the invention.

FIG. 3 shows a schematic optical display 14 illustrated with a two layer LCD assembly 17 that includes a front polarizer 18 and a liquid crystal 20. In this embodiment the optical cavity 24 includes an electroluminescent panel 21. The traditional electroluminescent panel 21 is coated with a phosphor material 19 that generates light when struck by electrons and that is also diffusely reflective when struck by incident light. Usually, electroluminescent displays are "grainy" because of the variations in efficiencies associated with the phosphor coating. However, light returned by the reflective polarizer 12 has a tendency to "homogenize" the light emissions and improve overall uniformity of illumination exhibited by the optical display 14. In the illustrative optical display 14 the LCD assembly 17 lacks a rear polarizer. In this optical display 14 the reflective polarizer 12 performs the function normally associated with the rear polarizer 23 shown in optical display 11 in FIG. 2.

Figure 4:
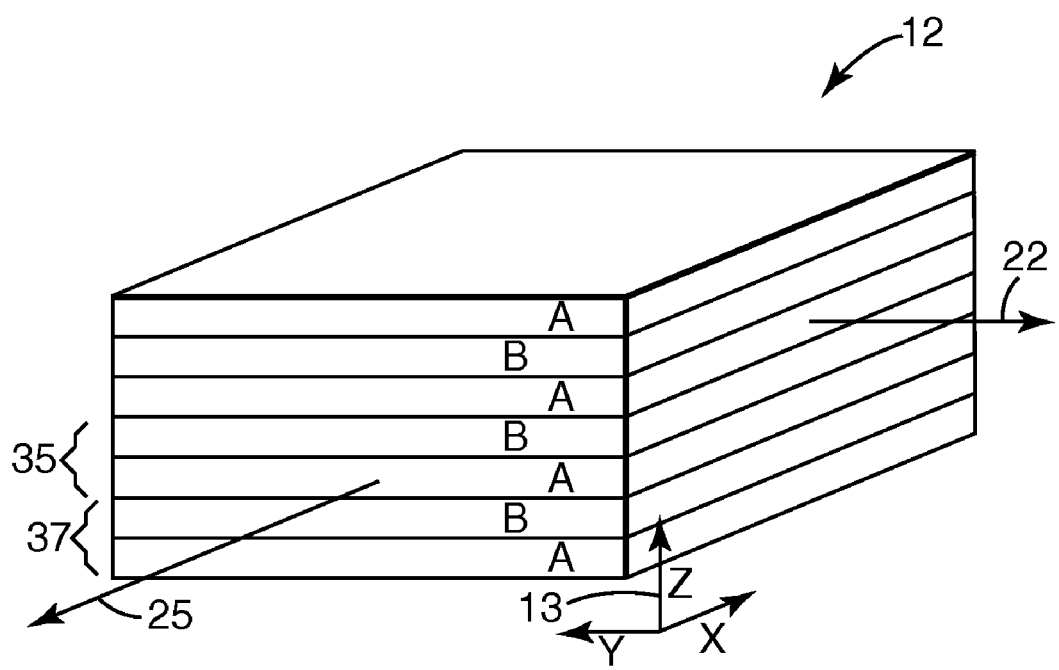
FIG. 4 is an exaggerated cross sectional view of the reflective polarizer of the invention.

FIG. 4 is a schematic perspective diagram of a segment of the reflective polarizer 12. The figure includes a coordinate system 13 that defines X, Y and Z directions that are referred to in the description of the reflective polarizer 12.

The illustrative reflective polarizer 12 is made of alternating layers (ABABA . . . ) of two different polymeric materials. These are referred to as material "(A)" and material "(B)" throughout the drawings and description. The two materials are extruded together and the resulting multiple layer (ABABA . . . ) material is stretched (5:1) along one axis (X), and is not stretched appreciably (1:1) along the other axis (Y). The X axis is referred to as the "stretched" direction while the Y axis is referred to as the "transverse" direction.

The (B) material has a nominal index of refraction (n=1.64 for example) which is not substantially altered by the stretching process.

The (A) material has the property of having the index of refraction altered by the stretching process. For example, a uniaxially stretched sheet of the (A) material will have one index of refraction (n=1.88 for example) associated with the stretched direction and a different index of refraction (n=1.64 for example) associated with the transverse direction. By way of definition, the index of refraction associated with an in-plane axis (an axis parallel to the surface of the film) is the effective index of refraction for plane-polarized incident light whose plane of polarization is parallel to that axis.

Thus, after stretching the multiple layer stack (ABABA . . . ) of material shows a large refractive index difference between layers (delta n=1.88-1.64=0.24) associated with the stretched direction. While in the transverse direction, the associated indices of refraction between layers are essentially the same (delta n=1.64-1.64=0.0). These optical characteristics cause the multiple layer laminate to act as a reflecting polarizer that will transmit the polarization component of the incident light that is correctly oriented with respect to the axis 22. This axis is defined as the transmission axis 22 and is shown in FIG. 4. The light which emerges from the reflective polarizer 12 is referred to as having a first polarization orientation (a).

The light that does not pass through the reflective polarizer 12 has a polarization orientation (b) that differs from the first orientation (a). Light exhibiting this polarization orientation (b) will encounter the index differences which result in reflection of this light. This defines a so-called "extinction" axis shown as axis 25 in FIG. 4. In this fashion the reflective polarizer 12 transmits light having a selected polarization (a) and reflects light having the polarization (b).

Although the reflective polarizer 12 has been discussed with an exemplary multiple layer construction which includes alternating layers of only two materials it should be understood that the reflective polarizer 12 may take a number of forms. For example, additional types of layers may be included into the multiple layer construction. Also in a limiting case, the reflective polarizer may include a single pair of layers (AB) one of which is stretched. Furthermore, a dichroic polarizer could be bonded directly to reflective polarizer 12.

Figure 5:
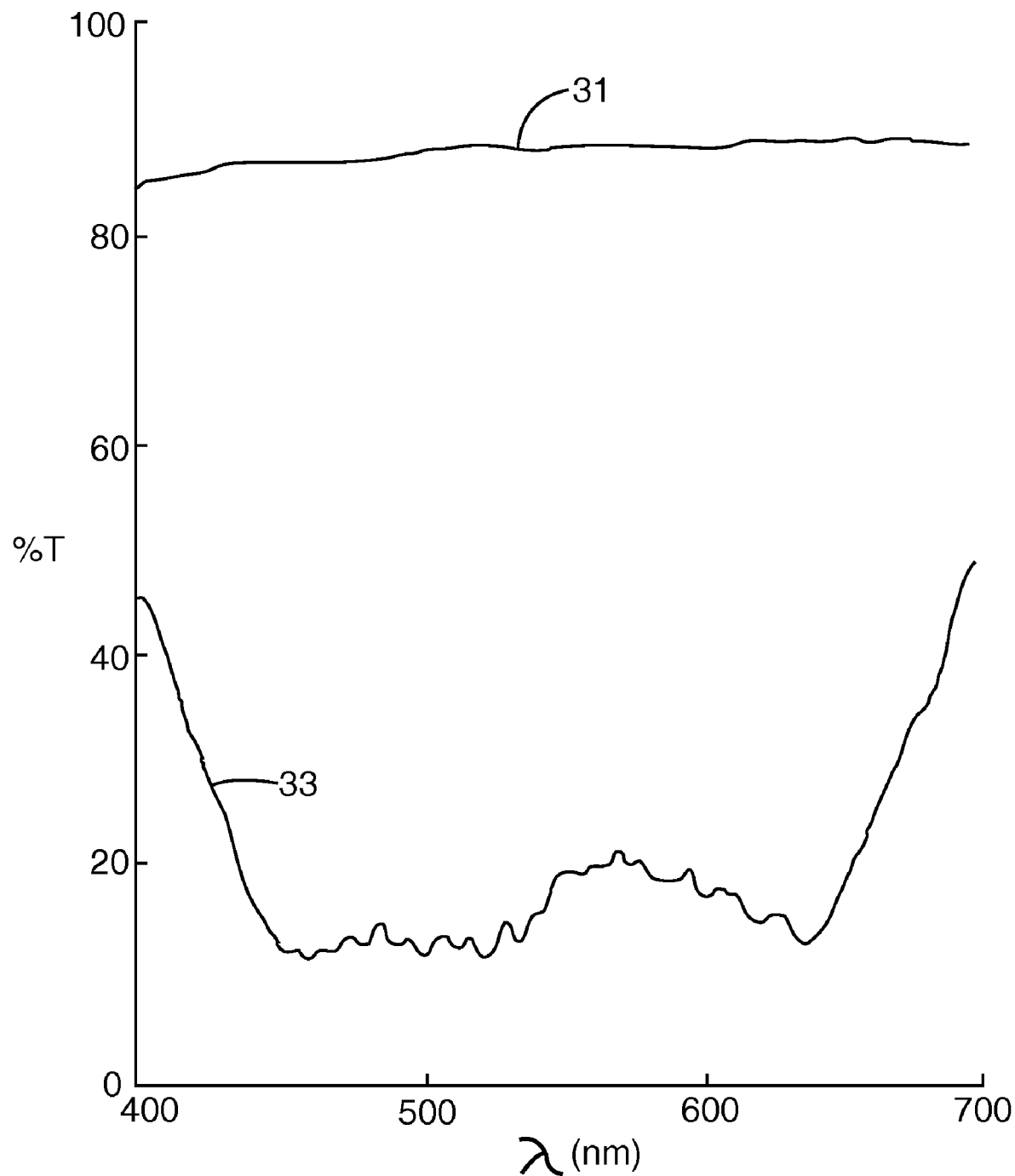
FIG. 5 shows the optical performance of the multilayer reflective polarizer of Example 2.

Another important property of the optical cavity 24 is the fact that polarization randomization process associated with the cavity will also alter the direction of the incident light. In general, a significant amount of light exits the optical cavity off-axis. Consequently, the path of such light in the reflective polarizer is longer than the path length for near normal light. This effect must be addressed to optimize the optical performance of the system. The reflective polarizer body 12 described in the example is capable of broadband transmission into the longer wavelengths which is desirable to accommodate off-axis rays. FIG. 5 shows trace 31 which indicates a transmissivity of over 80 percent over a wide range of wavelengths. Trace 33 shows efficient broadband reflectively over a large portion of the visible spectrum. The optimal reflectivity trace would extend into the infrared and extend from approximately 400 nm to approximately 800 nm.

Figure 6:
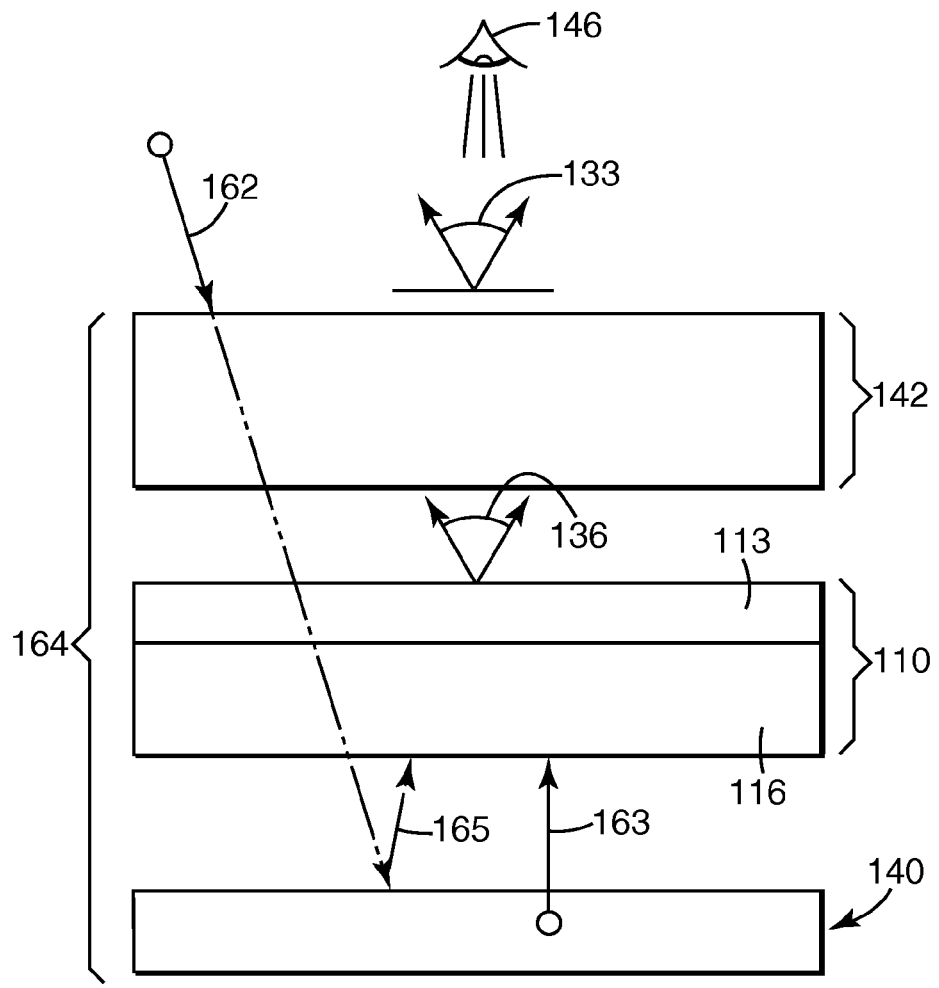
FIG. 6 is a schematic diagram of an optical display according to the invention with brightness enhancement.

In another embodiment, the apparent brightness of the display may be increased by the use of a brightness enhancement film. FIG. 6 shows an optical display 164 which has three primary components. These are the optical display module 142, the brightness enhanced reflective polarizer 110 and the optical cavity 140. Typically the complete optical display 164 will be planar and rectangular in plan view as seen by observer 146 and will be relatively thin in cross section with the three primary components in close proximity to each other.

In use, the display module 142 is illuminated by light processed by the brightness enhanced reflective polarizer 110 and the optical cavity 140. Together these two components direct polarized light into a viewing zone 136 shown schematically as an angle. This light is directed through the display module 142 toward the observer 146. The display module 142 will typically display information as pixels. Polarized light transmission through a pixel is modulated by electrical control of the birefringence of the liquid crystal material. This modulates the polarization state of the light, affecting its relative absorption by a second polarizer layer that forms a part of the display module 142.

There are two sources for illumination shown in the figure. The first is ambient light depicted by ray 162. This light passes through the display module 142 and brightness enhanced reflective polarizer 110 and is incident on the optical cavity 140. The optical cavity reflects this light as indicated by ray 165. The second source of light may be generated within the optical cavity itself as depicted by ray 163. If the optical cavity 140 is a backlight then the principal source of illumination originates within the optical cavity 140 and the optical display is referred to as "backlit." If the principal source of illumination is ambient light represented by ray 162 and ray 165 then the optical display is called "reflective" or "passive." If the display is to be viewed under both ambient and cavity generated light the display is called "transflective." The present invention is useful in each of these display types.

Regardless of the origin of the light, the brightness enhanced reflective polarizer 110 and the optical cavity 140 cooperate together to "recirculate" light so that the maximum amount of light is properly polarized and confined to the viewing zone 136.

In general, the brightness enhanced reflective polarizer 110 includes two elements. The first is a reflective polarizer body 116 that transmits light of a particular polarization to the viewing zone 136. The second element is the optically structured layer 113 that defines the boundaries of the viewing zone 136.

The optical cavity 140 serves several functions but with respect to its interaction with the brightness enhanced reflective polarizer 110, the important parameters are a high reflectance value with respect to incident light and the ability of the optical cavity 40 to alter both the direction and the polarization of the incident light. Conventional optical cavities meet these requirements.

For any optical system, the sum of the reflectivity, losses and transmissivity must equal 100 percent of the light. Absorbance can be a major source of such losses. In the present invention the brightness enhanced reflective polarizer 110 has a very low absorbance and high reflectivity to certain light. Consequently light that is not passed directly into the viewing zone 136 is efficiently transferred to the optical cavity 140 where it is altered and may emerge from the cavity with the proper attributes to contribute to the light in the viewing zone 136.

In the context of the optical display 164 the overall gain of the system depends on the product of the reflectivity of the optical cavity 140 and the reflectivity of the brightness enhanced reflective polarizer 110. The invention is most effective when used with a low absorption optical cavity that has a high reflectivity rear surface consistent with its ability to alter the direction and polarization state of the incident light from the brightness enhanced reflective polarizer 110. For these purposes it should be noted that the optical cavity could be filled with a transparent dielectric material such as an acrylic.

Although the preferred structured surface 112 functions as a geometric optic it is well known that diffractive or holographic optical elements may be designed to effectively mimic the light directing qualities exhibited by geometric optics. Therefore the term structured surface 112 should be understood to describe both geometric and diffractive optical systems that confine light to a relatively narrow viewing zone 136.

Figure 7:
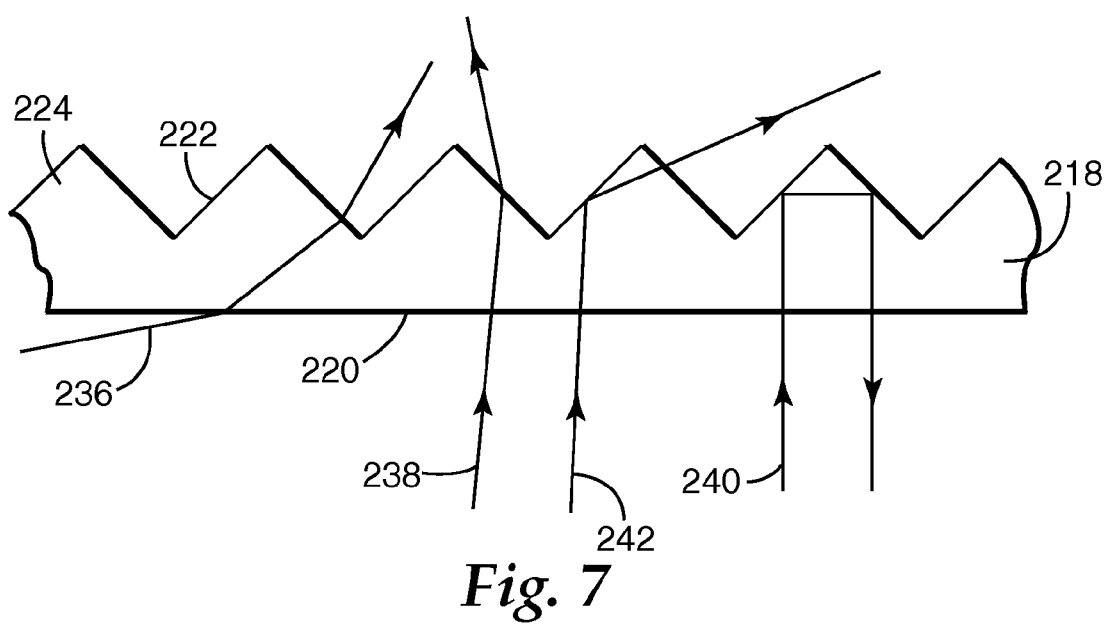
FIG. 7 is a diagram illustrating the operation of a brightness enhancer.

FIG. 7 is an enlargement of structured surface material that will act as a brightness enhancer in the present invention. As described previously, structured surface material 218 has a smooth side 220 and a structured side 222. Structured side 222, in the preferred embodiment, includes a plurality of triangular prisms. In the preferred embodiment, such prisms are right isosceles prisms, although prisms having peak angles in the range of 70 degrees to 110 degrees will work with varying degrees of effectiveness with the invention. Structured surface material 218 may be of any transparent material having an index of refraction greater than that of air, but, in general, the materials with higher indices of refraction will produce better results. Polycarbonate, which has an index of refraction of 1.586, has proven to work very effectively. For purposes of description of the invention, the prisms on structured surface 222 will be assumed to have included angles of 90 degrees and structured surface material 218 will be assumed to be of polycarbonate. Alternatively other structured surface materials may be used. Symmetric cube corner sheeting has been shown to produce excellent results.

Figure 8:
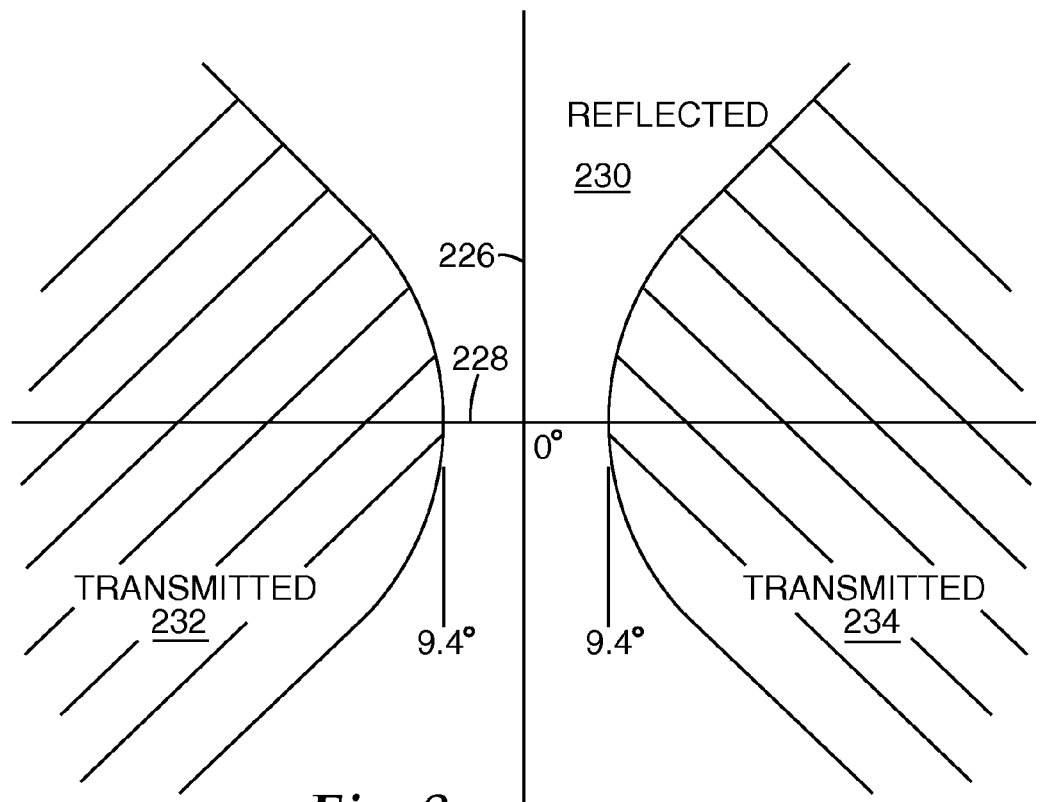
FIG. 8 is a graph illustrating the operation of a brightness enhancer.

FIG. 8 illustrates the operation of structured surface material 218. FIG. 8 is a graph having two axes 226 and 228. These axes represent the angle that a light ray makes to a normal to smooth surface 220. Specifically, axis 226 represents the angle that the light ray makes when the direction of the light ray is projected into a plane parallel to the linear extent of the structures on structured surface 222. Similarly axis 228 represents the angle that the light ray makes to a normal to smooth surface 220 when the direction of the light ray is projected into a plane perpendicular to the linear extent of the structures on structured surface 222. Thus a light ray striking perpendicular to smooth surface 220 would be represented by the origin, labeled 0 degrees, of the graph of FIG. 8. As may be seen, FIG. 8 is divided into regions 230, 232, and 234. Light striking at angles that fall within region 230 will enter structured surface material 218 but be totally internally reflected by structured surface 222 so that they pass through smooth surface 220 a second time and reenter the optical cavity. Light rays striking smooth surface 220 at an angle such that they fall in region 232 or 234 will be transmitted but refracted to a different angle with respect to the normal. As may be seen from FIG. 8, which represents the performance of polycarbonate, any light ray striking smooth surface 220 at an angle of less than 9.4 degrees to the normal, will be reflected.

Returning to FIG. 7, four exemplary light rays are shown. The first, light ray 236, approaches smooth surface 220 at a grazing angle, i.e., an angle to the normal approaching 90 degrees. If light ray 236 makes an angle of 89.9 degrees to the normal to surface 220 when it strikes structured surface material 218, it will be refracted such that it makes an angle of 39.1 degrees to the normal as it travels through structured surface material 218. Upon reaching structured surface 222, it will be refracted again. Because of the structures on structured surface 222, it will be refracted so that again it will make a smaller angle to the normal to structured surface 220. In the example it will make an angle of 35.6 degrees.

Light ray 238 approaches smooth surface 220 at an angle much closer to the cut off angle. It also is refracted as it passes through smooth surface 220, but to a lesser extent. If light ray 238 approaches smooth surface 220 at an angle of 10 degrees to the normal to smooth surface 220, it will emerge from structured surface 222 at an angle of 37.7 degrees to the normal to smooth surface 220 but on the opposite side of that normal.

Light ray 240 approaches at an angle less than the cut off angle and is totally internally reflected twice by structured surface 222 and returned to the interior of the optical cavity.

Finally, light ray 242 approaches smooth surface 220 at an angle similar to that of light ray 238, but in a location such that it is totally internally reflected by one side of a prism on structured surface 222 but not by the second side. As a result it emerges at a large angle to the normal to smooth surface 220. Because such a reflection only occurs to a light ray that is travelling in a direction that forms a high incidence angle to the side it strikes, the prisms provide a very small cross section to such rays. In addition many of those rays will reenter the next prism and be returned into display 210.

A fifth class of light ray is not shown in FIG. 7. This is the set of light rays that are reflected by smooth surface 220 and do not enter structured surface material 218. Such light rays simply join the others that are reflected back into the optical cavity. As may be seen from this discussion, light that, absent structured surface material 218, would have emerged from the display at a high angle to the axis of the display, where the axis of the display is taken to be the normal to smooth surface 220, is redirected into a direction closer to that axis. A small amount of light will be directed out at a large angle to the axis. Thus, we may say that light that enters structured surface material 218 through smooth surface 220 with an angle of incidence greater than a predetermined angle is directed into an output wedge that is narrower than the input wedge and the majority of the light that enters structured surface material 18 through smooth surface 220 at an angle of incidence of less than that predetermined angle will be reflected back into the optical cavity.

The light that is reflected back into the optical cavity will strike the diffuse reflector. The reflected light will travel back to structured surface material 218, in general making a different angle than it made the first time. The process is then repeated so that more of the light is redirected into the smaller wedge. The key aspect of the invention is that structured surface material 218 must be capable of reflecting light striking it in a first predetermined group of angles and passing, but refracting, light striking it in a second predetermined group of angles wherein the angles in the second group of angles are greater than those in the first group of angles and wherein the light in the second group of angles is refracted into an output wedge that is narrower than its input wedge. In this description the first and second groups of angles are relative to an axis of the display perpendicular to the display surface, i.e. the liquid crystal.

Figure 9:
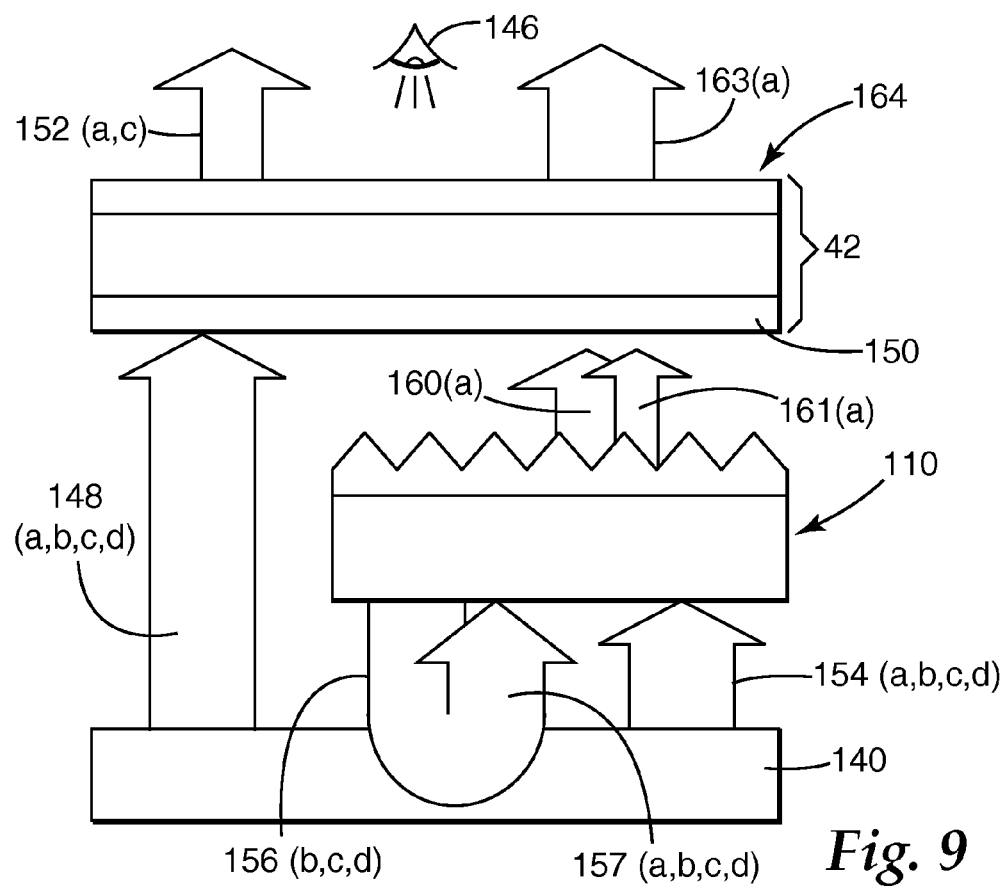
FIG. 9 is a schematic cross section of an illustrative optical display.

FIG. 9 shows a portion of the schematic optical display 164 without the brightness enhanced reflective polarizer 110 material to permit a comparison of performance without the brightness enhanced reflective polarizer 110. In general, the light emerging from a unit area of the optical cavity 140 depicted by ray bundle 148 will be randomly polarized and have optical states (a), (b), (c), and (d) present. Approximately half of this light, light of states (b) and (d), are absorbed by the dichroic absorptive polarizer 150 that forms a part of the display module 142. The remainder of the light, states (a) and (c), are passed through the dichroic absorptive polarizer 150. The light emerging from the display module 142, depicted by ray bundle 152, thus contains light of states (a) and (c). Although the light of state (a) is directed toward the observer 146, the light of state (c) is not. The remainder of the light having states (b) and (d) will be absorbed by the dichroic absorptive polarizer 150. Thus, only approximately one quarter of the light provided by optical cavity 140 actually contributes to the brightness of the display as viewed by observer 146.

The brightness enhanced reflective polarizer operates to make more efficient use of the light made available by optical cavity 140. If the same unit amount of light, depicted by ray bundle 154, is directed to the brightness enhanced reflective polarizer 110, approximately a quarter of the light (light of state (a)) will pass through the brightness enhanced reflective polarizer 110 on the first pass. This light will have the correct polarization to match the transmission axis of the dichroic absorptive polarizer 150, and is depicted as ray bundle 161. However the remaining light having states (b), (c), and (d) will be reflected back into the optical cavity by the brightness enhanced reflective polarizer 110. Some portion of this light will be randomized in terms of direction and polarization to state (a) by the optical cavity 140. Thus, this light will emerge from the optical cavity with states (a), (b), (c), and (d) as indicted by ray bundle 157. The recirculated light of state (a) will then be added to the originally transmitted light as depicted by ray bundle 160. Thus, the total amount of light depicted by ray bundle 160 and ray bundle 161 is increased by "recirculation." Because only light of the correct polarization to match the transmission axis of the dichroic absorptive polarizer 150 (state (a)) is passed through the brightness enhanced reflective polarizer 110, much more of the light emitted from the display, depicted by ray bundle 63, is directed toward the observer 146. In addition, because light of states (b) and (d) is reflected by the brightness enhanced reflective polarizer 110, very little is absorbed by the dichroic absorptive polarizer 150. The result is a display in which the amount of light emerging from the display, depicted by ray bundle 163, may be 70 percent brighter than the amount of light indicated by ray bundle 152.

Figure 10:
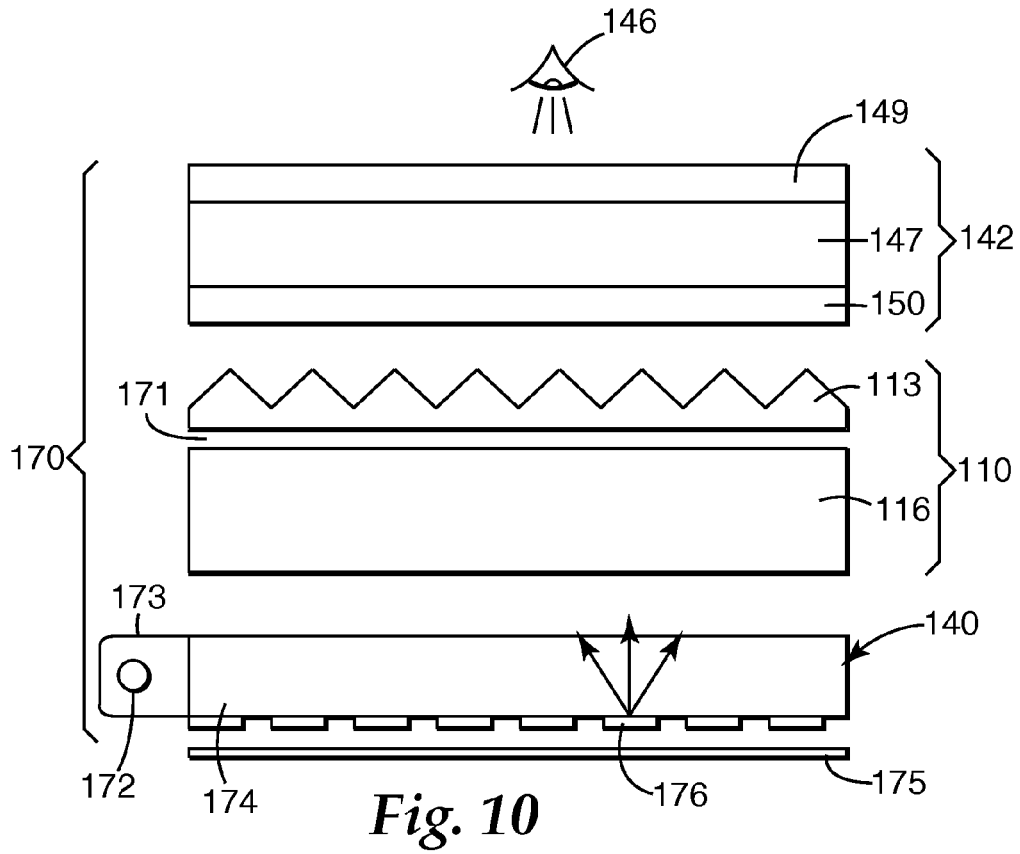
FIG. 10 is a schematic cross section of an illustrative optical display.

FIG. 10 shows an optical display 170. The optical display module 142 includes a liquid crystal matrix 147 placed between a front polarizer 149 and a rear polarizer 150. In this embodiment the optically structured layer 113 is separated from the reflective polarizer body 116 by gap 171. The gap 171 introduces reflections for state (a) light rays which are not desirable. In the display 170 the optical cavity 140 is a backlight which includes a lamp 172 within a lamp reflector 173. Light from the lamp 172 enters the light guide 174 and travels until it strikes a diffuse reflective surface such as spot 176. Although a discontinuous array of such spots is required to effectively extract light from the light guide 174, the intermittent surface may not be sufficient to fully recirculate light. Therefore it is preferred to place a continuous diffuse reflective surface 175 below the discontinuous surface to aid in the recirculation process.

Figure 11:
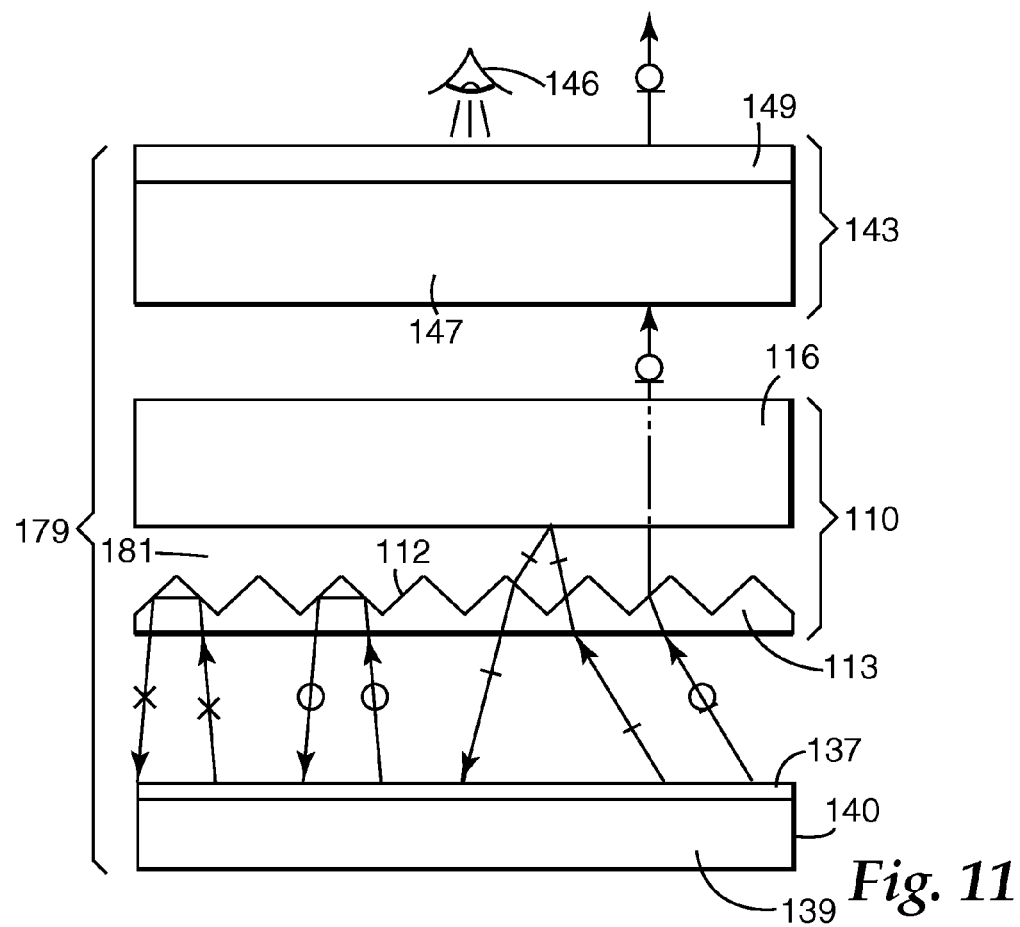
FIG. 11 is a schematic cross section of an illustrative optical display.

FIG. 11 shows an optical display 179 where the optically structured layer 113 and structured surface 112 is a separate element proximate but not directly applied to the reflective polarizer body 116. Together these two components along with the gap 181 make up the brightness enhanced reflective polarizer 110. In use, the optical cavity 140 will provide light for the display and will also act to reorient the polarization and direction of light returned from the brightness enhanced reflective polarizer 110. The optical cavity 140 includes an electroluminescent panel 139 having a phosphor coating which acts as a diffuse reflective surface 137. One difference between this embodiment of the brightness enhanced reflective polarizer 110 and that of FIG. 10 is that light approaching the structured surface 112 at an angle greater than the critical angle 134 is returned to the optical cavity by total internal reflection regardless of its state of polarization. Another difference is that the light transmitted by optically structured layer 113 passes through the reflective polarizer body 116 at near normal angles. A further difference relates to the presence of a front polarizer 149 and the absence of a rear polarizer in the display module 143. In embodiments where the backlight is the dominant source of light, adequate contrast can be achieved without the use of an absorptive polarizer juxtaposed next to the brightness enhanced reflective polarizer.

Figure 12:
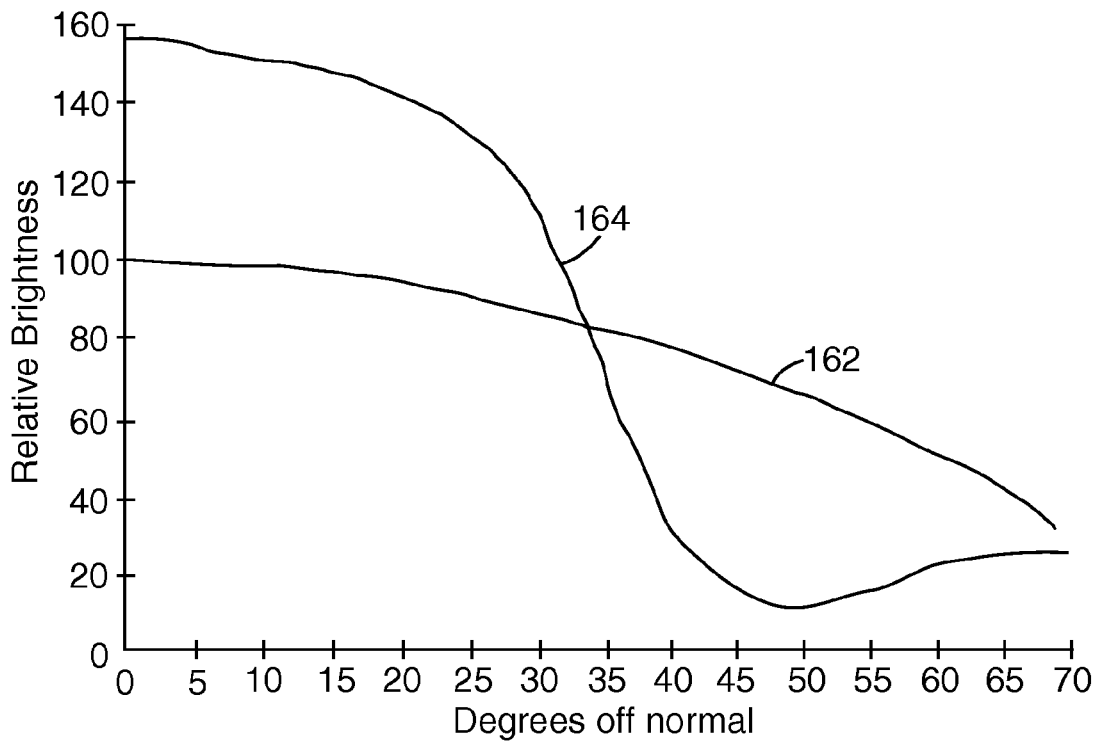
FIG. 12 is a graph of test results.

FIG. 12 shows test results of a sample of brightness enhanced reflective polarizer material taken with a standard electroluminescent backlight. The electroluminescent backlight met the requirements set forth above for the optical cavity in terms of randomizing the direction and the polarization orientation of incident light. To provide a basis for comparison, curve 162 shows light transmission for a display having only a dichroic polarizer alone without a brightness enhancement reflective polarizer body. Curve 164 represents the intensity of light versus the angular distribution of light for the Y-Z plane of a display which includes a brightness enhanced reflective polarizer body in a configuration with the reflective polarizer body and structured surface as proximate layers, such as that shown and described above with respect to FIG. 12. Curve 164 shows that an on-axis brightness increase of about sixty percent as compared to the dichroic polarizer alone is achieved. Also, a brightness decrease of about 50 percent is observed at 60 degrees off-axis.

In yet another example, using a standard backlight, a brightness increase of 100 percent over a dichroic polarizer alone was measured along the display normal to the viewing surface with a brightness enhanced reflective polarizer with the reflective polarizer body and structured surface as proximate layers such as shown and described above with respect to FIG. 11. The reflective polarizer alone yielded a brightness increase of 30 percent, while the structured surface alone yielded a brightness increase of 70 percent, thus resulting in a total brightness increase of 100 percent for on-axis viewing.

The difference in brightness increase between these two examples is largely due to the different optical cavities used. The curve of FIG. 12 was taken with an electroluminescent backlight, while the latter example was taken with a standard backlight. The reflectance and losses of each type of optical cavity effects the overall brightness increase that can be achieved.

Figure 13:
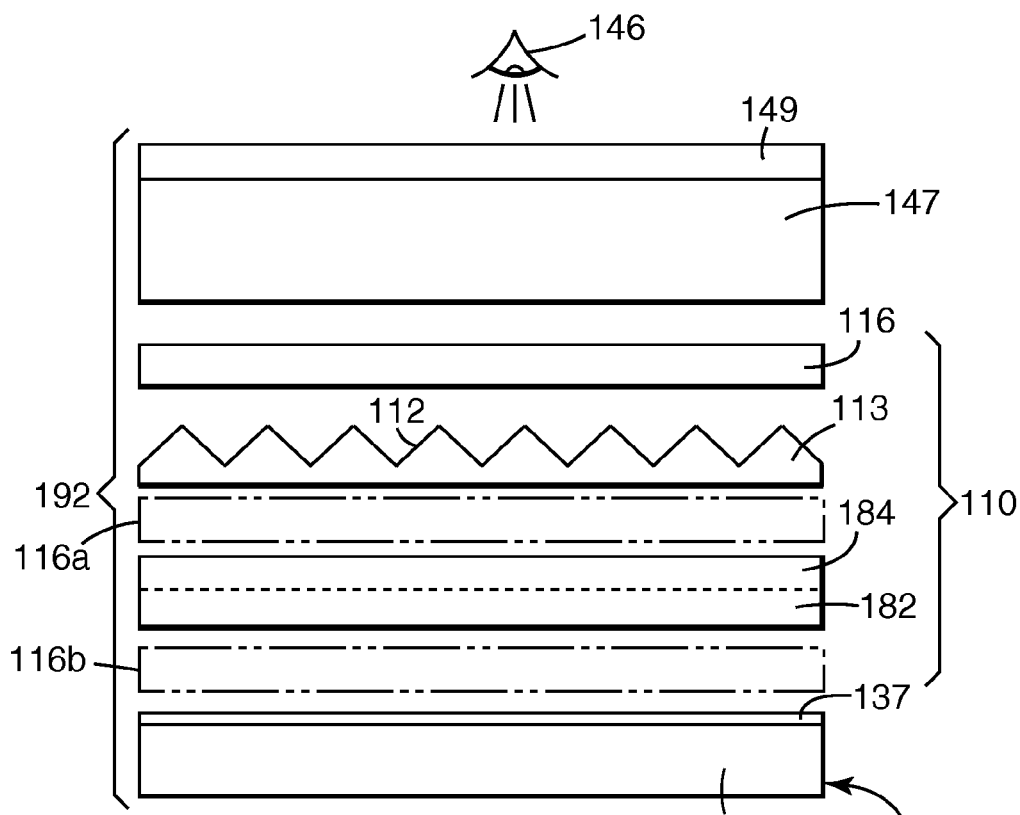
FIG. 13 is a schematic cross section of an illustrative optical display.

Two dimensional control of the rays exiting the brightness enhanced reflective polarizer body can be achieved using the alternate preferred display configuration 192 shown in FIG. 13. There, two optically structured layers 113 and 182, each having a structured surface 112 and 184, respectively, are proximate to each other and to a reflective polarizer body 116. These three elements comprise the brightness enhanced reflective polarizer body 110. Although in FIG. 13 the two optically structured layers are shown below the reflective polarizer body 116, it shall be understood that the reflective polarizer body 116 could also be placed between or below the optically structured layers 112 and 182 without departing from the scope of the present invention. Two dimensional control is achieved by crossing the axes of orientation of the structured surfaces 112 and 184. The axes may be oriented at 90 degrees or at some other angle greater than 90 degrees depending upon the display application and associated polarization requirements.

In operation, the first optically structured layer results in a viewing zone of approximately 70 degrees in the Y, Z plane and 110 degrees in the X, Z plane. The light exiting the first optically structured layer 182 then becomes the source for the second optically structured layer 113, whose structured surface 112 has a different axes of orientation than does the structured surface 184 of optically structured layer 182. If the axes of the two optically structured layers 113 and 184 are oriented at 90 degrees, for example, optically structured layer 182 operates on the light within the 110 degree angle of the X, Z plane and compresses the viewing angle in the X, Z plane to a narrower field of something less than 70 degrees, thereby further increasing brightness.

Figure 14:
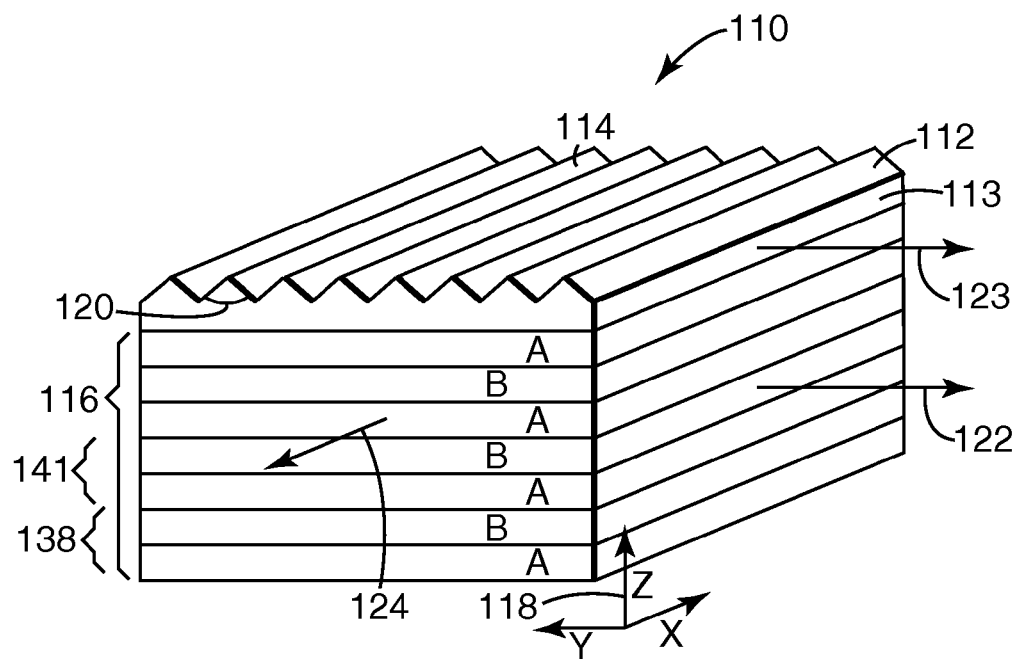
FIG. 14 is a schematic cross section of a brightness enhanced reflective polarizer.

FIG. 14 is a schematic and perspective view of the brightness enhanced reflective polarizer 110 shown in isolation. The figure is not drawn to scale to facilitate description of the structure of the invention. FIG. 14 among others include a coordinate system 118 that defines X, Y and Z directions that are referred to in the description of the invention.

As seen in FIG. 14 the brightness enhanced reflective polarizer 110 includes an optically structured layer 113 that has a structured surface 112. In FIG. 14 this optically structured layer 113 is replicated on a polymer layer cast onto the reflective polarizer body 116, resulting in a preferred unitary structure. A unitary structure such as the one shown in FIG. 14 may be formed by various known techniques of attaching two films, such as heat lamination or casting and curing the structured surface material on the reflective polarizer where the reflective polarizer acts as the substrate in a process such as is described in U.S. Pat. No. 5,175,030. For purposes hereof, the statement that the reflective polarizer and the brightness enhancer are unitary shall be understood to mean that they are bonded to one another.

The preferred and illustrative structured surface 112 shown in FIG. 14, is an array of prisms, typified by prism 114. Each prism has an apex ridge that extends in the X direction. In the Y, Z plane each prism 114 has a cross section that is an isosceles triangle, with a preferred prism apex angle 120 of ninety degrees. Although an array of prisms is preferred, the specific prism geometry and apex angles 120 may be altered to meet the specific requirements of the application. An array of prisms as shown in FIG. 14 is especially useful where it is desirable to confine the light exiting the optical display to a relatively narrow viewing zone 136 shown on FIG. 6. However, where other viewing angles are desired, the optically structured layer 113 may take other forms. Although the preferred structured surface 112 functions as a geometric optic it is well known that diffractive or holographic optical elements may be designed to effectively mimic the light directing qualities exhibited by geometric optics. Therefore the term structured surface 112 should be understood to describe both geometric and diffractive optical systems which confine light to a relatively narrow viewing zone 136 (FIG. 6). Due to the inherent polarizing nature of an array of prisms, generally speaking, optimum performance is achieved when the axes of the prisms run parallel to the direction in which the reflective polarizer was stretched.

Optical Behavior and Design Considerations of Multilayer Stacks

The optical behavior of a multilayer stack 10 such as that shown above in FIG. 4 will now be described in more general terms.

The optical properties and design considerations of multilayer stacks described below allow the construction of multilayer stacks for which the Brewster angle (the angle at which reflectance goes to zero) is very large or is nonexistent. This allows for the construction of multilayer mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

The average transmission at normal incidence for a multilayer stack, (for light polarized in the plane of the extinction axis in the case of polarizers, or for both polarizations in the case of mirrors), is desirably less than 50% (reflectivity of 0.5) over the intended bandwidth. (It shall be understood that for the purposes of the present application, all transmission or reflection values given include front and back surface reflections). Other multilayer stacks exhibit lower average transmission and/or a larger intended bandwidth, and/or over a larger range of angles from the normal. If the intended bandwidth is to be centered around one color only, such as red, green or blue, each of which has an effective bandwidth of about 100 nm each, a multilayer stack with an average transmission of less than 50% is desirable. A multilayer stack having an average transmission of less than 10% over a bandwidth of 100 nm is also preferred. Other exemplary preferred multilayer stacks have an average transmission of less than 30% over a bandwidth of 200 nm. Yet another preferred multilayer stack exhibits an average transmission of less than 10% over the bandwidth of the visible spectrum (400-700 nm). Most preferred is a multilayer stack that exhibits an average transmission of less than 10% over a bandwidth of 380 to 740 nm. The extended bandwidth is useful even in visible light applications in order to accommodate spectral shifts with angle, and variations in the multilayer stack and overall film caliper.

The multilayer stack 10 can include tens, hundreds or thousands of layers, and each layer can be made from any of a number of different materials. The characteristics which determine the choice of materials for a particular stack depend upon the desired optical performance of the stack.

The stack can contain as many materials as there are layers in the stack. For ease of manufacture, preferred optical thin film stacks contain only a few different materials. For purposes of illustration, the present discussion will describe multilayer stacks including two materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

Several parameters may affect the maximum reflectivity achievable in any multilayer stack. These include basic stack design, optical absorption, layer thickness control and the relationship between indices of refraction of the layers in the stack. For high reflectivity and/or sharp bandedges, the basic stack design should incorporate optical interference effects using standard thin film optics design. This typically involves using optically thin layers, meaning layers having an optical thickness in the range of 0.1 to 1.0 times the wavelength of interest. The basic building blocks for high reflectivity multilayer films are low/high index pairs of film layers, wherein each low/high index pair of layers has a combined optical thickness of ½ the center wavelength of the band it is designed to reflect. Stacks of such films are commonly referred to as quarterwave stacks.

To minimize optical absorption, the preferred multilayer stack ensures that wavelengths that would be most strongly absorbed by the stack are the first wavelengths reflected by the stack. For most clear optical materials, including most polymers, absorption increases toward the blue end of the visible spectrum. Thus, it is preferred to tune the multilayer stack such that the "blue" layers are on the incident side of the multilayer stack.

A multilayer construction of alternative low and high index thick films, often referred to as a "pile of plates", has no tuned wavelengths nor bandwidth constraints, and no wavelength is selectively reflected at any particular layer in the stack. With such a construction, the blue reflectivity suffers due to higher penetration into the stack, resulting in higher absorption than for the preferred quarterwave stack design. Arbitrarily increasing the number of layers in a "pile of plates" will not always give high reflectivity, even with zero absorption. Also, arbitrarily increasing the number of layers in any stack may not give the desired reflectivity, due to the increased absorption which would occur.

The relationships between the indices of refraction in each film layer to each other and to those of the other layers in the film stack determine the reflectance behavior of the multilayer stack at any angle of incidence, from any azimuthal direction. Assuming that all layers of the same material have the same indices, then a single interface of a two component quarterwave stack can be analyzed to understand the behavior of the entire stack as a function of angle.

For simplicity of discussion, therefore, the optical behavior of a single interface will be described. It shall be understood, however, that an actual multilayer stack according to the principles described herein could be made of tens, hundreds or thousands of layers. To describe the optical behavior of a single interface, such as the one shown in FIG. 15, the reflectivity as a function of angle of incidence for s and p polarized light for a plane of incidence including the z-axis and one in-plane optic axis will be plotted.

Figure 15:
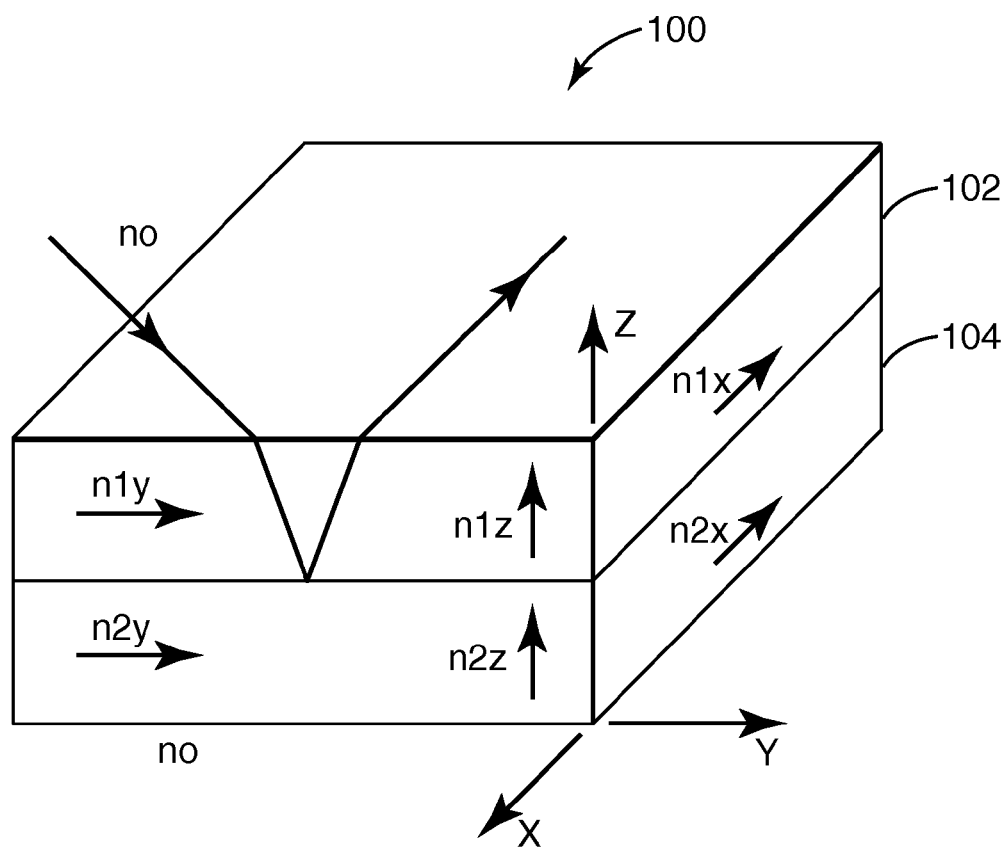
FIG. 15 shows a two layer stack of films forming a single interface.

FIG. 15 shows two material film layers forming a single interface, with both immersed in an isotropic medium of index no. For simplicity of illustration, the present discussion will be directed toward an orthogonal multilayer birefringent system with the optical axes of the two materials aligned, and with one optic axis (z) perpendicular to the film plane, and the other optic axes along the x and y axis. It shall be understood, however, that the optic axes need not be orthogonal, and that nonorthogonal systems are well within the spirit and scope of the present invention. It shall be further understood that the optic axes also need not be aligned with the film axes to fall within the intended scope of the present invention.

The reflectivity of a dielectric interface varies as a function of angle of incidence, and for isotropic materials, is different for p and s polarized light. The reflectivity minimum for p polarized light is due to the so called Brewster effect, and the angle at which the reflectance goes to zero is referred to as Brewster's angle.

The reflectance behavior of any film stack, at any angle of incidence, is determined by the dielectric tensors of all films involved. A general theoretical treatment of this topic is given in the text by R. M. A. Azzam and N. M. Bashara, "Ellipsometry and Polarized Light", published by North-Holland, 1987.

The reflectivity for a single interface of a system is calculated by squaring the absolute value of the reflection coefficients for p and s polarized light, given by equations 1 and 2, respectively. Equations 1 and 2 are valid for uniaxial orthogonal systems, with the axes of the two components aligned.

$$r_{pp} = \frac{n2z * n2o \sqrt{(n1z^2 - no^2\sin^2\theta)} - n1z * n1o \sqrt{(n2z^2 - no^2\sin^2\theta)}}{n2z * n2o \sqrt{(n1z^2 - no^2\sin^2\theta)} + n1z * n1o \sqrt{(n2z^2 - no^2\sin^2\theta)}} \quad 1)$$

$$r_{ss} = \frac{\sqrt{(n1o^2 - no^2\sin^2\theta)} - \sqrt{(n2o^2 - no^2\sin^2\theta)}}{\sqrt{(n1o^2 - no^2\sin^2\theta)} + \sqrt{(n2o^2 - no^2\sin^2\theta)}} \quad 2)$$

where θ is measured in the isotropic medium.

In a uniaxial birefringent system, n1x=n1y=n1o, and n2x=n2y=n2o.

For a biaxial birefringent system, equations 1 and 2 are valid only for light with its plane of polarization parallel to the x-z or y-z planes, as defined in FIG. 15. So, for a biaxial system, for light incident in the x-z plane, n1o=n1x and n2o=n2x in equation 1 (for p-polarized light), and n1o=n1y and n2o=n2y in equation 2 (for s-polarized light). For light incident in the y-z plane, n1o=n1y and n2o=n2y in equation 1 (for p-polarized light), and n1o=n1x and n2o=n2x in equation 2 (for s-polarized light).

Equations 1 and 2 show that reflectivity depends upon the indices of refraction in the x, y (in-plane) and z directions of each material in the stack. In an isotropic material, all three indices are equal, thus nx=ny=nz. The relationship between nx, ny and nz determine the optical characteristics of the material. Different relationships between the three indices lead to three general categories of materials: isotropic, uniaxially birefringent, and biaxially birefringent. Equations 1 and 2 describe biaxially birefringent cases only along the x or y axis, and then only if considered separately for the x and y directions.

A uniaxially birefringent material is defined as one in which the index of refraction in one direction is different from the indices in the other two directions. For purposes of the present discussion, the convention for describing uniaxially birefringent systems is for the condition nx=ny≠nz. The x and y axes are defined as the in-plane axes and the respective indices, nx and ny, will be referred to as the in-plane indices.

One method of creating a uniaxial birefringent system is to biaxially stretch (e.g., stretch along two dimensions) a multilayer stack in which at least one of the materials in the stack has its index of refraction affected by the stretching process (e.g., the index either increases or decreases). Biaxial stretching of the multilayer stack may result in differences between refractive indices of adjoining layers for planes parallel to both axes thus resulting in reflection of light in both planes of polarization.

A uniaxial birefringent material can have either positive or negative uniaxial birefringence. Positive uniaxial birefringence occurs when the z-index is greater than the in-plane indices (nz>nx and ny). Negative uniaxial birefringence occurs when the z-index is less than the in-plane indices (nz<nx and ny).

A biaxial birefringent material is defined as one in which the indices of refraction in all three axes are different, e.g., nx≠ny≠nz. Again, the nx and ny indices will be referred to as the in-plane indices. A biaxial birefringent system can be made by stretching the multilayer stack in one direction. In other words the stack is uniaxially stretched. For purposes of the present discussion, the x direction will be referred to as the stretch direction for biaxial birefringent stacks.

Uniaxial Birefringent Systems (Mirrors)

The optical properties and design considerations of uniaxial birefringent systems will now be discussed. As discussed above, the general conditions for a uniaxial birefringent material are nx=ny≠nz. Thus if each layer 102 and 104 in FIG. 15 is uniaxially birefringent, n1x=n1y and n2x=n2y. For purposes of the present discussion, assume that layer 102 has larger in-plane indices than layer 104, and that thus n1>n2 in both the x and y directions. The optical behavior of a uniaxial birefringent multilayer system can be adjusted by varying the values of n1z and n2z to introduce different levels of positive or negative birefringence. The relationship between the various indices of refraction can be measured directly, or, the general relationship may be indirectly observed by analysis of the spectra of the resulting film as described herein.

In the case of mirrors, the desired average transmission for light of each polarization and plane of incidence generally depends upon the intended use of the mirror. The average transmission along each stretch direction at normal incidence for a narrow bandwidth mirror across a 100 nm bandwidth within the visible spectrum is desirably less than 30%, preferably less than 20% and more preferably less than 10%. A desirable average transmission along each stretch direction at normal incidence for a partial mirror ranges anywhere from, for example, 10% to 50%, and can cover a bandwidth of anywhere between, for example, 100 nm and 450 nm, depending upon the particular application. For a high efficiency mirror, average transmission along each stretch direction at normal incidence over the visible spectrum (400-700 nm) is desirably less than 10%, preferably less than 5%, more preferably less than 2%, and even more preferably less than 1%. In addition, asymmetric mirrors may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400-700 nm), or over the visible spectrum and into the near infrared (e.g., 400-850 nm).

Equation 1 described above can be used to determine the reflectivity of a single interface in a uniaxial birefringent system composed of two layers such as that shown in FIG. 15. Equation 2, for s polarized light, is identical to that of the case of isotropic films ($nx=ny=nz$), so only equation 1 need be examined. For purposes of illustration, some specific, although generic, values for the film indices will be assigned. Let $n1x=n1y=1.75$, $n1z$=variable, $n2x=n2y=1.50$, and $n2z$=variable. In order to illustrate various possible Brewster angles in this system, $no=1.60$ for the surrounding isotropic media.

Figure 16:
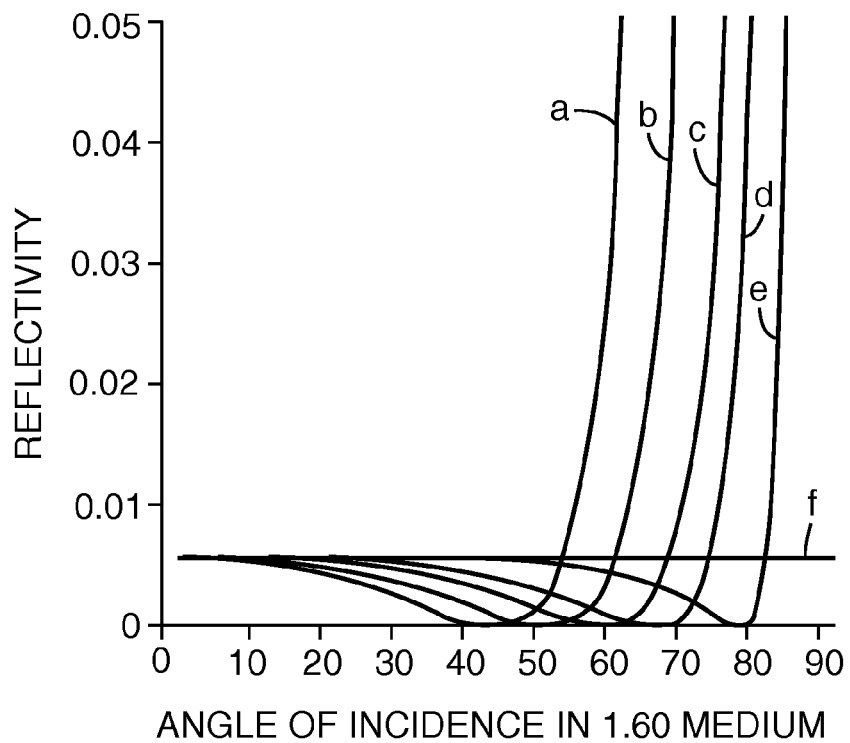
FIGS. 16 and 17 show reflectivity versus angle curves for a uniaxial birefringent system in a medium of index 1.60.

FIG. 16 shows reflectivity versus angle curves for p-polarized light incident from the isotropic medium to the birefringent layers, for cases where $n1z$ is numerically greater than or equal to $n2z$ ($n1z \geq n2z$). The curves shown in FIG. 16 are for the following z-index values: a) $n1z=1.75$, $n2z=1.50$; b) $n1z=1.75$, $n2z=1.57$; c) $n1z=1.70$, $n2z=1.60$; d) $n1z=1.65$, $n2z=1.60$; e) $n1z=1.61$, $n2z=1.60$; and f) $n1z=1.60=n2z$. As $n1z$ approaches $n2z$, the Brewster angle, the angle at which reflectivity goes to zero, increases. Curves a-e are strongly angular dependent. However, when $n1z=n2z$ (curve f), there is no angular dependence to reflectivity. In other words, the reflectivity for curve f is constant for all angles of incidence. At that point, equation 1 reduces to the angular independent form: $(n2o-n1o)/(n2o+n1o)$. When $n1z=n2z$, there is no Brewster effect and there is constant reflectivity for all angles of incidence.

Figure 17:
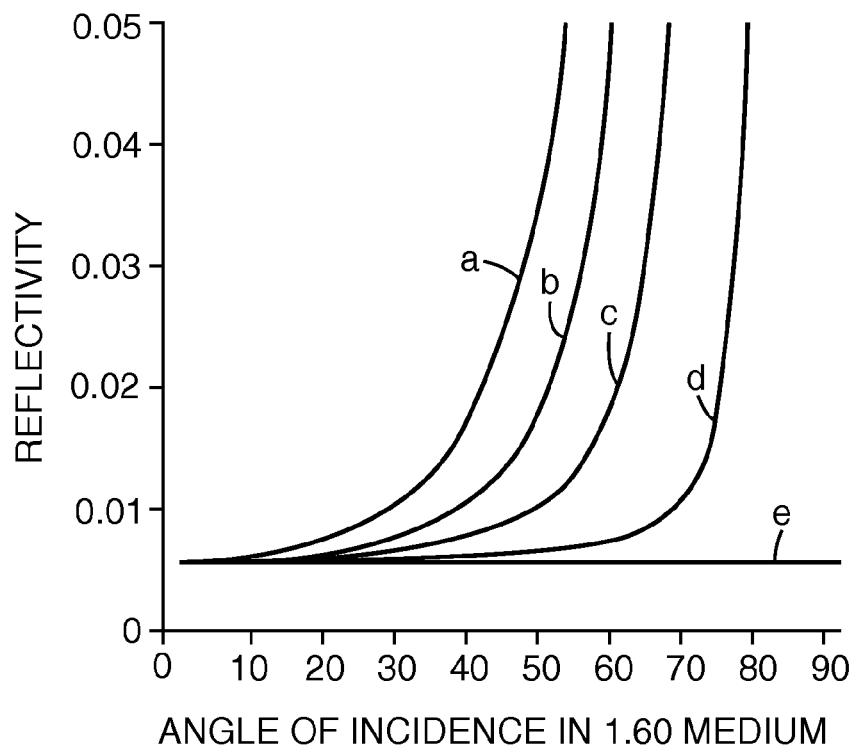

FIG. 17 shows reflectivity versus angle of incidence curves for cases where $n1z$ is numerically less than or equal to $n2z$. Light is incident from isotropic medium to the birefringent layers. For these cases, the reflectivity monotonically increases with angle of incidence. This is the behavior that would be observed for s-polarized light. Curve a in FIG. 17 shows the single case for s polarized light. Curves b-e show cases for p polarized light for various values of nz, in the following order: b) $n1z=1.50$, $n2z=1.60$; c) $n1z=1.55$, $n2z=1.60$; d) $n1z=1.59$, $n2z=1.60$; and e) $n1z=1.60=n2z$. Again, when $n1z=n2z$ (curve e), there is no Brewster effect, and there is constant reflectivity for all angles of incidence.

Figure 18:
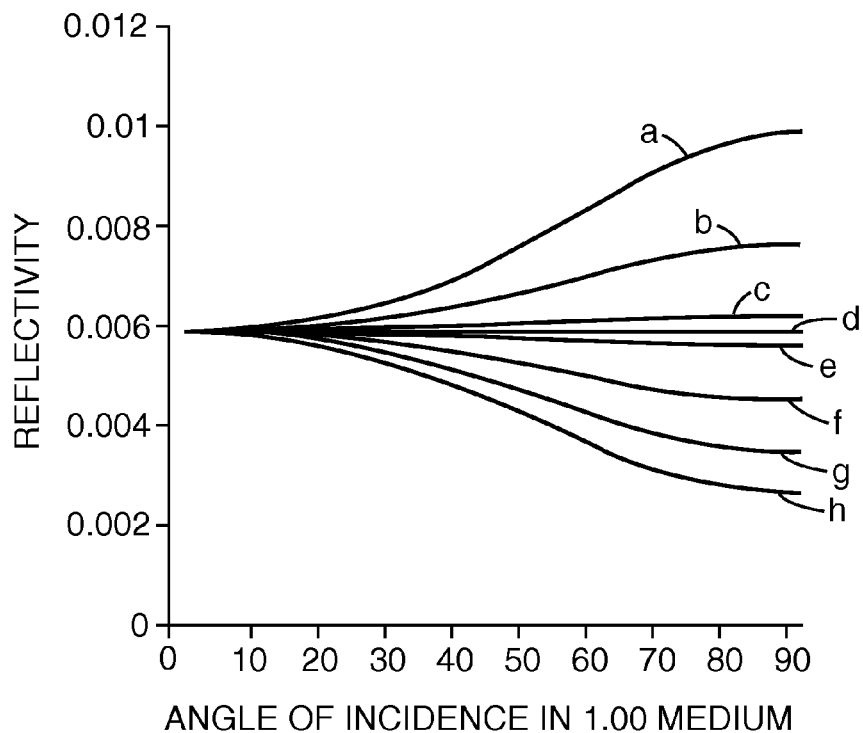
FIG. 18 shows reflectivity versus angle curves for a uniaxial birefringent system in a medium of index 1.0.

FIG. 18 shows the same cases as FIGS. 16 and 17 but for an incident medium of index $no=1.0$ (air). The curves in FIG. 18 are plotted for p polarized light at a single interface of a positive uniaxial material of indices $n2x=n2y=1.50$, $n2z=1.60$, and a negative uniaxially birefringent material with $n1x=n1y=1.75$, and values of $n1z$, in the following order, from top to bottom, of: a) 1.50; b) 1.55; c) 1.59; d) 1.60; f) 1.61; g) 1.65; h) 1.70; and i) 1.75. Again, as was shown in FIGS. 16 and 17, when the values of $n1z$ and $n2z$ match (curve d), there is no angular dependence to reflectivity.

FIGS. 16, 17 and 18 show that the cross-over from one type of behavior to another occurs when the z-axis index of one film equals the z-axis index of the other film. This is true for several combinations of negative and positive uniaxially birefringent, and isotropic materials. Other situations occur in which the Brewster angle is shifted to larger or smaller angles.

Figure 19:
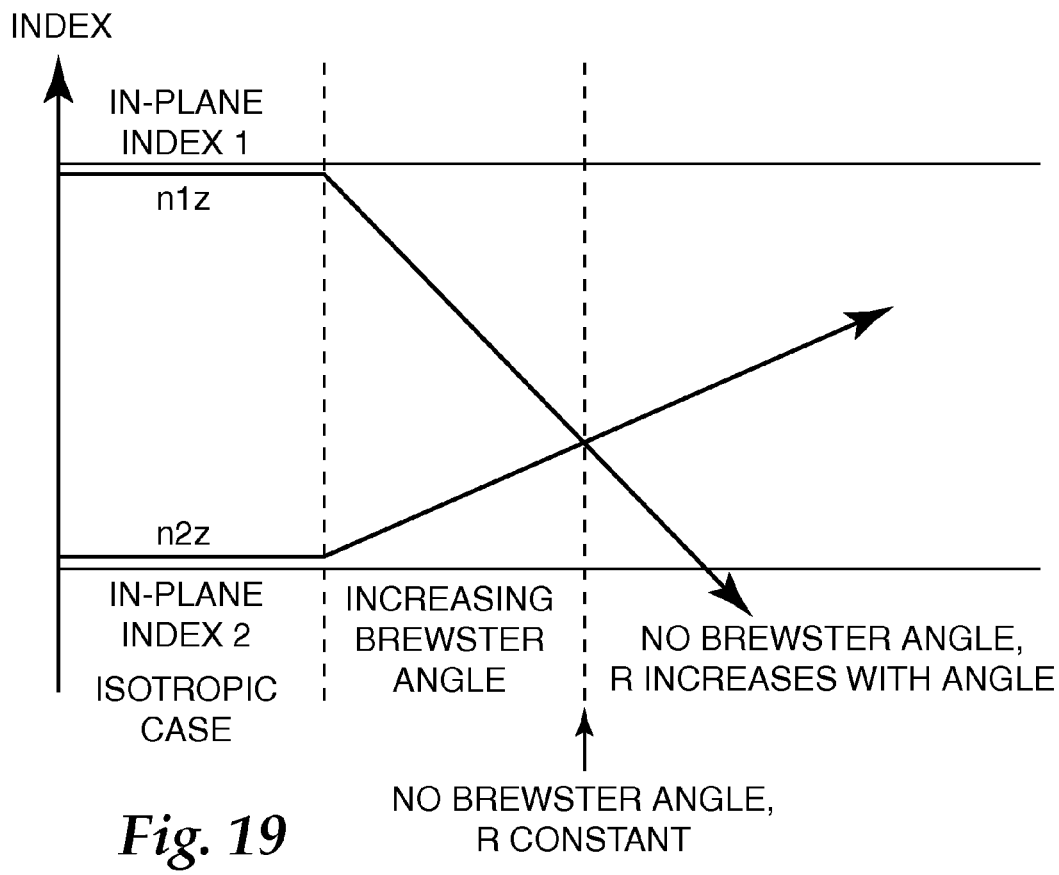
FIGS. 19, 20 and 21 show various relationships between in-plane indices and z-index for a uniaxial birefringent system.
Figure 20:
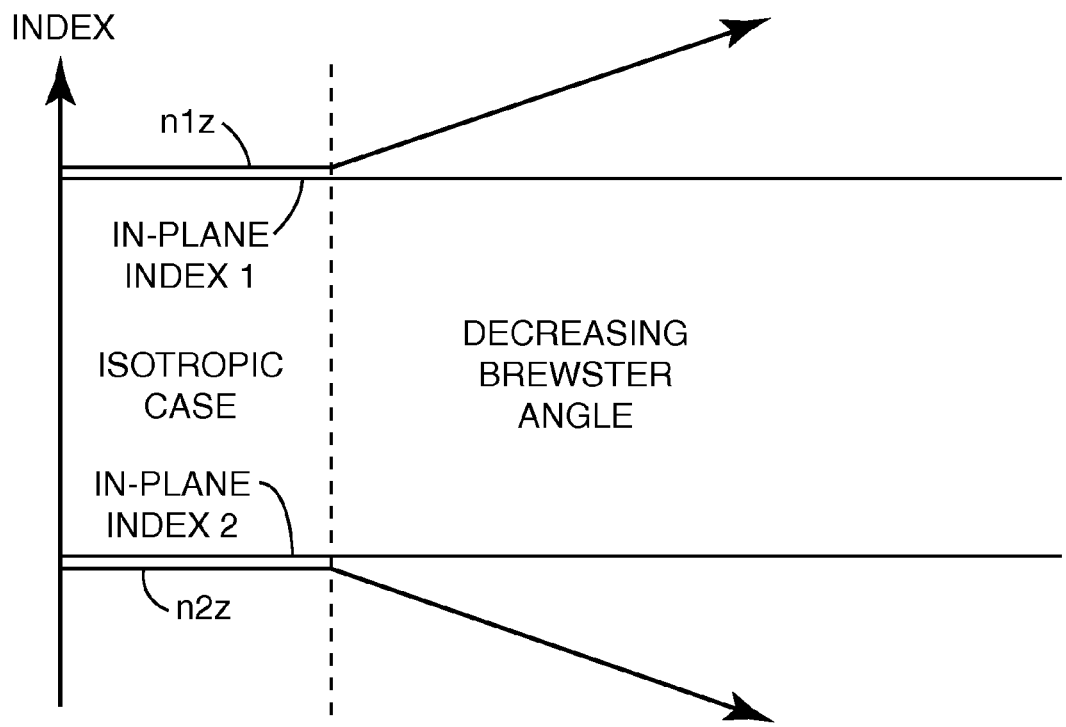
Figure 21:
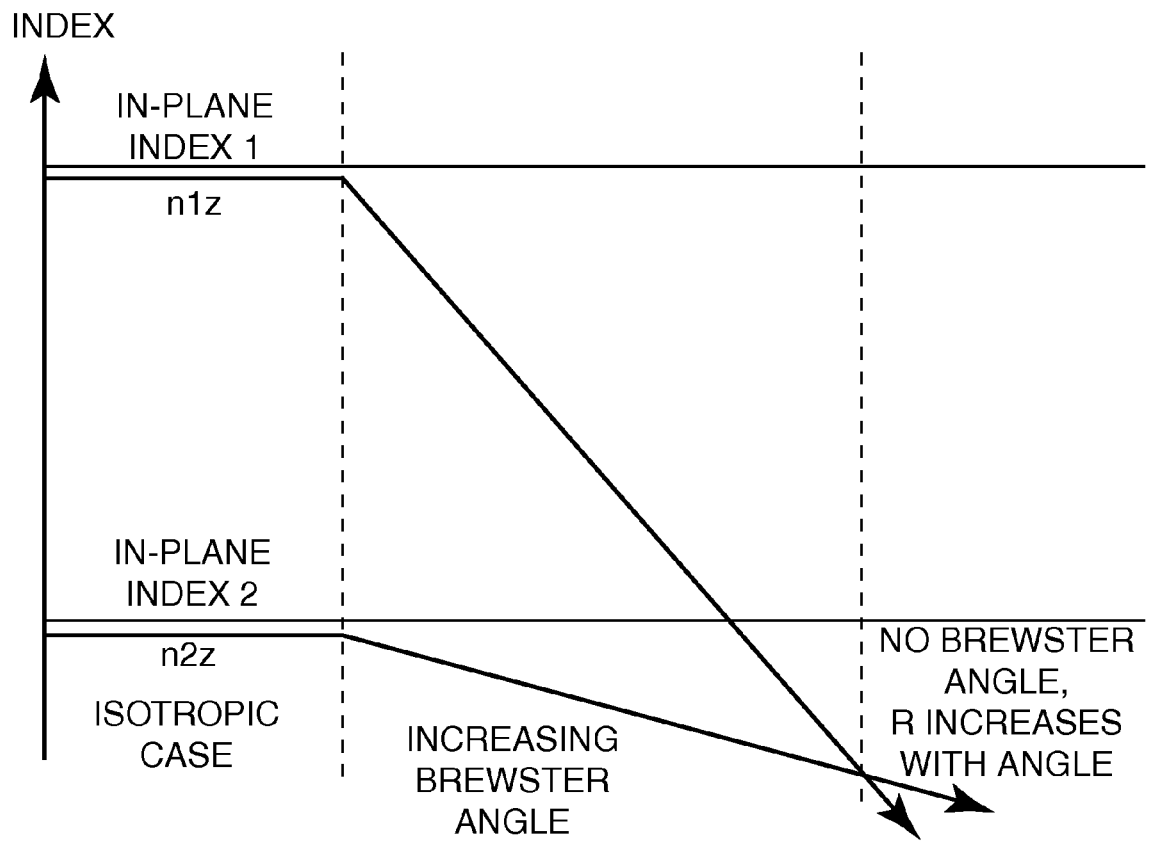

Various possible relationships between in-plane indices and z-axis indices are illustrated in FIGS. 19, 20 and 21. The vertical axes indicate relative values of indices and the horizontal axes are used to separate the various conditions. Each Figure begins at the left with two isotropic films, where the z-index equals the in-plane indices. As one proceeds to the right, the in-plane indices are held constant and the various z-axis indices increase or decrease, indicating the relative amount of positive or negative birefringence.

The case described above with respect to FIGS. 16, 17, and 18 is illustrated in FIG. 19. The in-plane indices of material one are greater than the in-plane indices of material two, material 1 has negative birefringence ($n1z$ less than in-plane indices), and material two has positive birefringence ($n2z$ greater than in-plane indices). The point at which the Brewster angle disappears and reflectivity is constant for all angles of incidence is where the two z-axis indices are equal. This point corresponds to curve f in FIG. 16, curve e in FIG. 17 or curve d in FIG. 18.

In FIG. 20, material one has higher in-plane indices than material two, but material one has positive birefringence and material two has negative birefringence. In this case, the Brewster minimum can only shift to lower values of angle.

Both FIGS. 19 and 20 are valid for the limiting cases where one of the two films is isotropic. The two cases are where material one is isotropic and material two has positive birefringence, or material two is isotropic and material one has negative birefringence. The point at which there is no Brewster effect is where the z-axis index of the birefringent material equals the index of the isotropic film.

Another case is where both films are of the same type, i.e., both negative or both positive birefringent. FIG. 21 shows the case where both films have negative birefringence. However, it shall be understood that the case of two positive birefringent layers is analogous to the case of two negative birefringent layers shown in FIG. 21. As before, the Brewster minimum is eliminated only if one z-axis index equals or crosses that of the other film.

Yet another case occurs where the in-plane indices of the two materials are equal, but the z-axis indices differ. In this case, which is a subset of all three cases shown in FIGS. 19-21, no reflection occurs for s polarized light at any angle, and the reflectivity for p polarized light increases monotonically with increasing angle of incidence. This type of article has increasing reflectivity for p-polarized light as angle of incidence increases, and is transparent to s-polarized light. This article can be referred to as a "p-polarizer".

The above described principles and design considerations describing the behavior of uniaxially birefringent systems can be applied to create multilayer stacks having the desired optical effects for a wide variety of circumstances and applications. The indices of refraction of the layers in the multilayer stack can be manipulated and tailored to produce devices having the desired optical properties. Many negative and positive uniaxial birefringent systems can be created with a variety of in-plane and z-axis indices, and many useful devices can be designed and fabricated using the principles described here.

Biaxial Birefringent Systems (Polarizers)

Referring again to FIG. 15, two component orthogonal biaxial birefringent systems and the design considerations affecting the resultant optical properties will now be described. Again, the system can have many layers, but an understanding of the optical behavior of the stack is achieved by examining the optical behavior at one interface.

A biaxial birefringent system can be designed to give high reflectivity for light with its plane of polarization parallel to one axis, for a broad range of angles of incidence, and simultaneously have low reflectivity and high transmission for light with its plane of polarization parallel to the other axis for a broad range of angles of incidence. As a result, the biaxial birefringent system acts as a polarizer, transmitting light of one polarization and reflecting light of the other polarization. By controlling the three indices of refraction of each film, nx, ny and nz, the desired polarizer behavior can be obtained. Again, the indices of refraction can be measured directly or can be indirectly observed by analysis of the spectra of the resulting film, as described herein.

Referring again to FIG. 15, the following values to the film indices are assigned for purposes of illustration: n1x=1.88, n1y=1.64, n1z=variable, n2x=1.65, n2y=variable, and n2z=variable. The x direction is referred to as the extinction direction and the y direction as the transmission direction.

Equation 1 can be used to predict the angular behavior of the biaxial birefringent system for two important cases of light with a plane of incidence in either the stretch (xz plane) or the non-stretch (yz plane) directions. The polarizer is a mirror in one polarization direction and a window in the other direction. In the stretch direction, the large index differential of 1.88−1.65=0.23 in a multilayer stack with hundreds of layers will yield very high reflectivities for s-polarized light. For p-polarized light the reflectance at various angles depends on the n1z/n2z index differential.

In many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest. Average transmission at normal incidence for a colored polarizer across a 100 nm bandwidth is desirably at least 50%, preferably at least 70% and more preferably at least 90%. The average transmission at 60 degrees from the normal for p-polarized light (measured along the transmission axis) for a narrow band polarizer across a 100 nm bandwidth is desirably at least 50%, preferably at least 70% and more preferably at least 80%.

The average transmission at normal incidence for a polarizer in the transmission axis across the visible spectrum (400-700 nm for a bandwidth of 300 nm) is desirably at least 50%, preferably at least 70%, more preferably at least 85%, and even more preferably at least 90%. The average transmission at 60 degrees from the normal (measured along the transmission axis) for a polarizer from 400-700 nm is desirably at least 50%, preferably at least 70%, more preferably at least 80%, and even more preferably at least 90%.

For certain applications, high reflectivity in the transmission axis at off-normal angles are preferred. The average reflectivity for light polarized along the transmission axis should be more than 20% at an angle of at least 20 degrees from the normal.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, $C_{RMS}$, can be determined according to the equation:

$$C_{RMS} = \frac{\int_{\lambda 1}^{\lambda 2} ((T - \overline{T})^2)^{1/2} d\lambda}{\overline{T}}$$

where the range $\lambda 1$ to $\lambda 2$ is the wavelength range, or bandwidth, of interest, T is the transmissivity along the transmission axis, and $\overline{T}$ is the average transmissivity along the transmission axis in the wavelength range of interest.

For applications where a low color polarizer is desirable, the % RMS color should be less than 10%, preferably less than 8%, more preferably less than 3.5%, and even more preferably less than 2.1% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For example, for narrow band polarizers having a bandwidth of approximately 100 nm, average transmission along the extinction axis at normal incidence is desirably less than 50%, preferably less than 30%, more preferably less than 10%, and even more preferably less than 3%. For polarizers having a bandwidth in the visible range (400-700 nm, or a bandwidth of 300 nm), average transmission along the extinction axis at normal incidence is desirably less than 40%, more desirably less than 25%, preferably less than 15%, more preferably less than 5% and even more preferably less than 3%.

Reflectivity at off-normal angles, for light with its plane of polarization parallel to the transmission axis may be caused by a large z-index mismatch, even if the in-plane y indices are matched. The resulting system thus has large reflectivity for p, and is highly transparent to s polarized light. This case was referred to above in the analysis of the mirror cases as a "p polarizer".

For uniaxially stretched polarizers, performance depends upon the relationships between the alternating layer indices for all three (x, y, and z) directions. As described herein, it is desirable to minimize the y and z index differentials for a high efficiency polarizer. Introduction of a y-index mismatch is describe to compensate for a z-index mismatch. Whether intentionally added or naturally occurring, any index mismatch will introduce some reflectivity. An important factor thus is making the x-index differential larger than the y- and z-index differentials. Since reflectivity increases rapidly as a function of index differential in both the stretch and non-stretch directions, the ratios $\Delta ny/\Delta nx$ and $\Delta nz/\Delta nx$ should be minimized to obtain a polarizer having high extinction along one axis across the bandwidth of interest and also over a broad range of angles, while preserving high transmission along the orthogonal axis. Ratios of less than 0.05, 0.1 or 0.25 are acceptable. Ideally, the ratio Δnz/Δnx is 0, but ratios of less than 0.25 or 0.5 also produce a useable polarizer.

Figure 22:
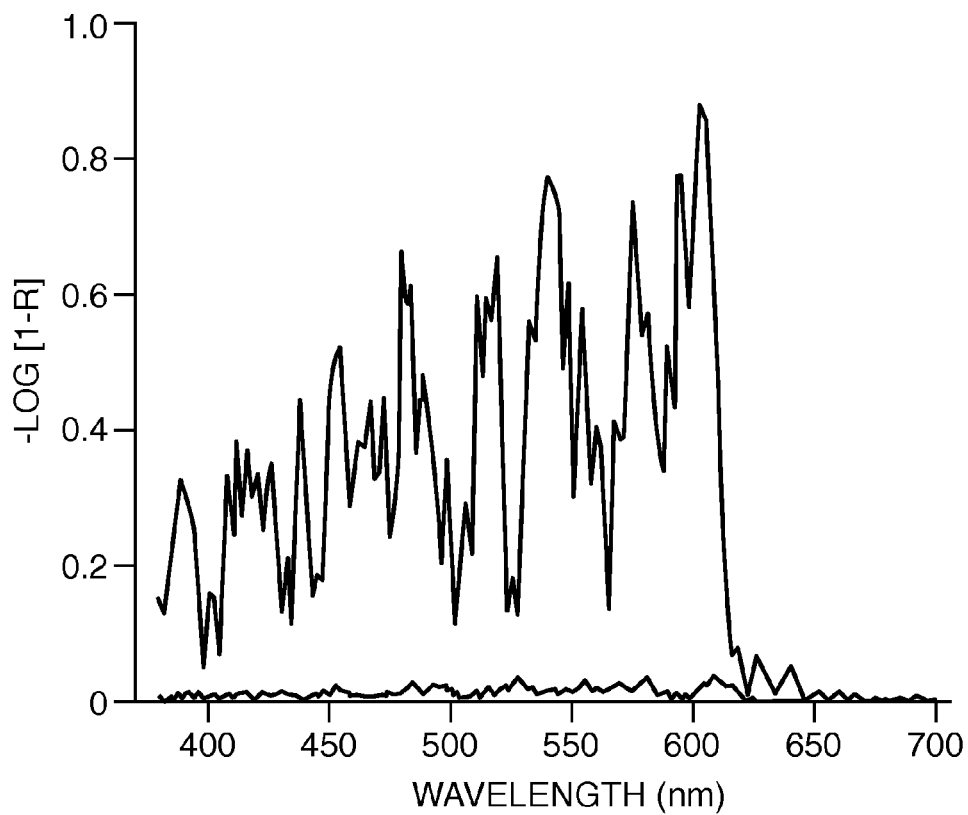
FIG. 22 shows off axis reflectivity versus wavelength for two different biaxial birefringent systems.

FIG. 22 shows the reflectivity (plotted as −Log [1−R]) at 75° for p polarized light with its plane of incidence in the non-stretch direction, for an 800 layer stack of PEN/coPEN. The reflectivity is plotted as function of wavelength across the visible spectrum (400-700 nm). The relevant indices for curve a at 550 nm are n1y=1.64, n1z=1.52, n2y=1.64 and n2z=1.63. The model stack design is a linear thickness grade for quarterwave pairs, where each pair thickness is given by $d_n = d_o + d_o(0.003)n$. All layers were assigned a random thickness error with a gaussian distribution and a 5% standard deviation.

Curve a shows high off-axis reflectivity across the visible spectrum along the transmission axis (the y-axis) and that different wavelengths experience different levels of reflectivity. This is due to the large z-index mismatch (Δnz=0.11). Since the spectrum is sensitive to layer thickness errors and spatial nonuniformities, such as film caliper, this gives a biaxial birefringent system with a very nonuniform and "colorful" appearance. Although a high degree of color may be desirable for certain applications, it is desirable to control the degree of off-axis color, and minimize it for those applications requiring a uniform, low color appearance, such as liquid crystal displays or other types of displays.

Off-axis reflectivity, and off-axis color can be minimized by introducing an index mismatch to the non-stretch in-plane indices (n1y and n2y) that create a Brewster condition off axis, while keeping the s-polarization reflectivity to a minimum.

Figure 23:
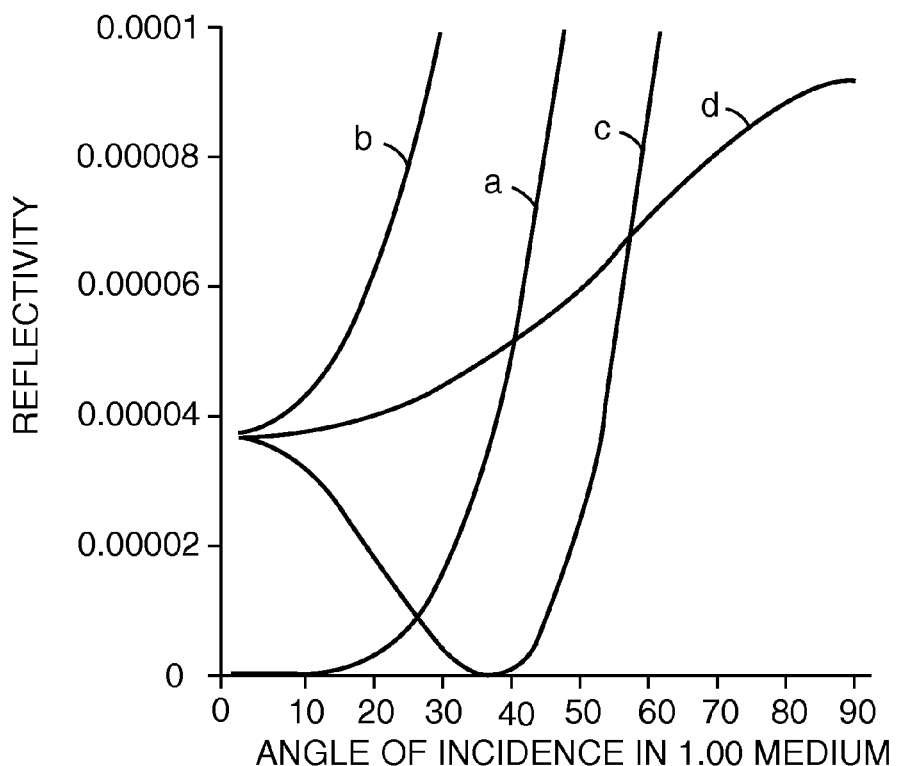
FIG. 23 shows the effect of introducing a y-index difference in a biaxial birefringent film with a large z-index difference.

FIG. 23 explores the effect of introducing a y-index mismatch in reducing off-axis reflectivity along the transmission axis of a biaxial birefringent system. With n1z=1.52 and n2z=1.63 (Δnz=0.11), the following conditions are plotted for p polarized light: a) n1y=n2y=1.64; b) n1y=1.64, n2y=1.62; c) n1y=1.64, n2y=1.66. Curve a shows the reflectivity where the in-plane indices n1y and n2y are equal. Curve a has a reflectance minimum at 0°, but rises steeply after 20°. For curve b, n1y>n2y, and reflectivity increases rapidly. Curve c, where n1y<n2y, has a reflectance minimum at 38°, but rises steeply thereafter. Considerable reflection occurs as well for s polarized light for n1y≠n2y, as shown by curve d. Curves a-d of FIG. 23 indicate that the sign of the y-index mismatch (n1y−n2y) should be the same as the z-index mismatch (n1z−n2z) for a Brewster minimum to exist. For the case of n1y=n2y, reflectivity for s polarized light is zero at all angles.

By reducing the z-axis index difference between layers, the off axis reflectivity can be further reduced. If n1z is equal to n2z, FIG. 18 indicates that the extinction axis will still have a high reflectivity off-angle as it does at normal incidence, and no reflection would occur along the nonstretch axis at any angle because both indices are matched (e.g., n1y=n2y and n1z=n2z).

Exact matching of the two y indices and the two z indices may not be possible in some multilayer systems. If the z-axis indices are not matched in a polarizer construction, introduction of a slight mismatch may be desired for in-plane indices n1y and n2y. This can be done by blending additional components into one or both of the material layers in order to increase or decrease the respective y index as described below in Example 15. Blending a second resin into either the polymer that forms the highly birefringent layers or into the polymer that forms the selected polymer layers may be done to modify reflection for the transmission axis at normal and off-normal angles, or to modify the extinction of the polarizer for light polarized in the extinction axis. The second, blended resin may accomplish this by modifying the crystallinity and the index of refraction of the polymer layers after orientation.

Figure 24:
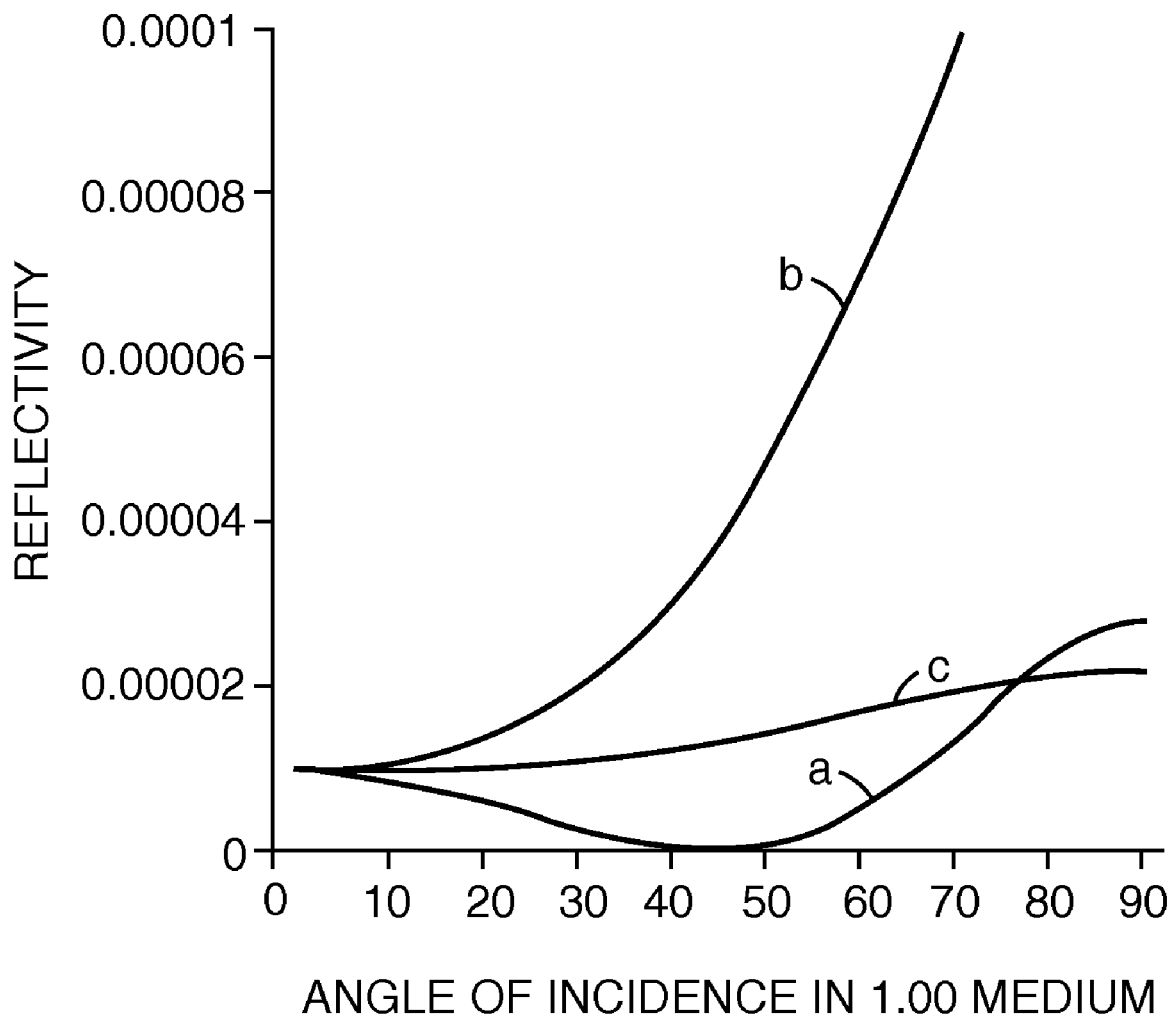
FIG. 24 shows the effect of introducing a y-index difference in a biaxial birefringent film with a small z-index difference.

Another example is plotted in FIG. 24, assuming n1z=1.56 and n2z=1.60 (Δnz=0.04), with the following y indices a) n1y=1.64, n2y=1.65; b) n1y=1.64, n2y=1.63. Curve c is for s-polarized light for either case. Curve a, where the sign of the y-index mismatch is the same as the z-index mismatch, results in the lowest off-angle reflectivity.

The computed off-axis reflectance of an 800 layer stack of films at 75° angle of incidence with the conditions of curve a in FIG. 24 is plotted as curve b in FIG. 22. Comparison of curve b with curve a in FIG. 22 shows that there is far less off-axis reflectivity, and therefore lower perceived color and better uniformity, for the conditions plotted in curve b. The relevant indices for curve b at 550 nm are n1y=1.64, n1z=1.56, n2y=1.65 and n2z=1.60.

Figure 25:
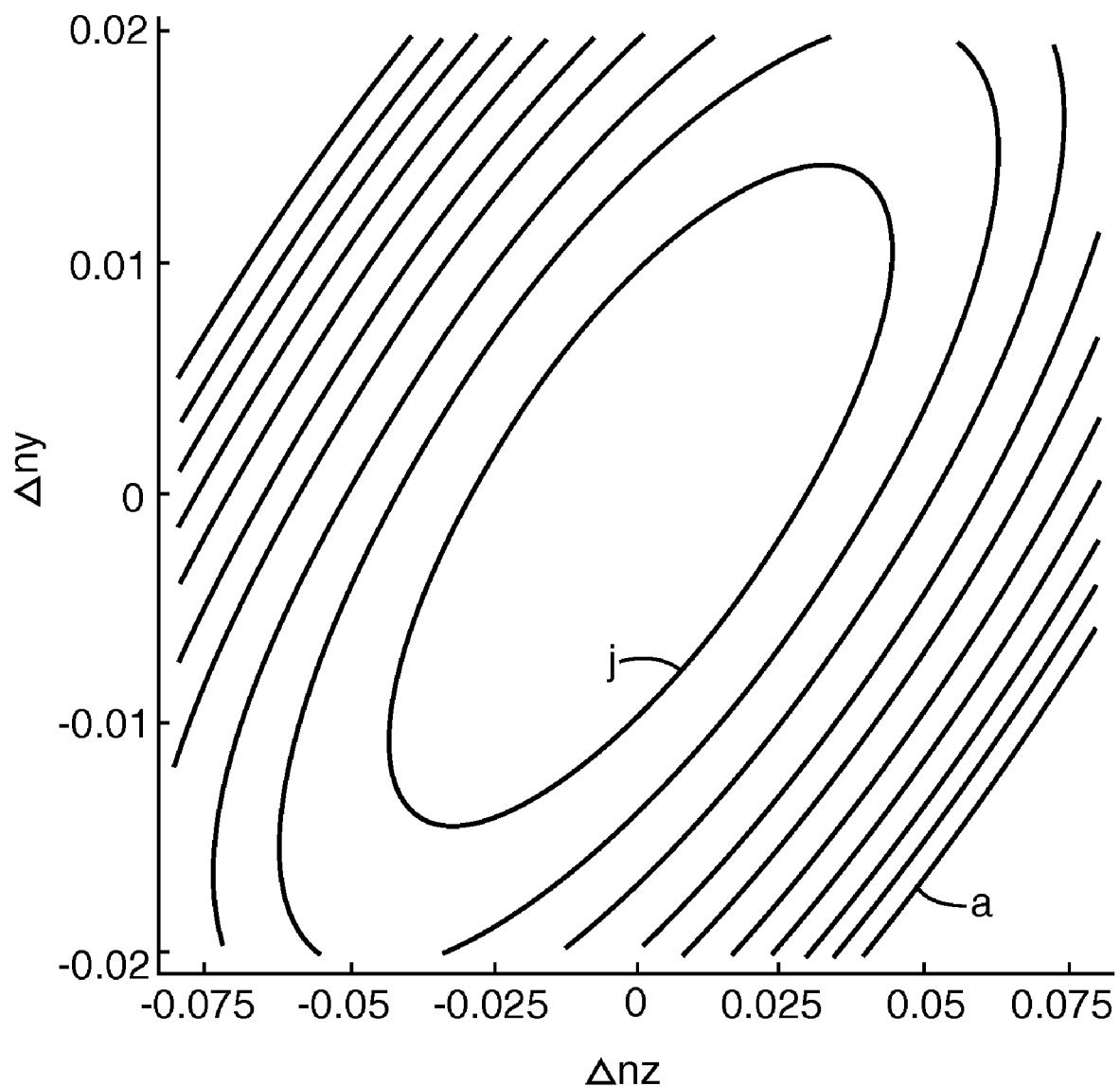
FIG. 25 shows a contour plot summarizing the information from FIGS. 18 and 19.

FIG. 25 shows a contour plot of equation 1 which summarizes the off axis reflectivity discussed in relation to FIG. 15 for p-polarized light. The four independent indices involved in the non-stretch direction have been reduced to two index mismatches, Δnz and Δny. The plot is an average of 6 plots at various angles of incidence from 0° to 75° in 15 degree increments. The reflectivity ranges from $0.4 \times 10^{-4}$ for contour a, to $4.0 \times 10^{-4}$ for contour j, in constant increments of $0.4 \times 10^{-4}$. The plots indicate how high reflectivity caused by an index mismatch along one optic axis can be offset by a mismatch along the other axis.

Thus, by reducing the z-index mismatch between layers of a biaxial birefringent systems, and/or by introducing a y-index mismatch to produce a Brewster effect, off-axis reflectivity, and therefore off-axis color, are minimized along the transmission axis of a multilayer reflecting polarizer.

It should also be noted that narrow band polarizers operating over a narrow wavelength range can also be designed using the principles described herein. These can be made to produce polarizers in the red, green, blue, cyan, magenta, or yellow bands, for example.

An ideal reflecting polarizer should transmit all light of one polarization, and reflect all light of the other polarization. Unless laminated on both sides to glass or to another film with a clear optical adhesive, surface reflections at the air/reflecting polarizer interface will reduce the transmission of light of the desired polarization. Thus, it may in some cases be useful to add an antireflection (AR) coating to the reflecting polarizer. The AR coating is preferably designed to dereflect a film of index 1.64 for PEN based polarizers in air, because that is the index of all layers in the nonstretch (y) direction. The same coating will have essentially no effect on the stretch direction because the alternating index stack of the stretch direction has a very high reflection coefficient irrespective of the presence or absence of surface reflections. Any AR coating known in the art could be applied, provided that the coating does not overheat or damage the multilayer film being coated. An exemplary coating would be a quarterwave thick coating of low index material, ideally with index near the square root of 1.64 (for PEN based materials).

Materials Selection and Processing

With the above-described design considerations established, one of ordinary skill will readily appreciate that a wide variety of materials can be used to form multilayer mirrors or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar Theological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite to or the same as that of the first material. Or, the second material may have no birefringence.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanol diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of SPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of mirrors include PET/Ecdel, PEN/Ecdel, PEN/sPS, PEN/THV, PEN/co-PET, and PET/sPS, where "co-PET" refers to a copolymer or blend based upon terephthalic acid (as described above), Ecdel is a thermoplastic polyester commercially available from Eastman Chemical Co., and THV is a fluoropolymer commercially available from 3M Co.

The number of layers in the device is selected to achieve the desired optical properties using the minimum number of layers for reasons of film thickness, flexibility and economy. In the case of both polarizers and mirrors, the number of layers is preferably less than 10,000, more preferably less than 5,000, and (even more preferably) less than 2,000.

As discussed above, the ability to achieve the desired relationships among the various indices of refraction (and thus the optical properties of the multilayer device) is influenced by the processing conditions used to prepare the multilayer device. In the case of organic polymers which can be oriented by stretching, the devices are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of mirrors the film is stretched substantially in two directions (biaxial orientation).

The film may be allowed to dimensionally relax in the cross-stretch direction from the natural reduction in cross-stretch (equal to the square root of the stretch ratio) to being constrained (i.e., no substantial change in cross-stretch dimensions). The film may be stretched in the machine direction, as with a length orienter, in width using a tenter.

The pre-stretch temperature, stretch temperature, stretch rate, stretch ratio, heat set temperature, heat set time, heat set relaxation, and cross-stretch relaxation are selected to yield a multilayer device having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer device. In general, however, a stretch ratios in the range from 1:2 to 1:10 (more preferably 1:3 to 1:7) in the stretch direction and from 1:0.5 to 1:10 (more preferably from 1:0.5 to 1:7) orthogonal to the stretch direction is preferred.

Suitable multilayer devices may also be prepared using techniques such as spin coating (e.g., as described in Boese et al., J. Polym. Sci.: Part B, 30:1321 (1992) for birefringent polyimides, and vacuum deposition (e.g., as described by Zang et. al., Appl. Phys. Letters, 59:823 (1991) for crystalline organic compounds; the latter technique is particularly useful for certain combinations of crystalline organic compounds and inorganic materials.

The invention will now be described by way of the following examples. In the examples, because optical absorption is negligible, reflection equals 1 minus transmission (R=1−T).

EXAMPLE 1

Polarizer

PEN and a 70 naphthalate/30 terephthalate copolyester (coPEN) were synthesized in a standard polyester resin kettle using ethylene glycol as the diol. The intrinsic viscosity of both the PEN and the coPEN was approximately 0.6 dl/g. Single layer films of PEN and coPEN were extruded and then uniaxially stretched, with the sides restrained, at approximately 150° C. As extruded, the PEN exhibited an isotropic refractive index of about 1.65, and the coPEN was characterized by an isotropic refractive index of about 1.64. By isotropic is meant that the refractive indices associated with all axes in the plane of the film are substantially equal. Both refractive index values were observed at 550 nm. After stretching at a 5:1 stretch ratio, the refractive index of the PEN associated with the oriented axis increased to approximately 1.88. The refractive index associated with the transverse axis dropped slightly to 1.64. The refractive index of the coPEN film after stretching at a 5:1 stretch ratio remained isotropic at approximately 1.64.

A satisfactory multilayer polarizer was then made of alternating layers of PEN and coPEN by coextrusion using a 51-slot feed block which fed a standard extrusion die. The extrusion was run at approximately 295° C. The PEN was extruded at approximately 23 lb/hr and the coPEN was extruded at approximately 22.3 lb/hr. The PEN skin layers were approximately three times as thick as the layers within the extruded film stack. All internal layers were designed to have an optical ¼ wavelength thickness for light of about 1300 nm. The 51-layer stack was extruded and cast to a thickness of approximately 0.0029 inches, and then uniaxially stretched with the sides restrained at approximately a 5:1 stretch ratio at approximately 150° C. The stretched film had a thickness of approximately 0.0005 inches.

The stretched film was then heat set for 30 seconds at approximately 230° C. in an air oven. The optical spectra were essentially the same for film that was stretched and for film that was subsequently heat set.

EXAMPLE 2

Polarizer

A satisfactory 204-layered polarizer was made by extruding PEN and coPEN in the 51-slot feedblock as described in Example 1 and then employing two layer doubling multipliers in series in the extrusion. The multipliers divide the extruded material exiting the feed block into two half-width flow streams, then stack the half-width flow streams on top of each other. U.S. Pat. No. 3,565,985 describes similar coextrusion multipliers. The extrusion was performed at approximately 295° C. using PEN at an intrinsic viscosity of 0.50 dl/g at 22.5 lb/hr while the coPEN at an intrinsic viscosity of 0.60 dl/g was run at 16.5 lb/hr. The cast web was approximately 0.0038 inches in thickness and was uniaxially stretched at a 5:1 ratio in a longitudinal direction with the sides restrained at an air temperature of 140° C. during stretching. Except for skin layers, all pairs of layers were designed to be ½ wavelength optical thickness for 550 nm light.

Two 204-layer polarizers made as described above were then hand-laminated using an optical adhesive to produce a 408-layered film stack. Preferably the refractive index of the adhesive should match the index of the isotropic coPEN layer.

FIG. 5 illustrates the transmission data in both the oriented direction 33 and transverse direction 31. Over 80 percent of the light in one plane of polarization is reflected for wavelengths in a range from approximately 450 to 650 nm.

The iridescence is essentially a measure of nonuniformities in the film layers in one area versus adjacent areas. With perfect thickness control, a film stack centered at one wavelength would have no color variation across the sample. Multiple stacks designed to reflect the entire visible spectrum will have iridescence if significant light leaks through random areas at random wavelengths, due to layer thickness errors.

The large differential index between film layers of the polymer systems presented here enable film reflectivities of greater than 99 percent with a modest number of layers. This is a great advantage in eliminating iridescence if proper layer thickness control can be achieved in the extrusion process. Computer based optical modeling has shown that greater than 99 percent reflectivity across most of the visible spectrum is possible with only 600 layers for a PEN/coPEN polarizer if the layer thickness values are controlled with a standard deviation of less than or equal to 10 percent.

EXAMPLE 3

PET:Ecdel, 601, Mirror

A coextruded film containing 601 layers was made on a sequential flat-film-making line via a coextrusion process. A Polyethylene terephthalate (PET) with an Intrinsic Viscosity of 0.6 dl/g (60 wt. % phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method (such as that described in U.S. Pat. No. 3,801,429) was used to generate 151 layers which was passed through two multipliers producing an extrudate of 601 layers. U.S. Pat. No. 3,565,985 describes exemplary coextrusion multipliers. The web was length oriented to a draw ratio of about 3.6 with the web temperature at about 210° F. The film was subsequently preheated to about 235° F. in about 50 seconds and drawn in the transverse direction to a draw ratio of about 4.0 at a rate of about 6% per second. The film was then relaxed about 5% of its maximum width in a heat-set oven set at 400° F. The finished film thickness was 2.5 mil.

Figure 26:
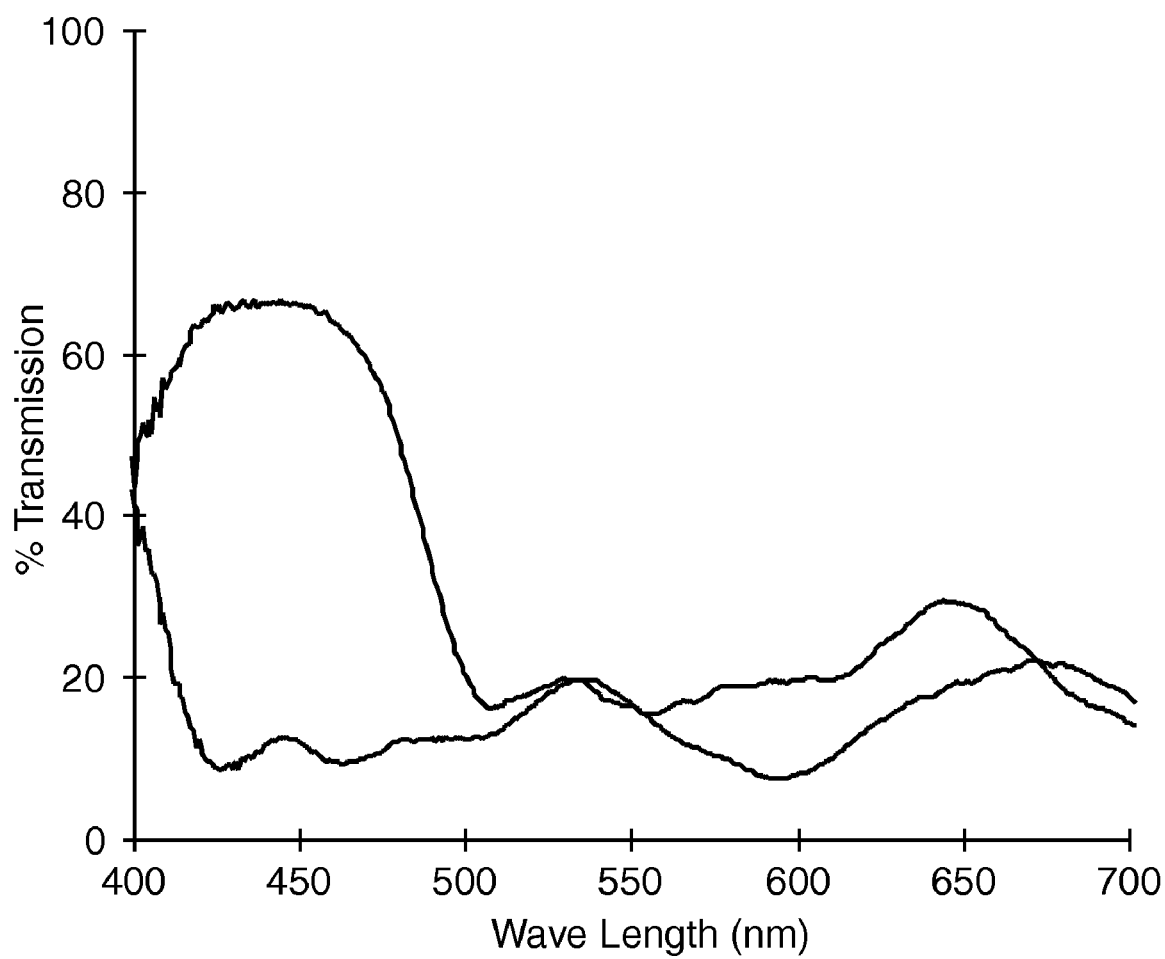
FIGS. 26-31 show optical performance of multilayer mirrors given in Examples 3-6.

The cast web produced was rough in texture on the air side, and provided the transmission as shown in FIG. 26. The % transmission for p-polarized light at a 60° angle (curve b) is similar the value at normal incidence (curve a) (with a wavelength shift).

Figure 27:
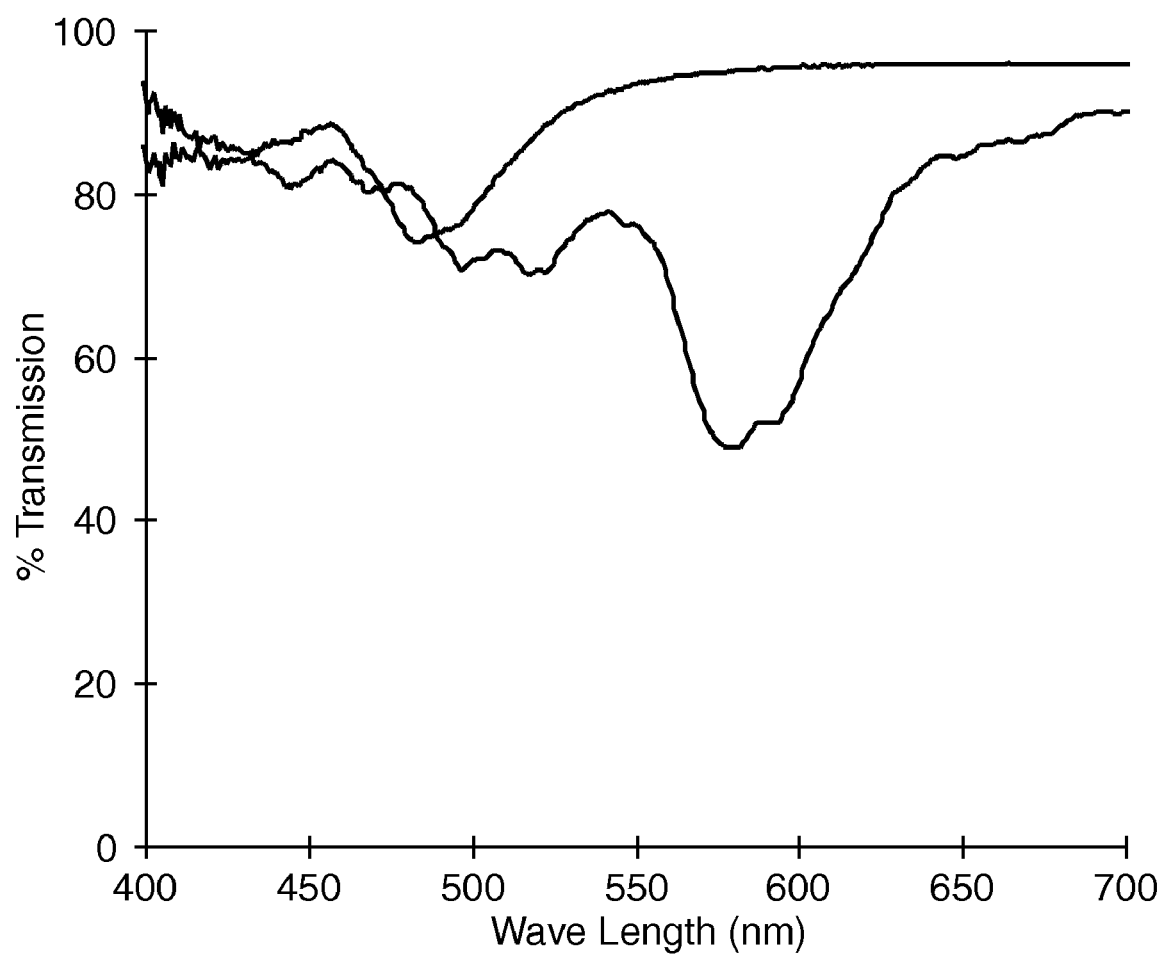

For comparison, film made by Mearl Corporation, presumably of isotropic materials (see FIG. 27) shows a noticeable loss in reflectivity for p-polarized light at a 60° angle (curve b, compared to curve a for normal incidence).

EXAMPLE 4

PET:Ecdel, 151, Mirror

A coextruded film containing 151 layers was made on a sequential flat-film-making line via a coextrusion process. A Polyethylene terephthalate (PET) with an Intrinsic Viscosity of 0.6 dl/g (60 wt phenol/40 wt. % dichlorobenzene) was delivered by one extruder at a rate of 75 pounds per hour and Ecdel 9966 (a thermoplastic elastomer available from Eastman Chemical) was delivered by another extruder at a rate of 65 pounds per hour. The PET was on the skin layers. The feedblock method was used to generate 151 layers. The web was length oriented to a draw ratio of about 3.5 with the web temperature at about 210° F. The film was subsequently preheated to about 215° F. in about 12 seconds and drawn in the transverse direction to a draw ratio of about 4.0 at a rate of about 25% per second. The film was then relaxed about 5% of its maximum width in a heat-set oven set at 400° F. in about 6 seconds. The finished film thickness was about 0.6 mil.

Figure 28:
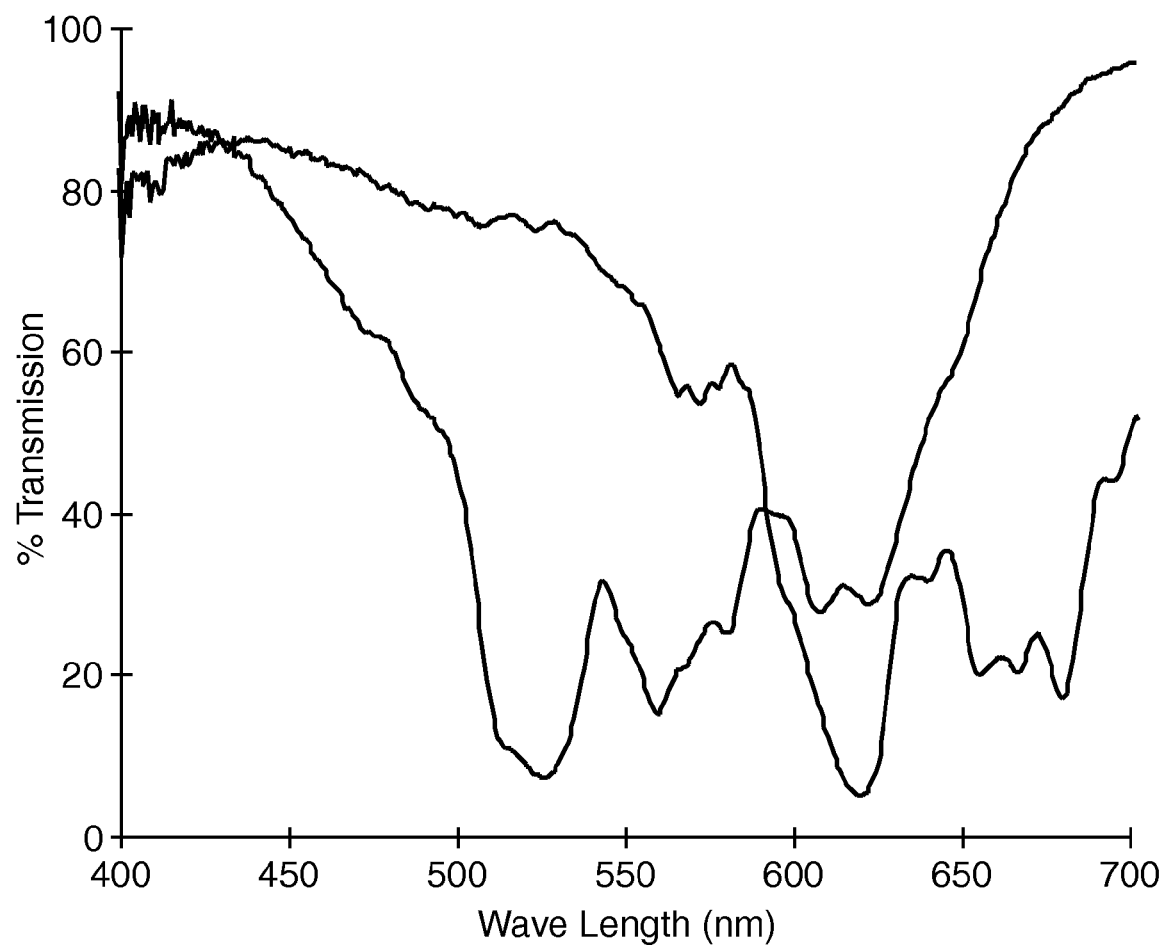
Figure 29:
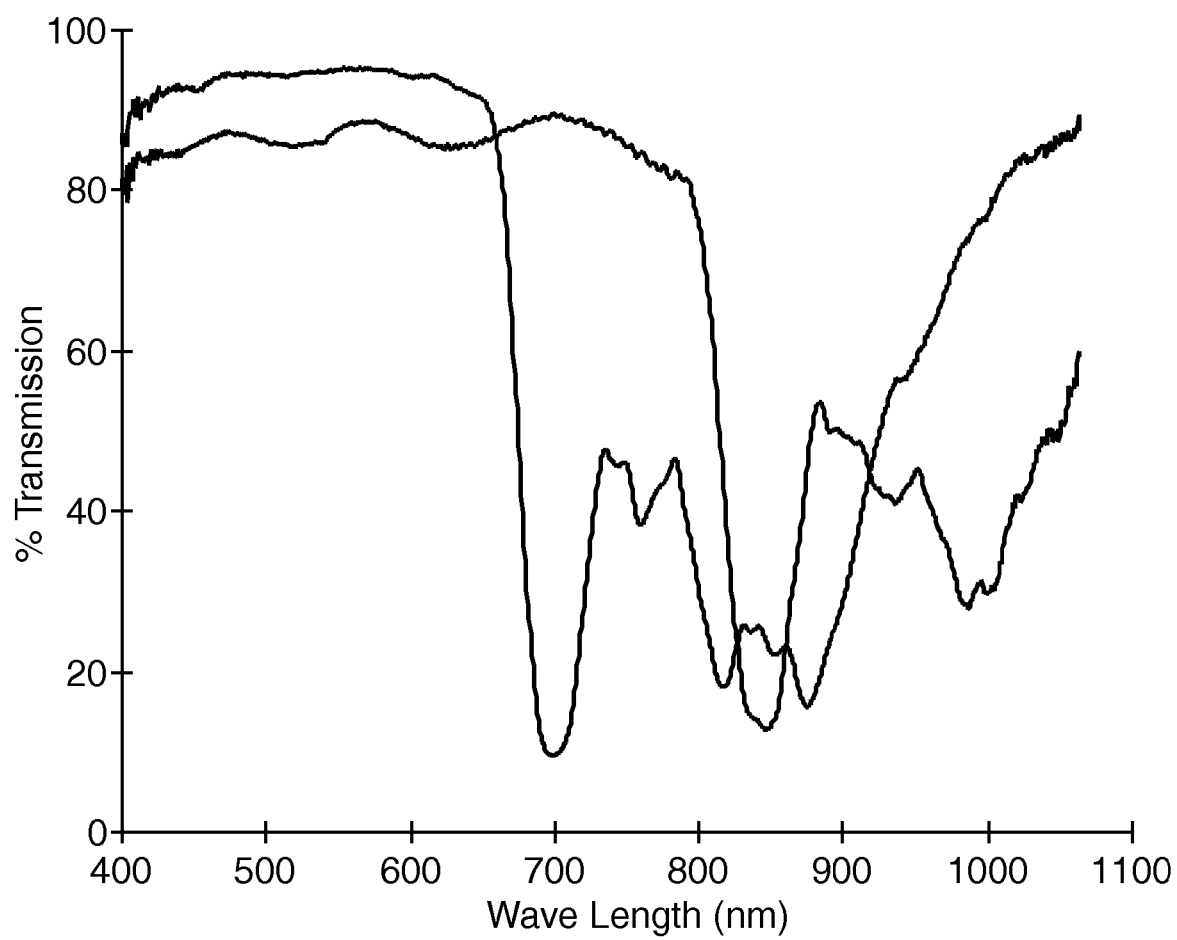

The transmission of this film is shown in FIG. 28. The % transmission for p-polarized light at a 60° angle (curve b) is similar the value at normal incidence (curve a) with a wavelength shift. At the same extrusion conditions the web speed was slowed down to make an infrared reflecting film with a thickness of about 0.8 mils. The transmission is shown in FIG. 29 (curve a at normal incidence, curve b at 60 degrees).

EXAMPLE 5

PEN:Ecdel, 225, Mirror

A coextruded film containing 225 layers was made by extruding the cast web in one operation and later orienting the film in a laboratory film-stretching apparatus. A Polyethylene naphthalate (PEN) with an Intrinsic Viscosity of 0.5 dl/g (60 wt. % phenol/40 wt. % dichlorobenzene) was delivered by one extruder at a rate of 18 pounds per hour and Ecdel 9966 (a thermoplastic elastomer available from Eastman Chemical) was delivered by another extruder at a rate of 17 pounds per hour. The PEN was on the skin layers. The feedblock method was used to generate 57 layers which was passed through two multipliers producing an extrudate of 225 layers. The cast web was 12 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 130° C. in 60 seconds. Stretching then commenced at 100%/sec (based on original dimensions) until the sample was stretched to about 3.5×3.5. Immediately after the stretching the sample was cooled by blowing room temperature air on it.

Figure 30:
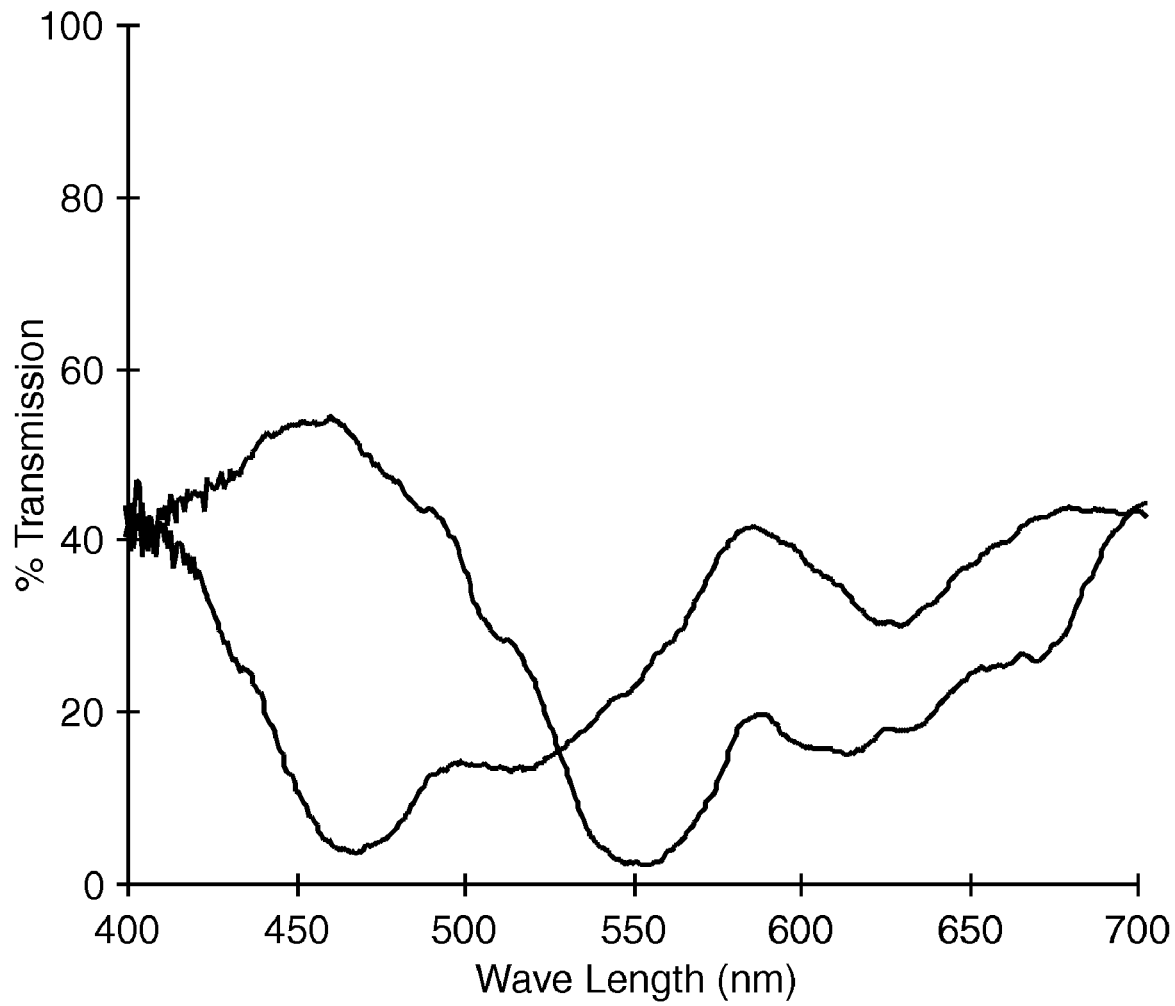

FIG. 30 shows the optical response of this multilayer film (curve a at normal incidence, curve b at 60 degrees). Note that the % transmission for p-polarized light at a 60° angle is similar to what it is at normal incidence (with some wavelength shift).

EXAMPLE 6

PEN:THV 500, 449, Mirror

A coextruded film containing 449 layers was made by extruding the cast web in one operation and later orienting the film in a laboratory film-stretching apparatus. A Polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 31:
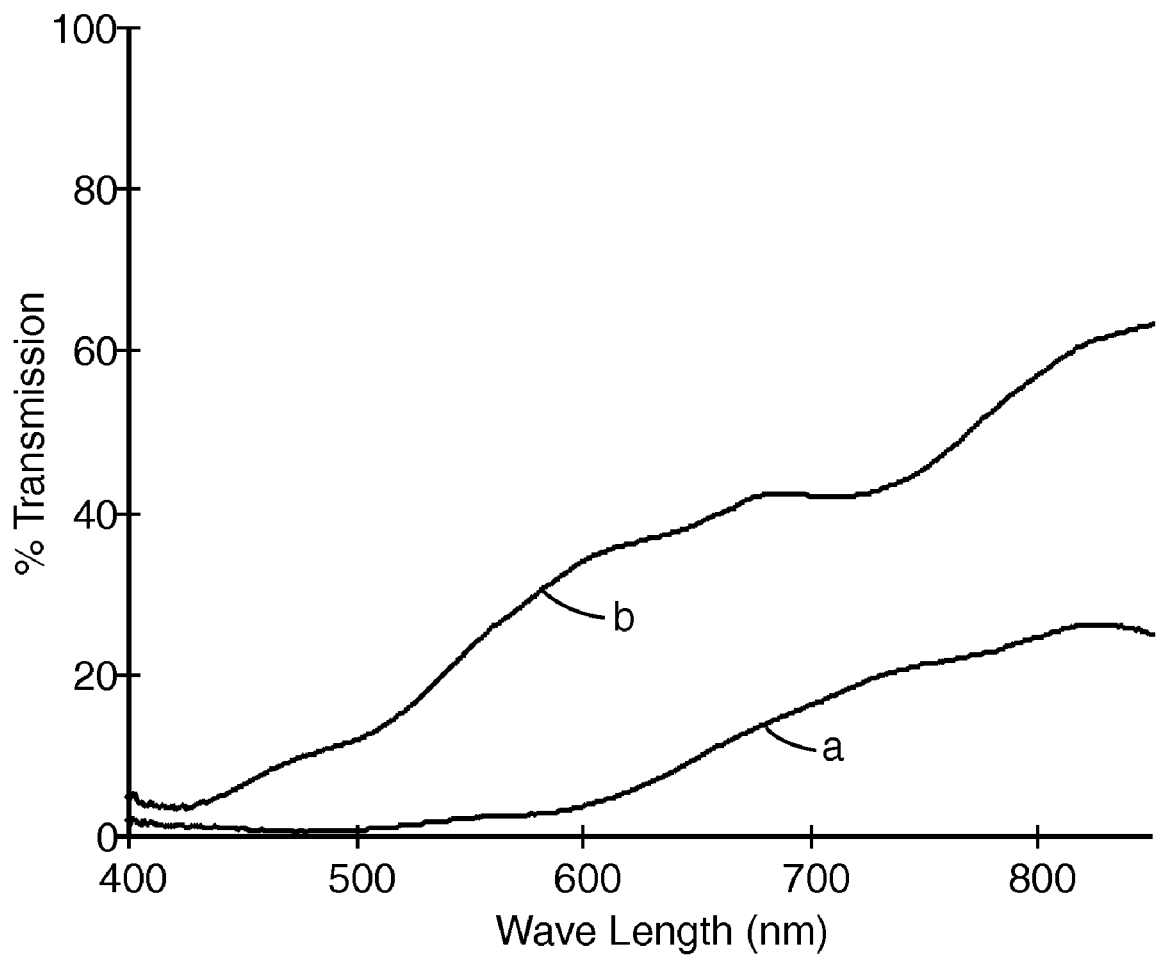

FIG. 31 shows the transmission of this multilayer film. Again, curve a shows the response at normal incidence, while curve b shows the response at 60 degrees.

EXAMPLE 7

PEN:CoPEN, 449—Low Color Polarizer

A coextruded film containing 449 layers was made by extruding the cast web in one operation and later orienting the film in a laboratory film-stretching apparatus. A Polyethylene naphthalate (PEN) with an Intrinsic Viscosity of 0.56 dl/g (60 wt. % phenol/40 wt. % dichlorobenzene) was delivered by one extruder at a rate of 43 pounds per hour and a CoPEN (70 mol % 2,6 NDC and 30 mol % DMT) with an intrinsic viscosity of 0.52 (60 wt. % phenol/40 wt. % dichlorobenzene) was delivered by another extruder at a rate of 25 pounds per hour. The PEN was on the skin layers and 40% of the PEN was present in the two skin layers. The feedblock method was used to generate 57 layers which was passed through three multipliers producing an extrudate of 449 layers. The cast web was 10 mils thick and 12 inches wide. The web was later uniaxially oriented using a laboratory stretching device that uses a pantograph to grip a square section of film and stretch it in one direction while it is constrained in the other at a uniform rate. A 7.46 cm square of web was loaded into the stretcher at about 100° C. and heated to 140° C. in 60 seconds. Stretching then commenced at 10%/sec (based on original dimensions) until the sample was stretched to about 5.5×1. Immediately after the stretching the sample was cooled by blowing room temperature air at it.

Figure 32:
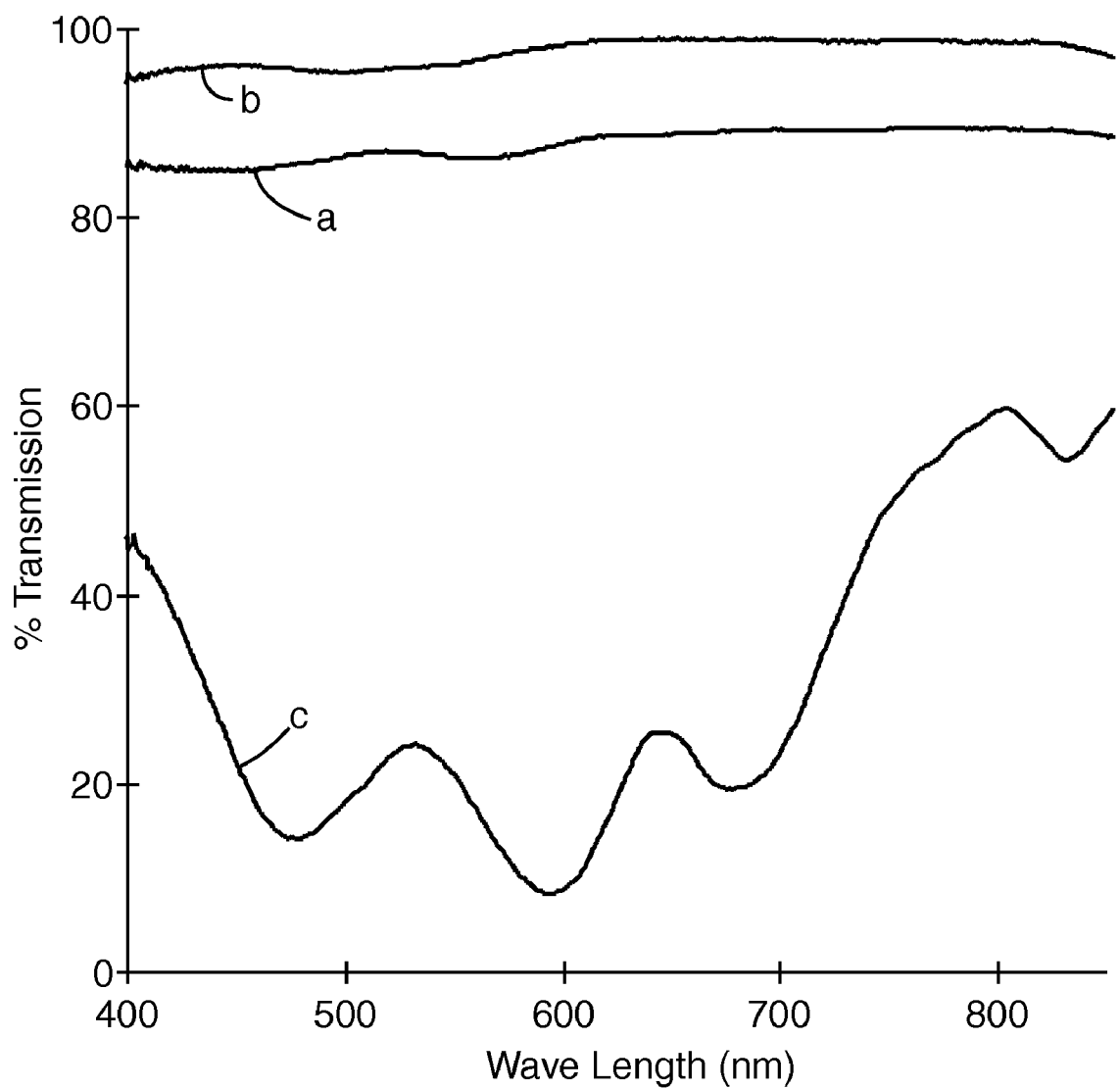
FIGS. 32-36 show optical performance of multilayer polarizers given in Examples 7-11.

FIG. 32 shows the transmission of this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of light polarized in the non-stretch direction at both normal and 60° incidence. Average transmission for curve a over 400-700 nm is 87.1%, while average transmission for curve b over 400-700 nm is 97.1%. Transmission is higher for p-polarized light at 60° incidence because the air/PEN interface has a Brewster angle near 60°, so the transmission at 60° incidence is nearly 100%. Also note the high extinction of light polarized in the stretched direction in the visible range (400-700 nm) shown by curve c, where the average transmission is 21.0%. The % RMS color for curve a is 1.5%. The % RMS color for curve b is 1.4%.

EXAMPLE 8

PEN:CoPEN, 601—High Color Polarizer

A coextruded film containing 601 layers was produced by extruding the web and two days later orienting the film on a different tenter than described in all the other examples. A Polyethylene Naphthalate (PEN) with an Intrinsic Viscosity of 0.5 dl/g (60 wt. % phenol/40 wt. % dichlorobenzene) was delivered by one extruder at a rate of 75 pounds per hour and a CoPEN (70 mol % 2,6 NDC and 30 mol % DMT) with an IV of 0.55 dl/g (60 wt. % phenol/40 wt. % dichlorobenzene) was delivered by another extruder at a rate of 65 pounds per hour. The PEN was on the skin layers. The feedblock method was used to generate 151 layers which was passed through two multipliers producing an extrudate of 601 layers. U.S. Pat. No. 3,565,985 describes similar coextrusion multipliers. All stretching was done in the tenter. The film was preheated to about 280° F. in about 20 seconds and drawn in the transverse direction to a draw ratio of about 4.4 at a rate of about 6% per second. The film was then relaxed about 2% of its maximum width in a heat-set oven set at 460° F. The finished film thickness was 1.8 mil.

Figure 33:
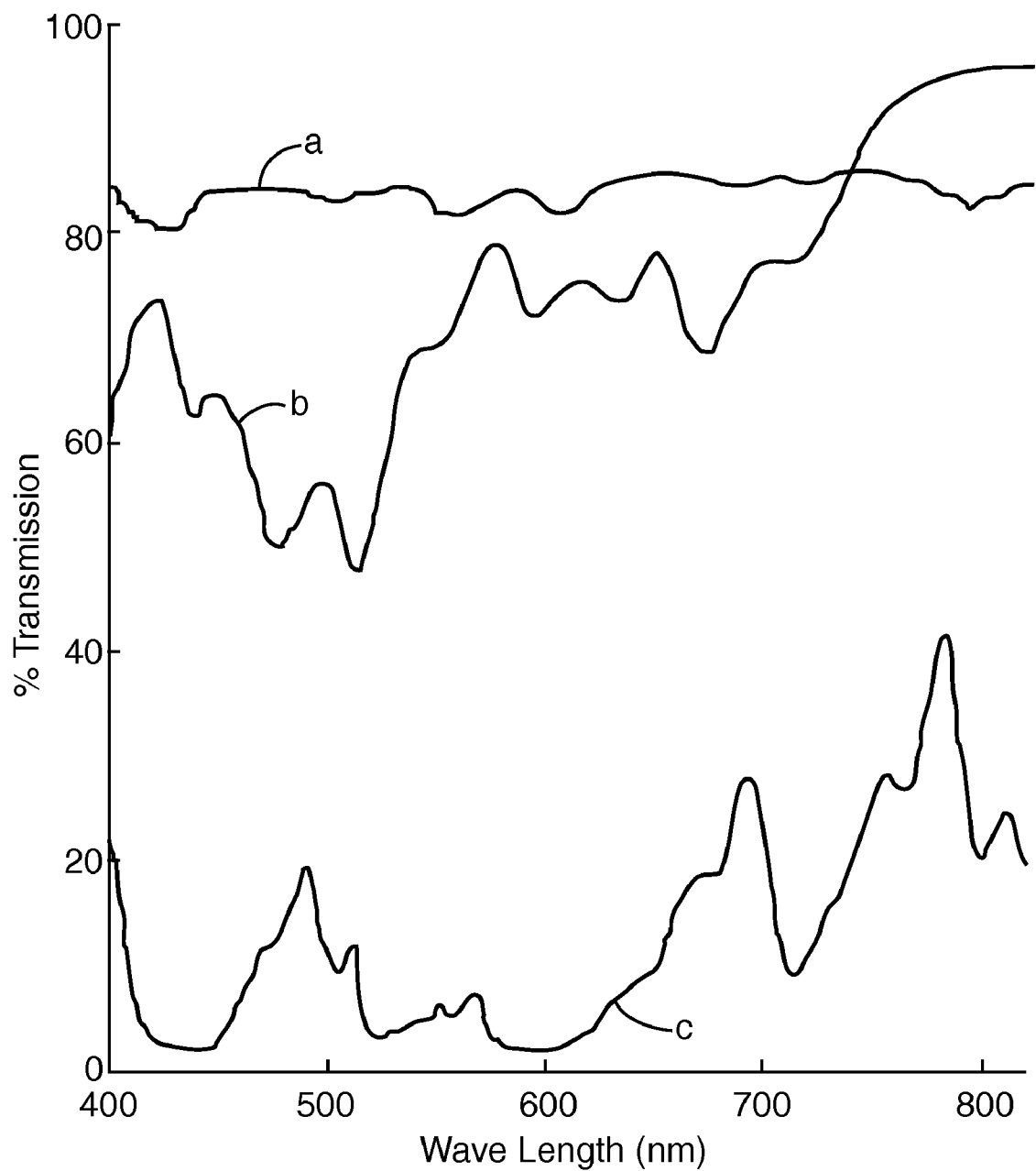

The transmission of the film is shown in FIG. 33. Curve a shows transmission of light polarized in the non-stretch direction at normal incidence, curve b shows transmission of p-polarized light at 60° incidence, and curve c shows transmission of light polarized in the stretch direction at normal incidence. Note the nonuniform transmission of p-polarized light at both normal and 60° incidence. The average transmission for curve a over 400-700 nm is 84.1%, while the average transmission for curve b over 400-700 nm is 68.2%. The average transmission for curve c is 9.1%. The % RMS color for curve a is 1.4%, and the % RMS color for curve b is 11.2%.

EXAMPLE 9

PET:CoPEN, 449, Polarizer

A coextruded film containing 449 layers was made by extruding the cast web in one operation and later orienting the film in a laboratory film-stretching apparatus. A Polyethylene Terephthalate (PET) with an Intrinsic Viscosity of 0.60 dl/g (60 wt. % phenol/40 wt. % dichlorobenzene) was delivered by one extruder at a rate of 26 pounds per hour and a CoPEN (70 mol % 2,6 NDC and 30 mol % DMT) with an intrinsic viscosity of 0.53 (60 wt. % phenol/40 wt. % dichlorobenzene) was delivered by another extruder at a rate of 24 pounds per hour. The PET was on the skin layers. The feedblock method was used to generate 57 layers which was passed through three multipliers producing an extrudate of 449 layers. U.S. Pat. No. 3,565,985 describes similar coextrusion multipliers. The cast web was 7.5 mils thick and 12 inches wide. The web was later uniaxially oriented using a laboratory stretching device that uses a pantograph to grip a square section of film and stretch it in one direction while it is constrained in the other at a uniform rate. A 7.46 cm square of web was loaded into the stretcher at about 100° C. and heated to 120° C. in 60 seconds. Stretching then commenced at 10%/sec (based on original dimensions) until the sample was stretched to about 5.0×1. Immediately after the stretching the sample was cooled by blowing room temperature air at it. The finished film thickness was about 1.4 mil. This film had sufficient adhesion to survive the orientation process with no delamination.

Figure 34:
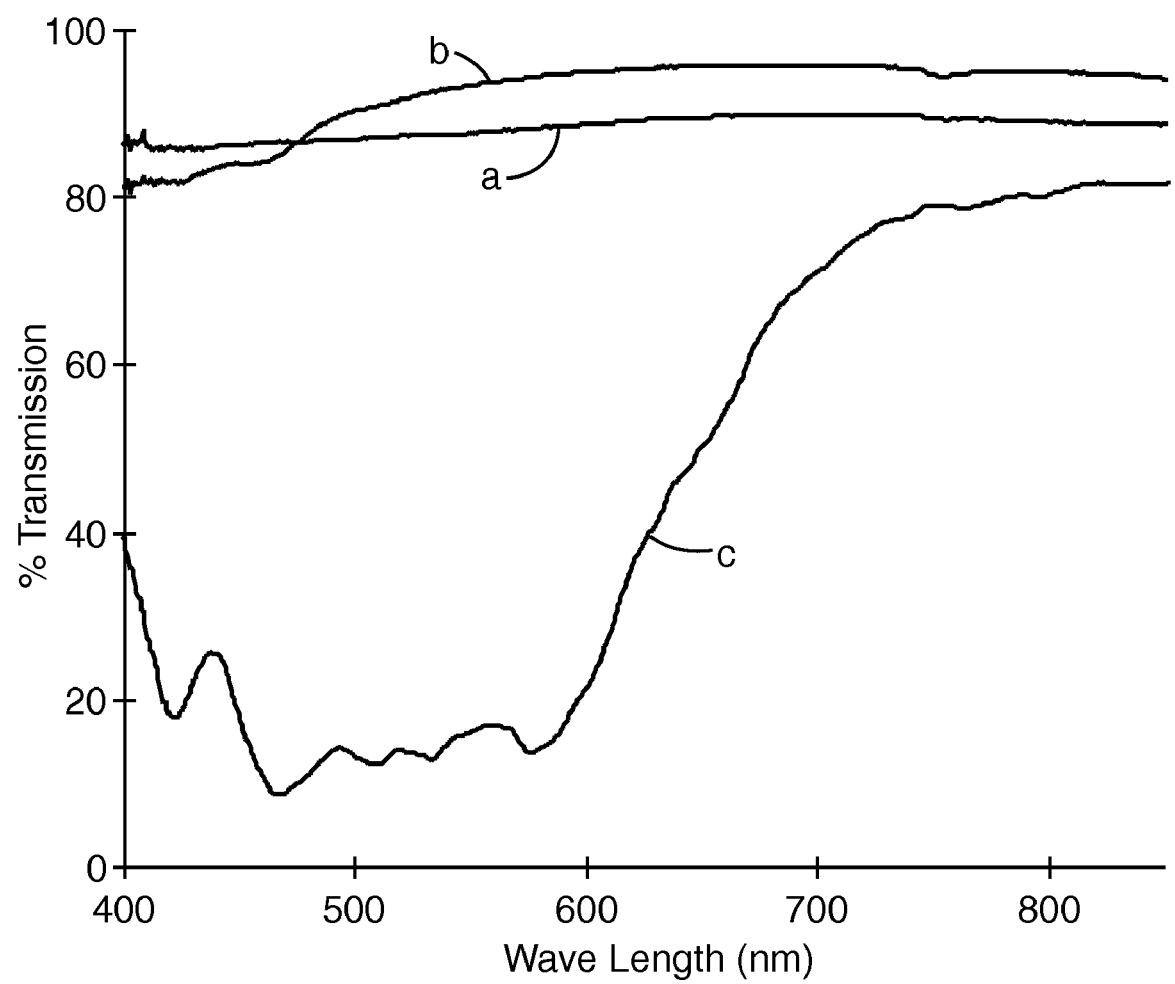

FIG. 34 shows the transmission of this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. The average transmission for curve a over 400-700 nm is 88.0%, and the average transmission for curve b over 400-700 nm is 91.2%. The average transmission for curve c over 400-700 nm is 27.9%. The % RMS color for curve a is 1.4%, and the % RMS color for curve b is 4.8%.

EXAMPLE 10

PEN:CoPEN, 601, Polarizer

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 15% dimethyl isophthalate and 15% dimethyl terephthalate with ethylene glycol. The feedblock method was used to generate 151 layers. The feedblock was designed to produce a gradient distribution of layers with a ration of thickness of the optical layers of 1.22 for the PEN and 1.22 for the coPEN. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 35:
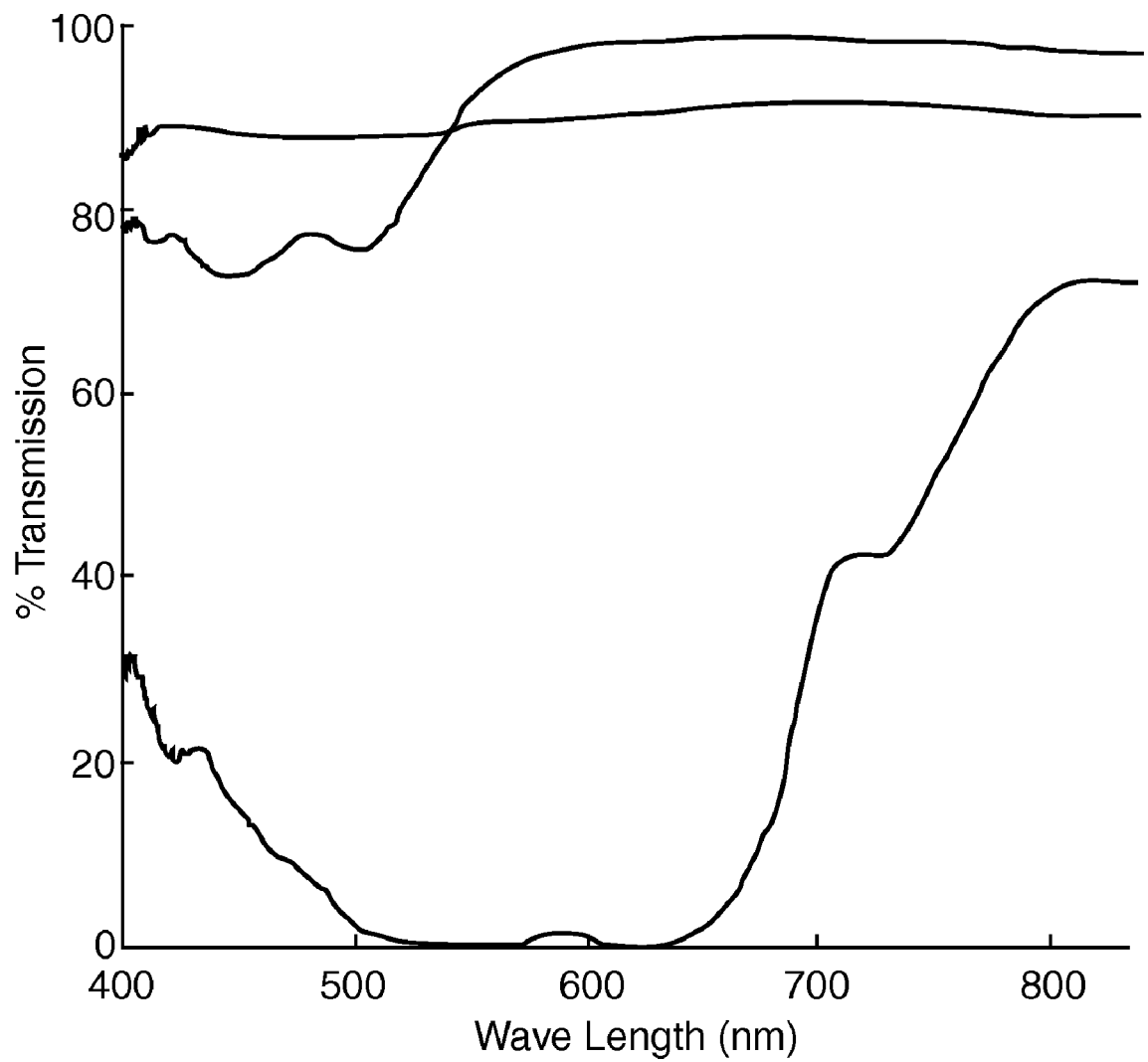

FIG. 35 shows the transmission for this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence (80-100%). Also note the very high extinction of light polarized in the stretched direction in the visible range (400-700 nm) shown by curve c. Extinction is nearly 100% between 500 and 650 nm.

EXAMPLE 11

PEN:sPS, 481, Polarizer

A 481 layer multilayer film was made from a polyethylene naphthalate (PEN) with an intrinsic viscosity of 0.56 dl/g measured in 60 wt. % phenol and 40 wt % dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2×) multipliers were used. Equal thickness skin layers containing the same PEN fed to the feedblock were added after the final multiplier at a total rate of 22 pounds per hour. The web was extruded through a 12" wide die to a thickness or about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 36:
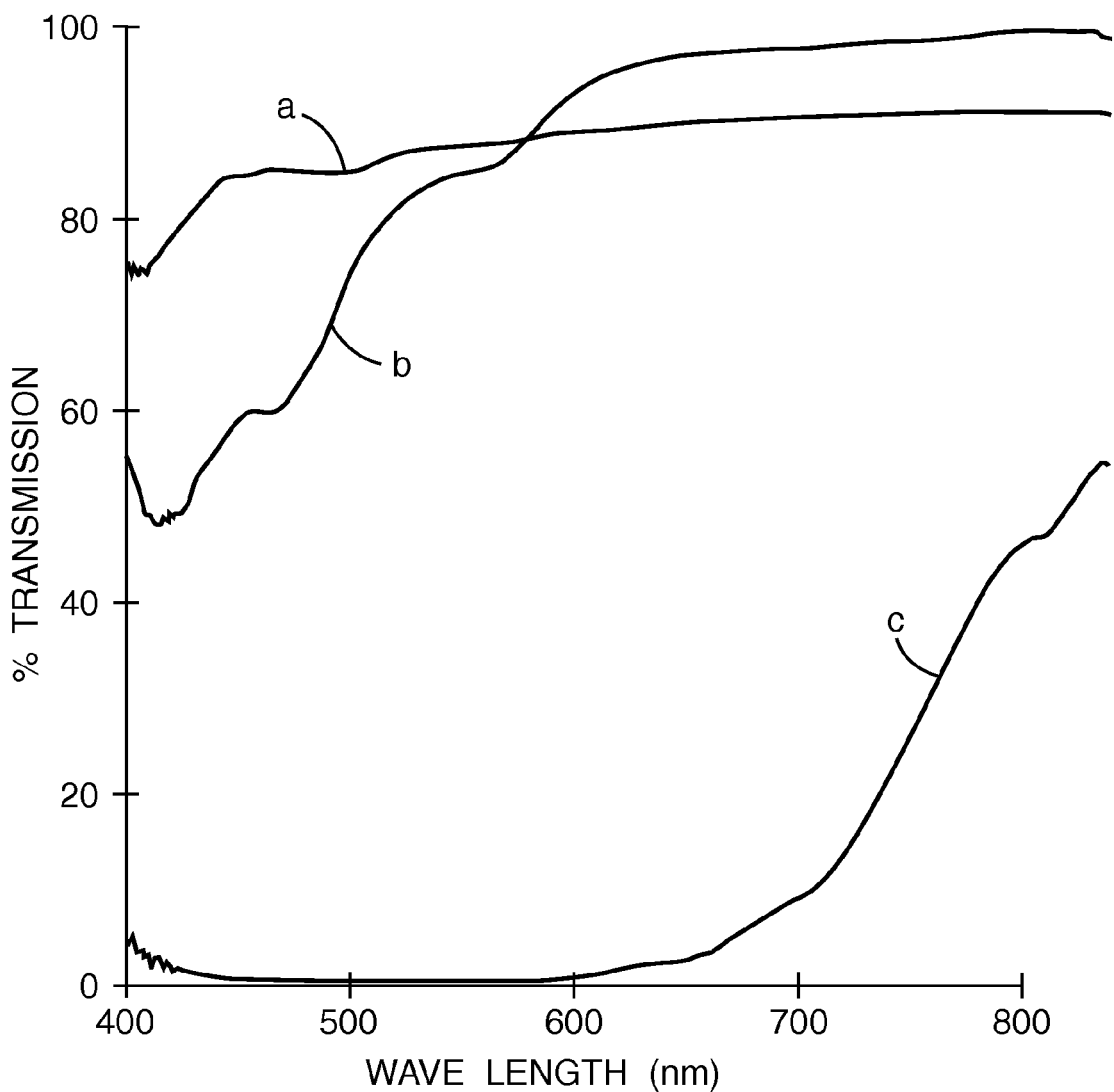

FIG. 36 shows the optical performance of this PEN:sPS reflective polarizer containing 481 layers. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. Average transmission for curve a over 400-700 nm is 86.2%, the average transmission for curve b over 400-700 nm is 79.7%. Also note the very high extinction of light polarized in the stretched direction in the visible range (400-700 nm) shown by curve c. The film has an average transmission of 1.6% for curve c between 400 and 700 nm. The % RMS color for curve a is 3.2%, while the % RMS color for curve b is 18.2%.

EXAMPLE 12

PET:Ecdel, 601, Mirror

A coextruded film containing 601 layers was made on a sequential flat-film-making line via a coextrusion process. A Polyethylene terephthalate (PET) with an Intrinsic Viscosity of 0.6 dl/g (60 wt. % phenol/40 wt. % dichlorobenzene) was delivered to the feedblock at a rate of 75 pounds per hour and Ecdel 9967 (a thermoplastic elastomer available from Eastman Chemical) was delivered at a rate of 60 pounds per hour. The PET was on the skin layers. The feedblock method was used to generate 151 layers which was passed through two multipliers producing an extrudate of 601 layers. The multipliers had a nominal multiplication ratio of 1.2 (next to feedblock) and 1.27. Two skin layers at a total throughput of 24 pounds per hour were added symmetrically between the last multiplier and the die. The skin layers were composed of PET and were extruded by the same extruder supplying the PET to the feedblock. The web was length oriented to a draw ratio of about 3.3 with the web temperature at about 205° F. The film was subsequently preheated to about 205° F. in about 35 seconds and drawn in the transverse direction to a draw ratio of about 3.3 at a rate of about 9% per second. The film was then relaxed about 3% of its maximum width in a heat-set oven set at 450° F. The finished film thickness was about 0.0027 inches.

Figure 37:
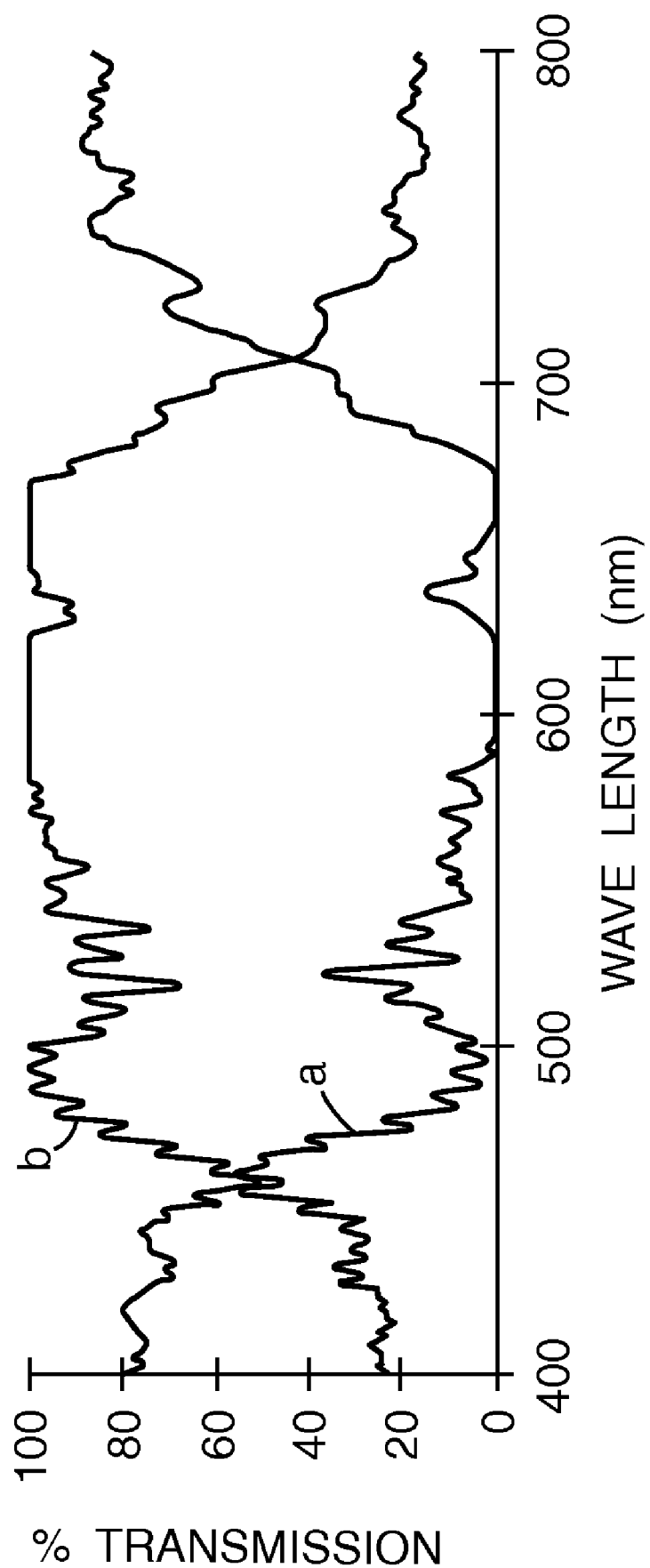
FIG. 37 shows optical performance of the multilayer mirror given in Example 12.

The film provided the optical performance as shown in FIG. 37. Transmission is plotted as curve a and reflectivity is plotted as curve b. The luminous reflectivity for curve b is 91.5%.

EXAMPLE 13

PEN: CoPEN, 601, Antireflected Polarizer

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 30% dimethyl terephthalate with ethylene glycol. The feedblock method was used to generate 151 layers. The PEN skin layers were coextruded on the outside of the optical stack with a total thickness of 8% of the coextruded layers. The feedblock was designed to make a linear gradient in layer thickness for a 149 layer optical stack with the thinnest layers on one side of the stack. The individual layer thicknesses were designed in pairs to make equal thickness layers of the PEN and coPEN for each pair. Each pair thickness, d, was determined by the formula $d=d_o + d_o*0.003*n$, where $d_o$ is the minimum pair thickness, and n is the pair number between 1 and 75. The optical stack was multiplied by two sequential multipliers. The nominal multiplication ratio of the multipliers were 1.2 and 1.27, respectively. The film was subsequently preheated to 320° F. in about 40 seconds and drawn in the transverse direction to a draw ratio of about 5.0 at a rate of 6% per second. The finished film thickness was about 2 mils.

A silical sol gel coating was then applied to one side of the reflecting polarizer film. The index of refraction of this coating was approximately 1.35. Two pieces of the AR coated reflecting polarizer film were cut out and the two were laminated to each other with the AR coatings on the outside. Transmission spectra of polarized light in the crossed and parallel directions were obtained. The sample was then rinsed with a 2% solution of ammonium bifluoride (NH4 HF2) in deonized water to remove the AR coating. Spectra of the bare multilayer were then taken for comparison to the coated sample.

Figure 38:
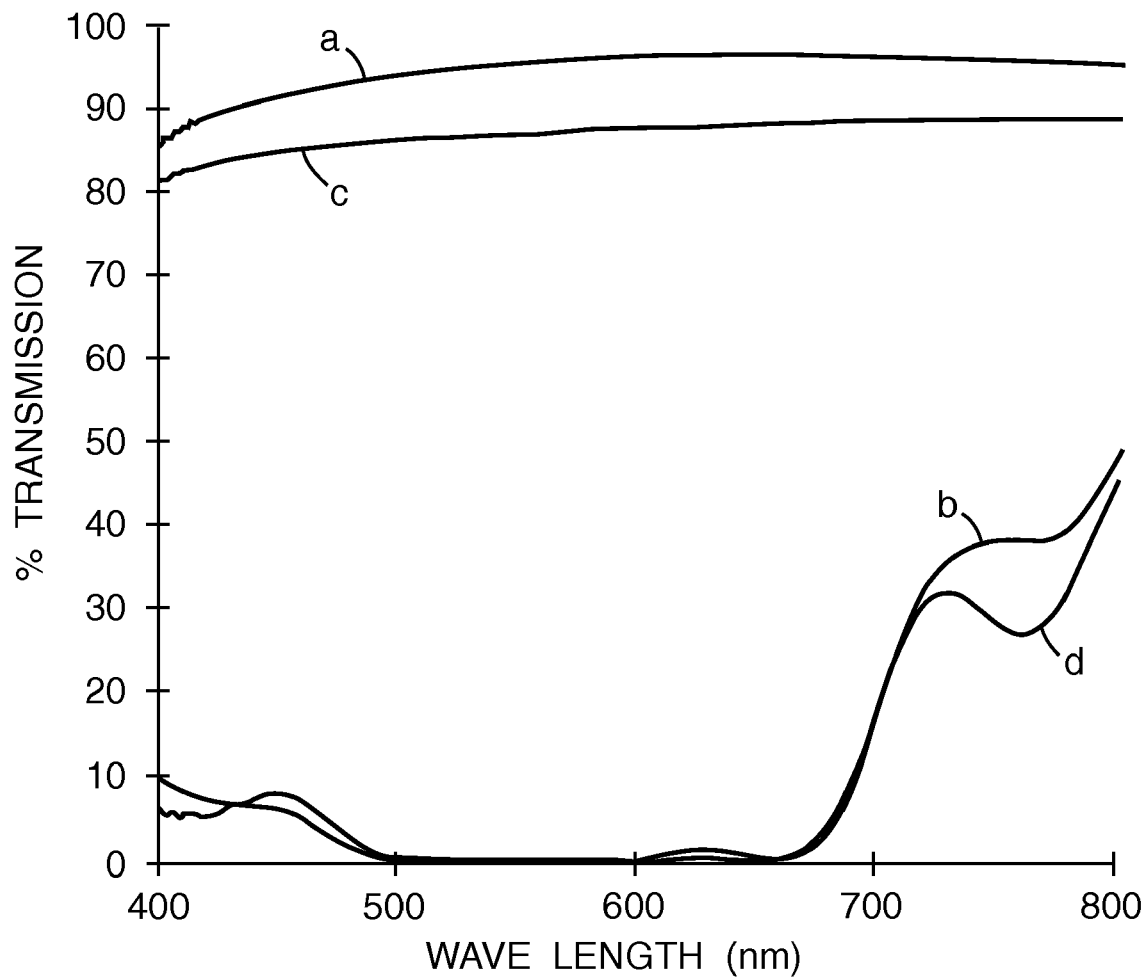
FIG. 38 shows optical performance of the AR coated polarizer given in Example 13.

FIG. 38 shows the spectra of the coated and uncoated polarizer. Curves a and b show the transmission and extinction, respectively, of the AR coated reflecting polarizer, and curves c and d show the transmission and extinction, respectively, of the uncoated reflecting polarizer. Note that the extinction spectrum is essentially unchanged, but that the transmission values for the AR coated polarizer are almost 10% higher. Peak gain was 9.9% at 565 nm, while the average gain from 425 to 700 nm was 9.1%. Peak transmission of the AR coated polarizer was 97.0% at 675 nm. Average transmissions for curve a over 400-700 nm was 95.33%, and average transmission for curve d over 400-700 nm was 5.42%.

EXAMPLE 14

PET:Ecdel, 601, Polarizer

A coextruded film containing 601 layers was made on a sequential flat-film-making line via a coextrusion process. A polyethylene terephthalate (PET) with an Intrinsic Viscosity of 0.6 dl/g (60 wt. % phenol/40 wt. % dichlorobenzene) was delivered to a feedblock by one extruder at a rate of 75 pounds per hour and Ecdel 9967 (a thermoplastic elastomer available from Eastman Chemical) was delivered to the feedblock by another extruder at a rate of 60 pounds per hour. The PET was on the skin layers. The feedblock method was used to generate 151 layers which passed through two multipliers (2×) producing an extrudate of 601 layers. A side stream with a throughput of 50 pounds per hour was taken from the PET extruder and used to add two skin layers between the last multiplier and the die. The web was length oriented to a draw ratio of about 5.0 with the web temperature at about 210° F. The film was not tentered. The finished film thickness was about 2.7 mil.

Figure 39:
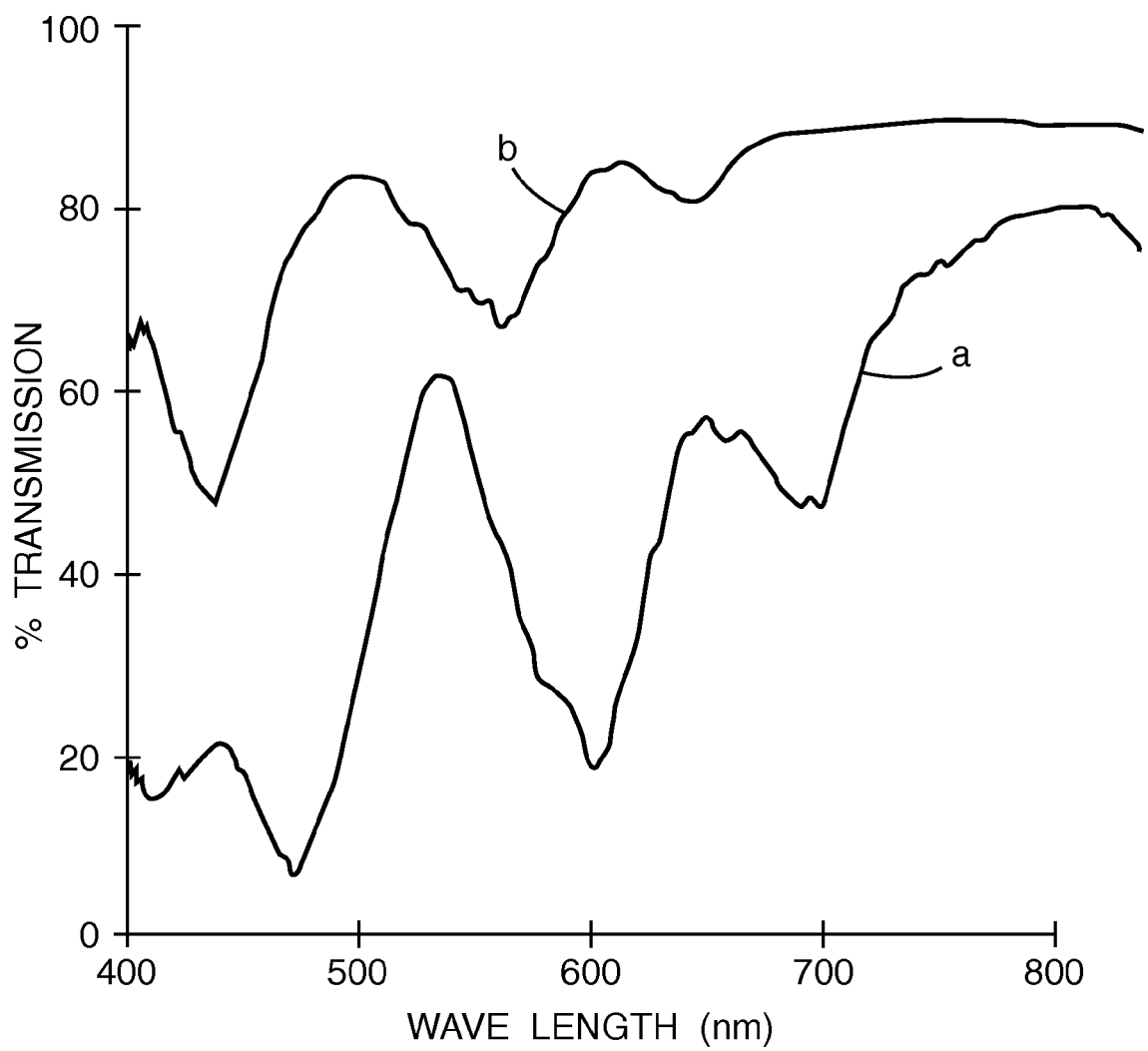
FIG. 39 shows optical performance of the polarizer given in Example 14.

FIG. 39 shows the transmission for this film. Curve a shows the transmission of light polarized in the stretch direction, while curve b shows the transmission of light polarized orthogonal to the stretch direction. The average transmission from 400-700 nm for curve a is 39.16%.

EXAMPLE 15

PEN:CoPEN, 449, Polarizers

A coextruded film containing 449 layers was made by extruding the cast web in one operation and later orienting the film in a laboratory film-stretching apparatus. A polyethylene naphthalate (PEN) with an Intrinsic Viscosity of 0.53 dl/g (60 wt. % phenol/40 wt. % dichlorobenzene) was delivered by one extruder at a rate of 26.7 pounds per hour to the feedblock and a different material was delivered by second extruder at a rate of 25 pounds per hour to the feedblock. The PEN was the skin layers. The feedblock method was used to generate 57 layers which passed through three multipliers producing an extrudate of 449 layers. The cast web was 0.0075 mils thick and 12 inches wide. The web was later uniaxially oriented using a laboratory stretching device that uses a pantograph to grip a square section of film and stretch it in one direction at a uniform rate while it is constrained in the other. A 7.46 cm square of web was loaded into the stretcher at about 100° C. and heated to 140° C. for 60 seconds. Stretching then commenced at 10%/sec (based on original dimensions) until the sample was stretched to about 5.5×1. Immediately after stretching, the sample was cooled by blowing room temperature air at it.

The input to the second extruder was varied by blending pellets of the following poly(ethylene esters) three materials: (i) a CoPEN (70 mol % 2,6-napthalene dicarboxylate and 30 mol % terephthalate) with an intrinsic viscosity of 0.52 (60 wt. % phenol/40 wt. % dichlorobenzene); (ii) the PEN, same material as input to first extruder; (iii) a PET, with an intrinsic viscosity of 0.95 (60 wt. % phenol/40 wt. % dichlorobenzene). TTF 9506 purchased from Shell.

Figure 40A:
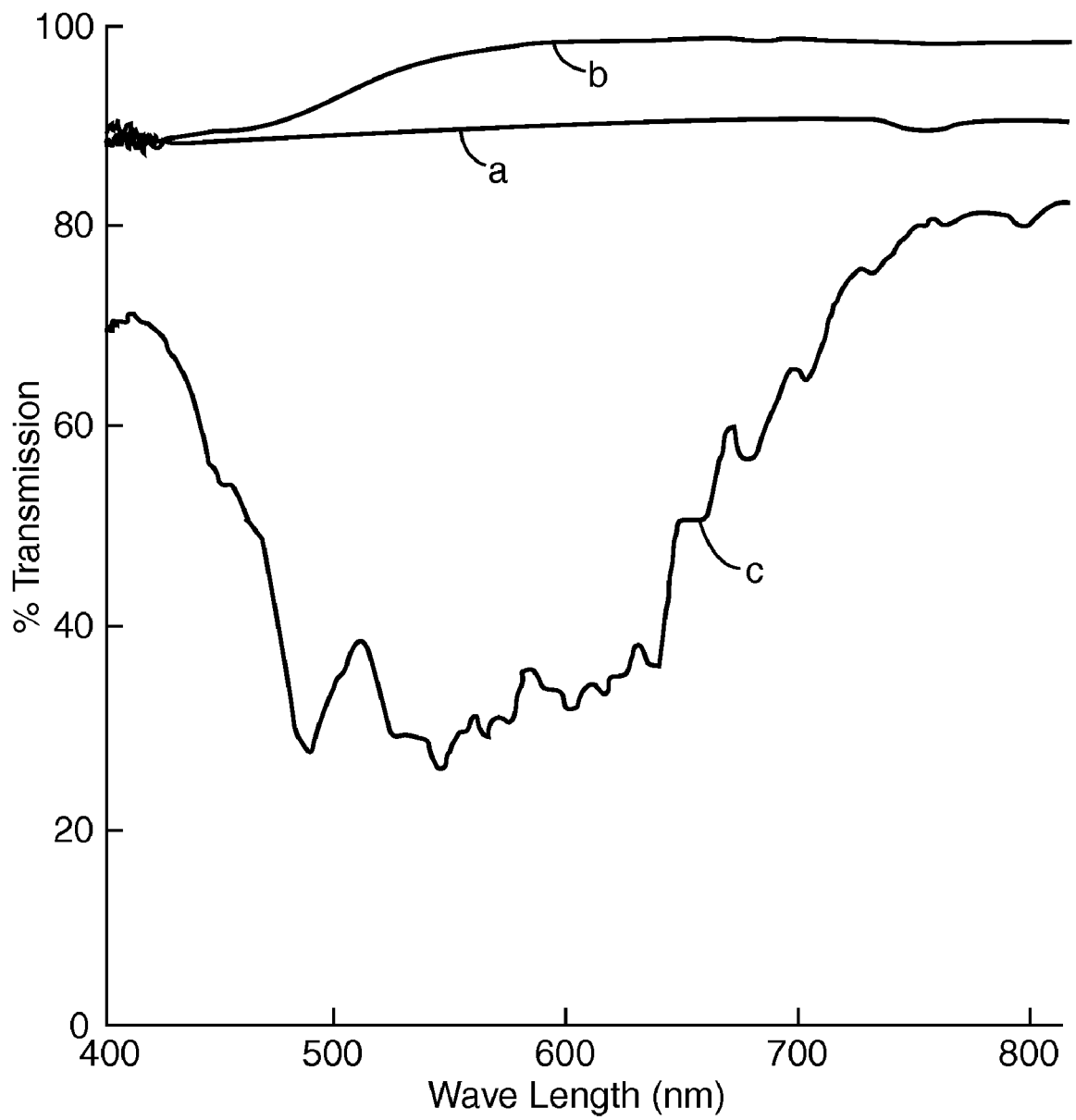
FIGS. 40A-40C show optical performance of multilayer polarizers given in Example 15.
Figure 40B:
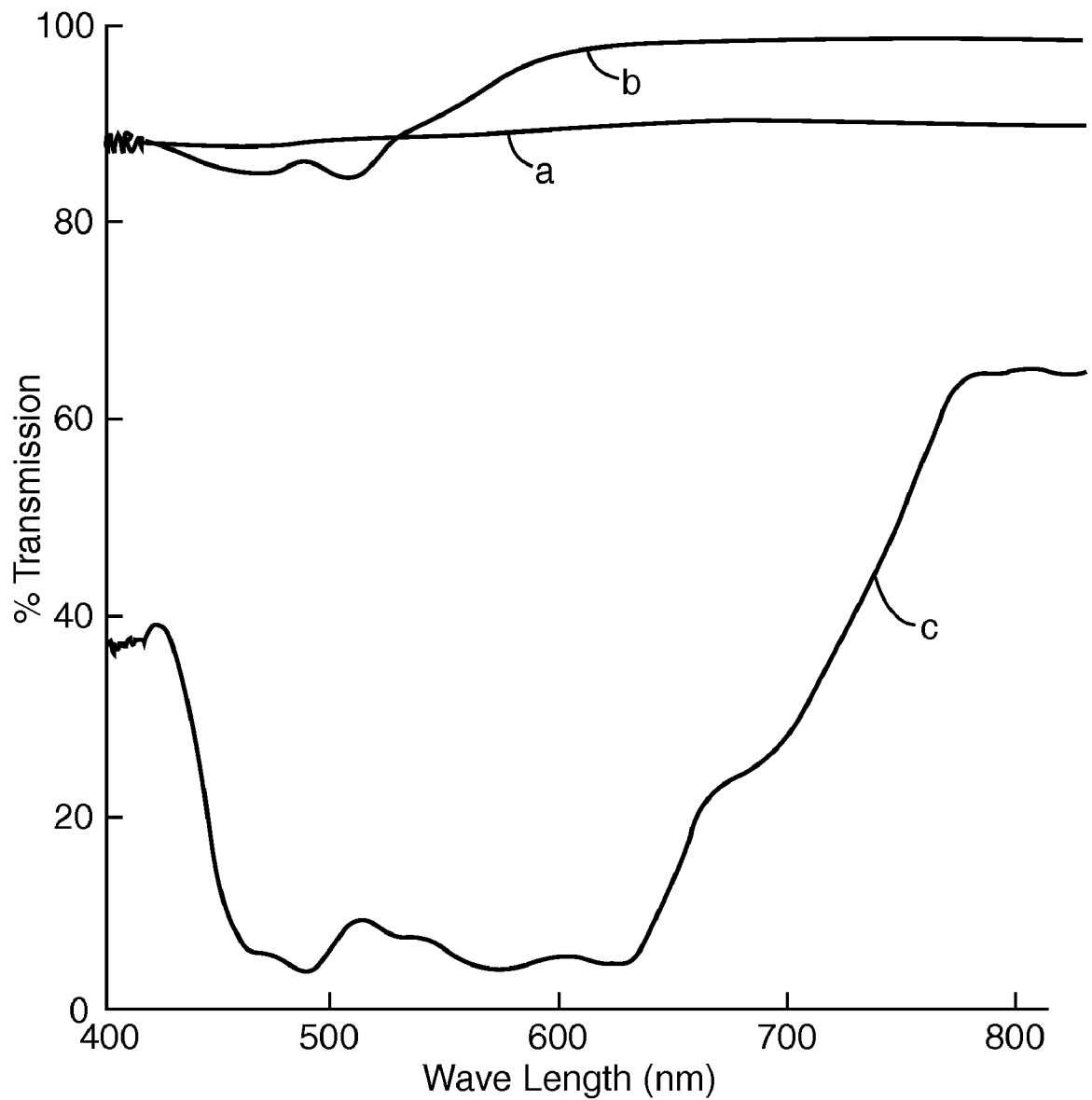
Figure 40C:
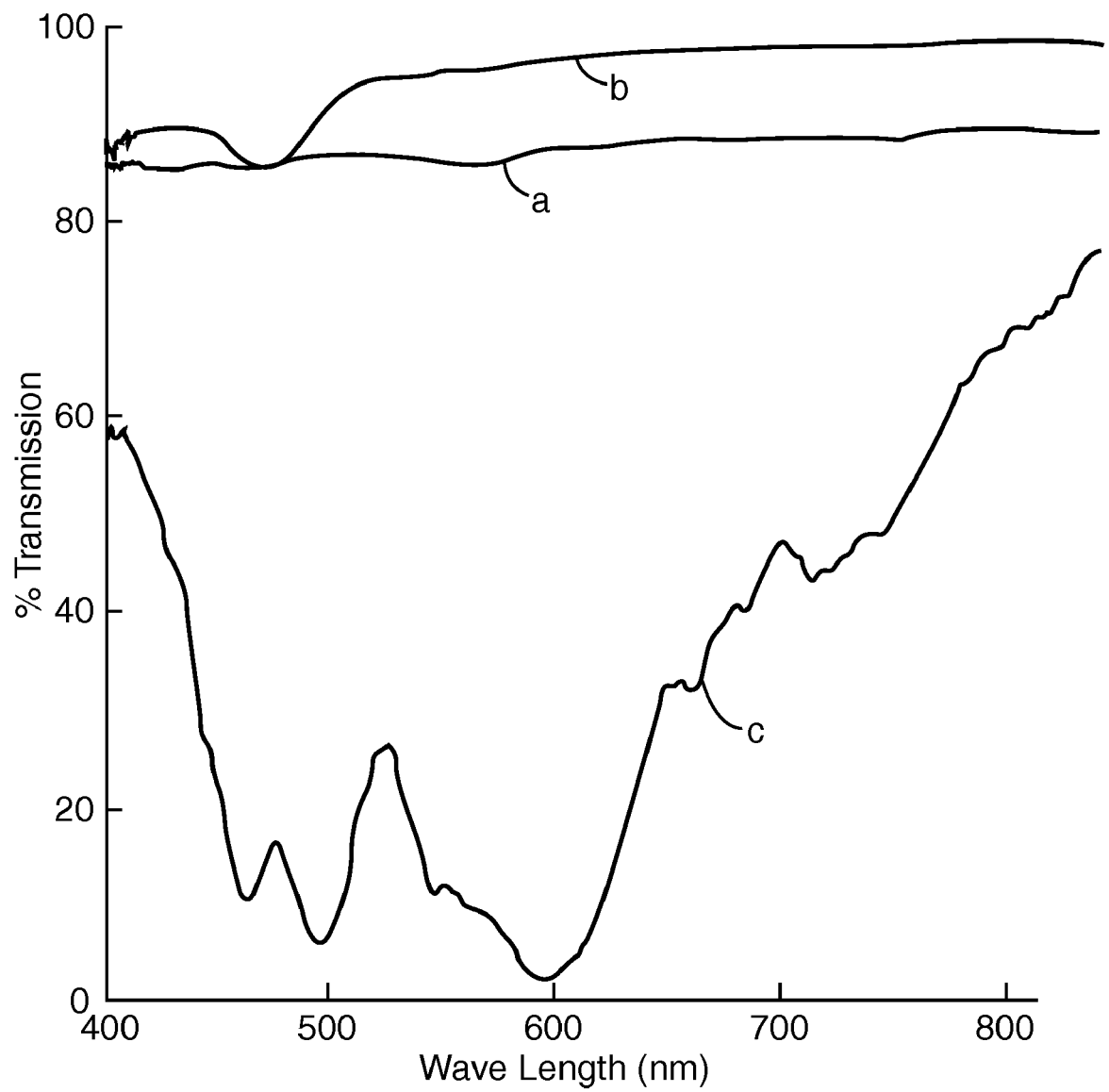

For the film shown in FIG. 40A the input to the second extruder was 80 wt % of the CoPEN and 20 wt % of the PEN; for the film shown in FIG. 40B the input to the second extruder was 80 wt % of the CoPEN and 20 wt % of the PET; for the film shown in FIG. 40C the input to the second extruder was CoPEN.

FIGS. 40A, 40B, and 40C show the transmission of these multilayer films where curve a shows transmission of light polarized in the non-stretch direction at normal incidence, curve b shows transmission of p-polarized light polarized in the non-stretched direction at 60° incidence, and curve c shows transmission of light polarized in the stretch direction at normal incidence. Note that the optical response of these films is sensitive to the chemical composition of the layers from the second extruder. The average transmission for curve c in FIG. 40A is 43.89%, the average transmission for curve c in FIG. 40B is 21.52%, and the average transmission for curve c in FIG. 40C is 12.48%. Thus, extinction is increased from FIG. 40A to FIG. 40C.

For the examples using the 57 layer feedblock, all layers were designed for only one optical thickness (¼ of 550 nm), but the extrusion equipment introduces deviations in the layer thicknesses throughout the stack resulting in a fairly broadband optical response. For examples made with the 151 layer feedblock, the feedblock is designed to create a distribution of layer thicknesses to cover a portion of the visible spectrum. Asymmetric multipliers were then used to broaden the distribution of layer thicknesses to cover most of the visible spectrum as described in U.S. Pat. Nos. 5,094,788 and 5,094,793.

The above described principles and examples regarding the optical behavior of multilayer films can be applied to any of the display configurations shown in FIGS. 1-3, 6, 9-11 or 13. In a display such as that shown in FIGS. 1-3, where the reflective polarizer is located between an LCD panel and an optical cavity, a high color polarizer may be used, especially if the optical cavity produces substantially collimated light. The high color polarizer does not uniformly transmit light at wide angles from the normal, which results in the nonuniform appearance and "color" off-axis. However, for those applications where a collimated light source is used, the off-axis performance of the reflective polarizer is less important.

Alternatively, in applications where a diffuser is located between the reflective polarizer and the LCD panel, a wide angle, low color polarizer is preferable. In this configuration, the diffuser will operate to randomize the direction of light incident on it from the reflective polarizer. If the reflective polarizer were not low color, then some of the off-axis color generated by the reflective polarizer would be redirected toward the normal by the diffuser. This would result in a display with a nonuniform appearance at normal viewing angles. Thus, for a display in which a diffuser is located between the reflective polarizer and the LCD panel, a low color, wide angle reflective polarizer is preferred.

Another advantage of a low color, wide angle polarizer in the displays shown in FIGS. 1-3 is that the undesired polarization is reflected not only at normal angles of incidence, but also at high off-axis angles. This allows even further randomization and recycling of light to occur, thus resulting in further brightness gains for the display system.

In the displays of FIGS. 1-3, the reflective polarizer could be laminated or otherwise similarly adhered to or attached to the optical cavity and/or to the rear of the LCD panel. Laminating the reflective polarizer to the optical cavity eliminates the air gap between them and thus reduces surface reflections which would otherwise occur at the air/reflective polarizer boundary. These reflection reduce the total transmission of the desired polarization. By attaching the reflective polarizer to the optical cavity, the surface reflections are reduced and total transmission of the desired polarization is increased.

If the reflective polarizer is not so attached to the optical cavity, use of an AR coated polarizer such as that described in Example 13 may be desirable. The AR coated polarizer described in Example 13 was place between the optical cavity and the LCD panel in a backlight computer display (Zenith Data Systems model Z-lite 320L). The brightness of the resulting display was measured with a Minolta brand luminance meter, model LS-100, at 90 degrees to the display surface and at a distance of 1 foot. The measured brightness of the modified display was 36.9 ft-lamberts. This was compared to the brightness of the unmodified display of 23.1 ft-lamberts, for a gain of 60% over the original, unmodified display. The brightness of the display using the reflective polarizer without the AR coating was measured at 33.7 ft-lamberts. The AR coated reflective polarizer gave a 9.5% brighter display than did the non-AR coated reflective polarizer.

For the display configurations shown in FIGS. 9 and 10, a brightness enhanced reflective polarizer is placed between the LCD panel and the optical cavity. In these configurations, a low color, wide angle reflective polarizer is preferred. This is due to the beam turning effect of the structured surface material. The effect can be described with respect to FIG. 7. For a brightness enhanced reflective polarizer, light first passes through the reflective polarizing element. Thus, a beam having a large off-axis angle, such as beam 236 in FIG. 7, will pass through the reflective polarizing element and impinge upon the smooth side of structured surface material 218. FIG. 7 shows that structured surface material 218 acts as a beam turning lens, redirecting beam 236 toward the normal as it exits the structured surface side of the material. A low color, wide angle reflective polarizer is therefore preferred in a display employing the brightness enhanced reflective polarizer because otherwise undesirable colored light is redirected toward the normal viewing angles of an observer. By using a low color, wide angle reflective polarizer, display uniformity at normal viewing angles is maintained.

The brightness enhanced reflective polarizer can thus benefit from the above discussion with respect to FIGS. 23-25, and particularly FIG. 24, where off-axis color is reduced by introducing a Brewster effect at some angle away from the normal. As described above, this is achieved by introducing a y-index mismatch between layers of the multilayer reflective polarizer, and reducing the z-index mismatch between layers. Thus, any desired combination of the brightness enhanced reflective polarizer can be achieved by tuning the angle of the prisms of the structured surface material (given its respective optical behavior, such as shown in FIGS. 7 and 8 for the 90 degree material), to the desired off-angle color performance of the reflective polarizer tunable through introduction of a y-index mismatch and reduction of the z-index mismatch.

In the displays of FIGS. 9 and 10, the reflective polarizer could be laminated or similarly attached to the optical cavity and/or the plano side of the structured surface material. This would provide the advantages described above with respect to FIGS. 1-3 such as reducing surface reflections at the air/reflective polarizer interface. If the reflective polarizer is not attached to the optical cavity, it may be desirable to use an AR coated reflective polarizer such as that described above in Example 13.

In a display configuration such as that shown in FIG. 11, the reflective polarizer is located between the structured surface material and the LCD panel. In this configuration, the restraints on the reflective polarizer are not as restrictive in terms of off-axis color. This is due to the beam turning effects of the structured surface material. Since the structured surface material directs light toward the normal (e.g., tends to collimate the light) and does not transmit light at very wide angles (see FIG. 8, for example), a low color, wide angle reflective polarizer is not necessarily required in this configuration. This effect is even more pronounced in the display of FIG. 13, where two crossed pieces of structured surface material are placed behind the reflective polarizer. This results in two-dimensional collimation of light incident on the reflective polarizer.

In the case shown in FIG. 11, it is not possible to laminate the reflective polarizer to the structured side of the structured surface material. In this case, is may be desirable to use an AR coated reflective polarizer such as that described above in Example 13 to reduce surface reflections at the air/reflective polarizer interface. The AR coated polarizer described in Example 13 was placed between a sheet of 90 degree structured surface material (available from Minnesota Mining and Manufacturing Company as 3M brand Optical Lighting Film) and the backlight in a backlit computer display (Zenith Data Systems model Z-lite 320L) to make a display configuration such as that shown in FIG. 11. The grooves of the structured surface material were aligned parallel to the stretch direction of the reflective polarizer. The brightness of the resulting display was measured with a Minolta brand luminance meter, model LS-100, at 90 degrees to the display surface and at a distance of 1 foot. The measured brightness of the modified display was 51.9 ft-lamberts. This was compared to the brightness of the unmodified display of 23.1 ft-lamberts, for a gain of 125% over the original, unmodified display. The brightness of the display using the reflective polarizer without the AR coating was measured at 48.6 ft-lamberts. The AR coated reflective polarizer gave a 6.8% brighter display than did the non-AR coated reflective polarizer.

In any of the above described display configurations, the reflectivity of the reflective polarizer at a normal angle for light polarized in the transmission axis as seen from the side facing the display backlight is preferably less than 50%, more preferably less than 30%, more preferably less than 20% and even more preferably less than 10%. These reflectivities include first surface reflection of the reflective polarizer. The reflectivity of the reflective polarizer for the orthogonal polarization and at a normal angle is desirably at least 50%, preferably at least 70%, more preferably at least 80%, and even more preferably at least 90. The reflective polarizer desirably has a % RMS color in the transmitted polarization of less than 10%, preferably less than 3.5%, more preferably less than 2.1%, at angles orthogonal to the polarization of at least 30 degrees, more preferably at least 45 degrees, and even more preferably at least 60 degrees.

The invention has been described with respect to illustrative examples, to which various modifications may be made without departing from the spirit and scope of the present invention as defined by the appended claims.

What is claimed is:

1. A display comprising:
a liquid crystal display panel;
a light source; and
an asymmetric mirror positioned between the liquid crystal display panel and the light source to receive incident light generated by the light source, wherein the asymmetric mirror is operable to reflect incident light having a first polarization and partially reflect and transmit incident light having a second polarization different than the first polarization, wherein the asymmetric mirror has an average transmission of the first polarization of less than 20% and an average transmission of the second polarization of less than 50%.

2. The display of claim 1, further comprising a structured surface element disposed between the liquid crystal display panel and the light source.

3. The display of claim 1, further comprising a reflective layer positioned to reflect light generated by the light source toward the asymmetric mirror.

4. The display of claim 3, wherein the reflective layer comprises a multilayer polymeric film.

5. The display of claim 3, wherein the reflective layer comprises a multilayer birefringent mirror film.

6. The display of claim 3, wherein the light source is positioned between the reflective layer and the asymmetric mirror.

7. The display of claim 1, wherein the asymmetric mirror comprises a multilayer polymeric film.

8. The display of claim 1, wherein the asymmetric mirror has a % RMS color of less than 10% at 30 degrees from normal.

9. The display of claim 1, wherein the asymmetric mirror has a % RMS color of less than 8% at 30 degrees from normal.

10. The display of claim 1, wherein the asymmetric mirror has a % RMS color of less than 3.5% at 30 degrees from normal.

11. The display of claim 1, wherein the asymmetric mirror is planar.

* * * * *

UNITED STATES PATENT AND TRADEMARK OFFICE
CERTIFICATE OF CORRECTION

| | | |
|---|---|---|
| PATENT NO. | : 7,852,560 B2 | Page 1 of 2 |
| APPLICATION NO. | : 12/328127 | |
| DATED | : December 14, 2010 | |
| INVENTOR(S) | : Andrew John Ouderkirk et al. | |

It is certified that error appears in the above-identified patent and that said Letters Patent is hereby corrected as shown below:

On the Title Page
Page 6,
Item (56) (Other Publications), Line 42, Delete "Infared" and insert -- Infrared --, therefor.

Item (56) (Other Publications), Line 45, Delete "Visoelastic" and insert -- Viscoelastic --, therefor.

Item (56) (Other Publications), Line 51, Delete "Voluem" and insert -- Volume --, therefor.

Item (56) (Other Publications), Line 59, Delete "Interfernece" and insert -- Interference --, therefor.

Column 11,
Line 58, Delete "nonexistant." and insert -- nonexistent. --, therefor.

Column 12,
Line 47, Delete "bandedges," and insert -- band edges, --, therefor.

Column 18,
Line 57, Delete "describe," and insert -- described --, therefor.

Column 19,
Line 46, Delete "n1y-n2y," and insert -- n1y=n2y, --, therefor.

Column 21,
Line 2, Delete "Theological" and insert -- rheological --, therefor.

Column 22,
Line 49, Delete "(1992)" and insert -- (1992)) --, therefor.

Signed and Sealed this
Seventh Day of February, 2012

David J. Kappos
*Director of the United States Patent and Trademark Office*

CERTIFICATE OF CORRECTION (continued)
U.S. Pat. No. 7,852,560 B2

Line 51, Delete "(1991)" and insert -- (1991)) --, therefor.

Column 30,
Line 1, Delete "silical" and insert -- silica --, therefor.

Line 8, Delete "(NH4 HF2)" and insert -- ($NH_4HF_2$) --, therefor.

Line 9, Delete "deonized" and insert -- deionized --, therefor.

Column 31,
Line 12, Delete "napthalene" and insert -- naphthalene --, therefor.